(12) United States Patent
Koyama et al.

(10) Patent No.: US 8,702,317 B2
(45) Date of Patent: Apr. 22, 2014

(54) OPTICAL CONNECTOR AND METHOD FOR ASSEMBLING SAME

(75) Inventors: Ryo Koyama, Tsukuba (JP); Kazuhide Nakajima, Tsukuba (JP); Masaaki Takaya, Tsukuba (JP); Toshio Kurashima, Tsukuba (JP); Masatoshi Shimizu, Tsukuba (JP); Kyoichi Nakamizo, Tsukuba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 34 days.

(21) Appl. No.: 13/388,433

(22) PCT Filed: Aug. 6, 2010

(86) PCT No.: PCT/JP2010/063372
§ 371 (c)(1),
(2), (4) Date: Feb. 1, 2012

(87) PCT Pub. No.: WO2011/018996
PCT Pub. Date: Feb. 17, 2011

(65) Prior Publication Data
US 2012/0128303 A1    May 24, 2012

(30) Foreign Application Priority Data

Aug. 10, 2009 (JP) .................. 2009-185853
Aug. 10, 2009 (JP) .................. 2009-185854
Aug. 10, 2009 (JP) .................. 2009-185855

(51) Int. Cl.
*G02B 6/38* (2006.01)
*G02B 6/36* (2006.01)

(52) U.S. Cl.
USPC ............... 385/58; 385/53; 385/60; 385/65; 385/78; 385/86

(58) Field of Classification Search
None
See application file for complete search history.

(56) References Cited

U.S. PATENT DOCUMENTS 3,871,744 A * 3/1975 Bridger et al. ............... 385/84
4,309,071 A * 1/1982 Prunier .......................... 385/60

(Continued)

FOREIGN PATENT DOCUMENTS

CN  1039307    1/1990
JP  2000-047056    1/2000

(Continued)

OTHER PUBLICATIONS

Hiromichi Shinohara, "Broadband Access in Japan: Rapidly Growing FTTH Market", IEEE Communications Magazine, vol. 43, No. 9, pp. 72-78, Sep. 2005.

(Continued)

*Primary Examiner* — Rhonda Peace
(74) *Attorney, Agent, or Firm* — Ohlandt Greeley Ruggiero & Perle L.L.P.

(57) ABSTRACT

An optical connector having an optical fiber inserted into a connector main body includes a buckling regulating section whose length in an optical fiber insertion direction is formed variable and which regulates a buckling of the optical fiber while becoming short in an optical fiber insertion direction when the optical fiber is inserted into the connector main body. Even if an insertion area is made long, since no buckling of the optical fiber is generated, the buckling regulating section can sufficiently increase an insertion force of the optical fiber. Thus, even when foreign substances such as dusts enter and an insertion resistance increases, the optical fiber can be securely inserted. Further, the buckling regulating section is very advantageous to realize an end surface preparation of the optical fiber making use of the insertion force of the optical fiber such as a coating removing of the optical fiber, and an end surface grinding preparation of the optical fiber.

17 Claims, 62 Drawing Sheets

(56) References Cited

U.S. PATENT DOCUMENTS

| | | | | |
|---|---|---|---|---|
| 4,373,777 | A * | 2/1983 | Borsuk et al. | 385/139 |
| 4,784,455 | A * | 11/1988 | Sladen et al. | 385/87 |
| 4,822,131 | A * | 4/1989 | Anderton | 385/58 |
| 6,582,134 | B2 * | 6/2003 | Otera | 385/65 |
| 6,951,425 | B2 * | 10/2005 | Vergeest | 385/59 |
| 7,452,138 | B2 * | 11/2008 | Saito et al. | 385/86 |
| 7,458,729 | B2 * | 12/2008 | Sasaki et al. | 385/55 |
| 7,534,051 | B2 * | 5/2009 | Nishioka et al. | 385/60 |
| 7,537,393 | B2 * | 5/2009 | Anderson et al. | 385/54 |
| 7,572,064 | B2 * | 8/2009 | deJong | 385/65 |
| 7,628,549 | B2 * | 12/2009 | Takahashi et al. | 385/98 |
| 7,641,397 | B2 * | 1/2010 | Koreeda et al. | 385/65 |
| 7,658,553 | B2 * | 2/2010 | Semmler et al. | 385/98 |
| 7,717,623 | B2 * | 5/2010 | Ohtsuka et al. | 385/53 |
| 7,758,256 | B2 * | 7/2010 | Hopkins et al. | 385/78 |
| 8,292,514 | B2 * | 10/2012 | Ohtsuka et al. | 385/65 |
| 8,480,311 | B2 * | 7/2013 | Ohtsuka et al. | 385/78 |
| 2002/0114582 | A1 * | 8/2002 | Otera | 385/65 |
| 2004/0071407 | A1 * | 4/2004 | Vergeest | 385/58 |
| 2006/0257079 | A1 * | 11/2006 | Ohtsuka et al. | 385/86 |
| 2008/0304795 | A1 * | 12/2008 | Oike et al. | 385/81 |
| 2009/0148109 | A1 * | 6/2009 | Takahashi et al. | 385/98 |
| 2010/0220960 | A1 * | 9/2010 | Ohtsuka et al. | 385/72 |
| 2010/0284654 | A1 * | 11/2010 | Ohtsuka et al. | 385/65 |
| 2012/0128303 | A1 * | 5/2012 | Koyama et al. | 385/60 |

FOREIGN PATENT DOCUMENTS

| | | | |
|---|---|---|---|
| JP | 2000-047056 | 2/2000 | |
| JP | 2004126400 | 4/2004 | |
| JP | 2008033195 | 2/2008 | |
| JP | 2008-292708 | 12/2008 | |
| JP | 2008-292709 | 12/2008 | |
| JP | 2009-128422 | 6/2009 | |
| JP | 2009-128507 | 6/2009 | |
| WO | WO 9219998 A1 * | 11/1992 | G02B 6/38 |
| WO | 2009066625 | 5/2009 | |

OTHER PUBLICATIONS

Kobayashi, et al., "Study of Fiber Management for Optical Board Intergratoin", The Institute of Electronics, Information and Communication Engineers, Journal C, vol. J84-C, No. 9, pp. 774-783, Sep. 2001 with partial English translation.

IEC 60793-1-32, Optical Fibres Part 1-32: Measurement Methods and Test Procedures Coating Strippability, "3.4 Strippint Tool", Jul. 2001.

Abe, et al., "Study of Field Installable Optical Connector Realizing Physical Contact Connection without Polishing Fiber Endface", The Institute of Electronics, Information and Communication Engineers, Mar. 18, 2008, General Assembly Lecture papers, B-13-14 with partial English translation.

Abe, et al., "Study of Field Installable Optical Connector Realizing Physical Contact Connection without Polishing Fiber Endface", The Institute of Electronics, Information and Communication Engineers, IEICE Technical Report OFT2008-9 (May 2008) with English abstract.

IEC 60793-2-50, Optical fibres—Part 2-50: Product specifications—Sectional specification for class B single-mode fibres, Jan. 2004.

Koyama, et al., "A Study of Coating Removal Technique using a Pressure Force on Optical Fiber", The Institute of Electronics, Information and Communication Engineers, Mar. 16, 2010, General Assembly, Lecture papers, pp. 499, B-13-4 with partial English translation.

Koyama, et al., "A Study of Butt-Jointing of Coated Optical Fiber", The Institute of Electronics, Information and Communication Engineers, Sep. 15, 2009, General Assembly, Lecture papers, pp. 297, B-13-8 with partial English translation.

Koyama, et al., "A Study of Splice Method for Coated Optical Fibers", The Institute of Electronics, Information and Communication Engineers, Sep. 13, 2011, General Assembly, Lecture papers, pp. S-144-S145, BCS-1-5 with partial English translation.

International Search Report dated Augsut 31, 2010 for corresponding International Patent Application No. PCT/JP2010/063372.

International Preliminary Report on Patentability dated Feb. 14, 2012 for corresponding International Patent Application No. PCT/JP2010/063372 with English translation.

Kobayashi, et al., "Study of Fiber Management for Optical Board Intergration", The Institute of Electronics, Information and Communication Engineers, Journal C, vol. J84-C, No. 9, pp. 774-783, Sep. 2001 with partial English translation.

Abe, et al., "Study on Field Installable Optical Connnector Realizing Physical Contact Connection without Polishing Fiber Endface", The Institute of Electronics, Information and Communication Engineers, Mar. 18, 2008, General Assembly Lecture papers, B-13-14 with partial English translation.

Abe, et al., "Study on Field Installable Optical Connector Realizing Physical Contact Connection without Polishing Fiber Endface", The Institute of Electronics, Information and Communication Engineers, IEICE Technical Report OFT2008-9 (May 2008) with English abstract.

Koyama, et al., "A Study on Coating Removal Technique using a Pressure Force on Optical Fiber", The Institute of Electronics, Information and Communication Engineers, Mar. 16, 2010, General Assembly, Lecture papers, pp. 499, B-13-4 with partial English translation.

Koyama, et al., "A Study on Butt-Jointing of Coated Optical Fiber", The Institute of Electronics, Information and Communication Engineers, Sep. 15, 2009, General Assembly, Lecture papers, pp. 297, B-13-8 with partial English translation.

Koyama, et al., "A Study on Splice Method for Coated Optical Fibers", The Institute of Electronics, Information and Communication Engineers, Sep. 13, 2011, General Assembly, Lecture papers, pp. S-144-S145, BCS-1-5 with partial English translation.

Chinese Office Action dated Nov. 1, 2013 corresponding to Chinese Patent Application No. 201080034410.8; 18 pages.

* cited by examiner

OPTICAL CONNECTOR AND METHOD FOR ASSEMBLING SAME

BACKGROUND

1. Field of the Invention

The invention relates to an optical connector used to a connection of, for example, an optical fiber for optical communication and a method for assembling same.

2. Discussion of the Background Art

Conventionally, to connect an optical connector, although it is most popular to butt optical fibers against each other and to execute a physical contact connection, in the case, a degree of flatness of an end surface of an optical fiber becomes important. Thus, in a conventional site-assembly-type optical connector, as shown in FIG. 41, a built-in fiber 3 having a polished end surface is disposed in a connector main body 2 into which an optical fiber 1 for line is to be inserted, and the built-in fiber 3 is held by a ferrule 4 as well as the optical fiber 1 for line is connected to the built-in fiber 3 by a mechanical splice by an index matching oil 5. At the time, to accurately align a center of the optical fiber 1 to a center of the built-in fiber 3, a coating 1b of an extreme end of a bare fiber 1a of the optical fiber 1 is removed and the alignment is executed in a state of the bare fiber 1a (refer to, for example, Non-patent Document 1).

A fiber guide 6 for guiding the optical fiber 1 to a connecting portion to the built-in fiber 3 is formed of a groove or a hole into which the optical fiber 1 can be inserted. Accordingly, when a space in which the optical fiber 1 may be buckled exists inside of the optical connector or on a rear end side of the connector, an insertion force equal to or more than an insertion force determined by a size of the space cannot be generated to the optical fiber 1. It is known that when the insertion force is represented by P[N], the insertion force P is determined by a length L[m] of a buckling space (between a fiber holder 7 for holding the optical fiber and the fiber guide 6) (refer to FIGS. 43A and 43B) and shown by the following expression.

$$P = 4\pi^2 EI/L^2 \quad (1)$$

Here, E represents an elastic coefficient of glass, and I represents a section secondary moment (refer to, for example, Non-patent Document 2). When a force equal to or more than the insertion force is applied in an axial direction of an optical fiber, the optical fiber 1 is buckled in the buckling space and cannot be further inserted. For example, as shown in FIG. 42, when the optical fiber 1 is caught in the fiber guide 6 by foreign substances A such as dusts and a force generated by the caught optical fiber 1 exceeds the insertion force determined by the size of the buckling space, even if it is intended to forcibly push a rear end of the optical fiber 1 into the connector, the optical fiber 1 is buckled in the buckling space and cannot be further inserted into the connector.

In contrast, as a method of removing a coating of an optical fiber, there is a method of using blades 8 having an inner diameter of 175 μm and divided to two portions as shown in, for example, FIG. 45A, holding the optical fiber 1 between the blades 8 from both the sides as shown in FIG. 45B, and removing the coating 1b of the bare fiber 1a by extracting the optical fiber 1 as shown in FIG. 45C (refer to, for example, Non-patent Document 3).

Further, to simplify the assembly job of the site-assembly-type connector as described above, there is also known a method of inserting a coated optical fiber into an optical connector and removing the coating of the optical fiber in a connector main body (refer to, for example, Patent Document 1). In the optical connector, the coating 1b can be exfoliated in the connector by disposing a coating removing section 4b having an insertion port 4a with an inner diameter of 175 μm in the ferrule 4 as shown in FIG. 46A and pushing the optical fiber 1 against an end surface of the coating removing section 4b as shown in FIG. 46B.

In contrast, as a technology for reducing a cost by reducing a number of parts by configuring a site-assembly-type optical connector without using a built-in fiber, there is known also a technology of realizing a physical contact connection by grinding off a corner portion of a cut-off end surface of a line fiber and composing a portion in contact with a confronting fiber of only a flat portion at a center of an end surface (refer to, for example, Non-patent Document 4). In the case, although the fiber is inserted into the connector after an extreme end of the optical fiber is processed, to simplify the assembly job of the site-assembly-type connector as described above, it is also possible to execute a fiber surface preparation in the connector in an assembly process making use of an insertion force of the optical fiber to the connector.

Patent Document 1: Japanese Patent Application Laid-Open No. 2008-292708

Non-patent Document

Non-patent Document 1: "Broadband Access in Japan: Rapidly Growing FTTH Market", IEEE Commun. Mag., vol. 43, no. 9, pp. 72-78, 2005

Non-patent Document 2: The Institute of Electronics, Information and Communication Engineers, Journal C, "Study of Fiber Management for Optical Board Integration", vol. J84-C, No. 9, pp 774-783, 2001-09

Non-patent Document 3: IEC 60793-1-32, Optical fibres Part 1-32: Measurement methods and test procedures Coating strippability, "3.4 Strippint tool"

Non-patent Document 4: The Institute of Electronics, Information and Communication Engineers, 2008, General Assembly, Lecture papers, "Study on field installable optical connector realizing physical contact connection without polishing fiber endface", B-13-14

As described above, in an optical connector having a large insertion friction of the optical fiber and in an optical connector in which an end surface preparation such as a coating removing of an end surface of an optical fiber, grinding-off of a corner portion of a fiber end surface, and the like are executed in a connector, since a force larger than an insertion force restricted by a buckling portion of the optical fiber when the optical fiber is inserted into the connector is required, a problem arises in that the optical fiber cannot be appropriately inserted into the optical connector.

For example, in an optical connector using the conventional fiber guide 6, when an alignment length of a bare fiber is reduced as much as possible in a ferrule 4, the alignment length X becomes 2 mm when a connection loss caused by an offset of angle of an optical axis is taken into consideration. FIG. 44 shows the relation between an alignment length in an optical connector and a maximum loss due to an angle offset of an optical axis. In the case, when an insertion taper of an optical fiber 1 to an optical connector and an insertion taper to the ferrule 4 are taken into consideration, an insertion area remaining in a connector rear end is about 3.5 mm in a state that the optical fiber 1 has reached to an insertion port to the ferrule 4. A length L of a buckling portion of the optical fiber 1 at the time is about 3.5 mm, and a maximum insertion force is about 2.7 N from Expression (1). When the optical fiber 1 is caught in the insertion port to the ferrule 4 and when a coating removing and an end surface preparation are executed there, unless a press force necessary to the preparation is equal to or less than the insertion force, since the optical fiber 1 is not inserted into the ferrule 4 and is buckled in a connector rear end, the optical connector cannot be assembled.

An object of the invention, which was made in view of the problem, is to provide an optical connector and a method for assembling same which can increase an insertion force of an optical fiber when the connector is assembled, in which an insertion is not interrupted by that foreign substances such as dusts enter, and which are advantageous to realize an optical fiber end surface preparation making use of the insertion force of the optical fiber.

SUMMARY

To achieve the object, in an optical connector having an optical fiber inserted into a connector main body, the invention includes a buckling regulating section whose length in an optical fiber insertion direction is formed variable and which regulates a buckling of the optical fiber while becoming short in the optical fiber insertion direction when the optical fiber is inserted into the connector main body.

With the configuration, when the optical fiber is inserted into the connector main body, since the buckling of the optical fiber is regulated while the buckling regulating section becomes short in the optical fiber insertion direction, even if an insertion area is made long, no buckling is generated to the optical fiber, and the insertion force of the optical fiber can be increased.

Further, to achieve the object, the invention is an assembly method of an optical connector including a buckling regulating section whose length in an optical fiber insertion direction is formed variable and which regulates a buckling of an optical fiber when the optical fiber is inserted into a connector main body, wherein the optical fiber is inserted into the connector main body while making a length of the buckling regulating section in the optical fiber insertion direction short.

With the configuration, when the optical fiber is inserted into the connector main body, since a buckling of the optical fiber is regulated while the buckling regulating section becomes short in the optical fiber insertion direction, even if the insertion area is made long, no buckling is generated to the optical fiber, and the insertion force of the optical fiber can be increased.

To achieve the object, in an optical connector including an optical fiber inserted into a connector main body, the invention includes a coating removing section for removing a coating of an optical fiber by an insertion force of the optical fiber, an end surface grinding section for grinding a corner portion of an extreme end surface of the optical fiber by the insertion force of the optical fiber, and a buckling regulating section whose length in an optical fiber insertion direction is formed variable and which regulates a buckling of the optical fiber while becoming short in the optical fiber insertion direction when the optical fiber is inserted into the connector main body.

With the configuration, since the coating of the optical fiber is removed by the insertion force of the optical fiber as well as the corner portion of the extreme end surface of the optical fiber is ground, it is not necessary to separately apply a coating removing of an optical fiber and an end surface grinding preparation of the optical fiber using a dedicated tool before the optical fiber is inserted. At the time, when the optical fiber is inserted into the connector main body, since the buckling of the optical fiber is regulated while the buckling regulating section becomes short in the optical fiber insertion direction, even if the insertion area is made long, no buckling is generated to the optical fiber, and the insertion force of the optical fiber can be increased.

Further, to achieve the object, the invention is an assembly method of an optical connector including a coating removing section for removing a coating of the optical fiber by an insertion force of the optical fiber, an end surface grinding section for grinding a corner portion of an extreme end surface of the optical fiber by the insertion force of the optical fiber, and a buckling regulating section whose length in an optical fiber insertion direction is formed variable and which regulates a buckling of the optical fiber when the optical fiber is inserted into a connector main body, wherein the optical fiber is inserted into the connector main body while making the length of the buckling regulating section in the optical fiber insertion direction short as well as the coating of the optical fiber is removed by the coating removing section while inserting the optical fiber and the corner portion of the extreme end surface of the optical fiber is ground by the end surface grinding section while inserting the optical fiber.

With the operation, since the coating of the optical fiber is removed by the insertion force of the optical fiber as well as the corner portion of the extreme end surface of the optical fiber is ground, it is not necessary to separately apply the coating removing of the optical fiber and the end surface grinding preparation of the optical fiber using the dedicated tool before the optical fiber is inserted. At the time, when the optical fiber is inserted into the connector main body, since the buckling of the optical fiber is regulated while the buckling regulating section becomes short in the optical fiber insertion direction, even if the insertion area is made long, no buckling is generated to the optical fiber, and the insertion force of the optical fiber can be increased.

To achieve the object, in an optical connector including an optical fiber inserted into a connector main body, the invention includes a buckling regulating section which is formed so as to be elastically deformable in an optical fiber insertion direction and regulates a buckling of the optical fiber while contracting in the optical fiber insertion direction when the optical fiber is inserted into the connector main body.

With the configuration, when optical fiber is inserted into the connector main body, since the buckling of the optical fiber is regulated while the buckling regulating section contracts in the optical fiber insertion direction, even if the insertion area is made long, no buckling is generated to the optical fiber, and the insertion force of the optical fiber can be increased.

Further, to achieve the object, the invention is an assembly method of an optical connector including a buckling regulating section which is formed so as to be elastically deformable in an optical fiber insertion direction and regulates a buckling of an optical fiber when the optical fiber is inserted into a connector main body, wherein the optical fiber is inserted into the connector main body while the buckling regulating section is contracted in the optical fiber insertion direction.

With the configuration, when the optical fiber is inserted into the connector main body, since the buckling of the optical fiber is regulated while the buckling regulating section contracts in the optical fiber insertion direction, even if the insertion area is made long, no buckling is generated to the optical fiber, and the insertion force of the optical fiber can be increased.

Effect of the Invention

According to the invention, even if the insertion area is made long, since no buckling is generated to the optical fiber, the insertion force of the optical fiber can be made sufficiently large, and even when foreign substances such as dusts enter and an insertion resistance increases, the optical fiber can be securely inserted. Further, the buckling regulating section is very advantageous to realize an optical fiber end surface preparation making use of the insertion force of the optical fiber such as a coating removing of an optical fiber and an end surface grinding preparation of the optical fiber.

BRIEF DESCRIPTION OF THE DRAWINGS

Brief Description of the Drawings

Figure 1:
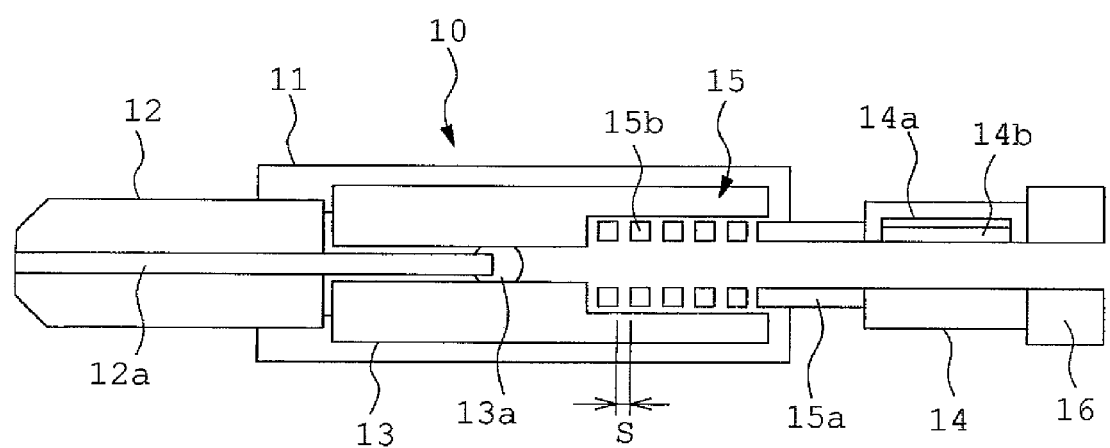

FIG. 1 is a side sectional view of an optical connector showing a first embodiment of the invention.

Figure 2:
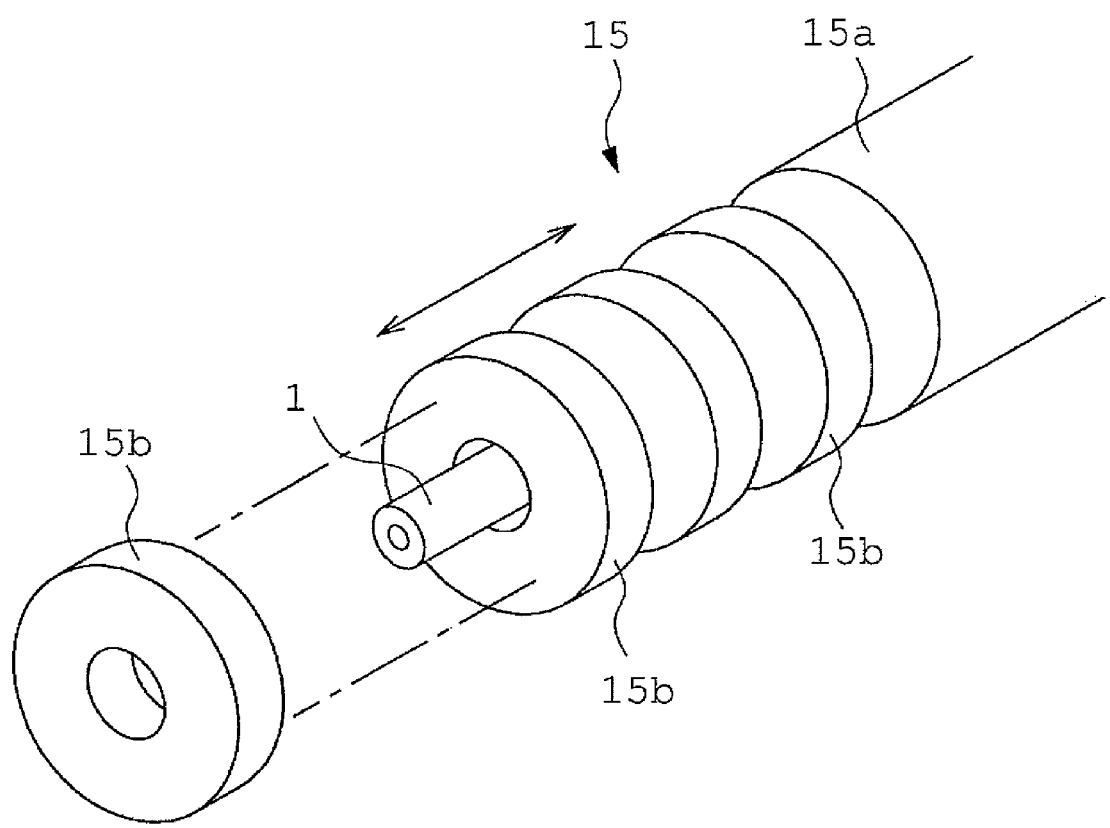

FIG. 2 is an exploded perspective view of a part of a buckling regulating section.

Figure 3A:
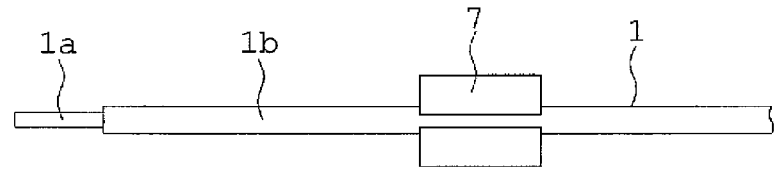

FIG. 3A is a side sectional view showing an assembly process of the optical connector.

Figure 3B:
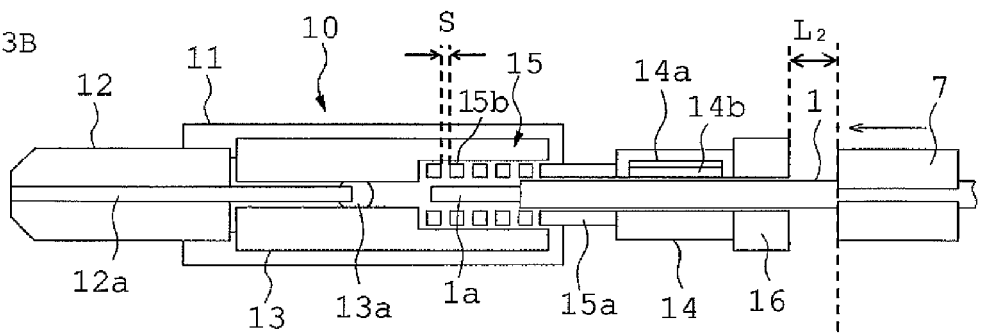

FIG. 3B is a side sectional view showing an assembly process of the optical connector.

Figure 3C:
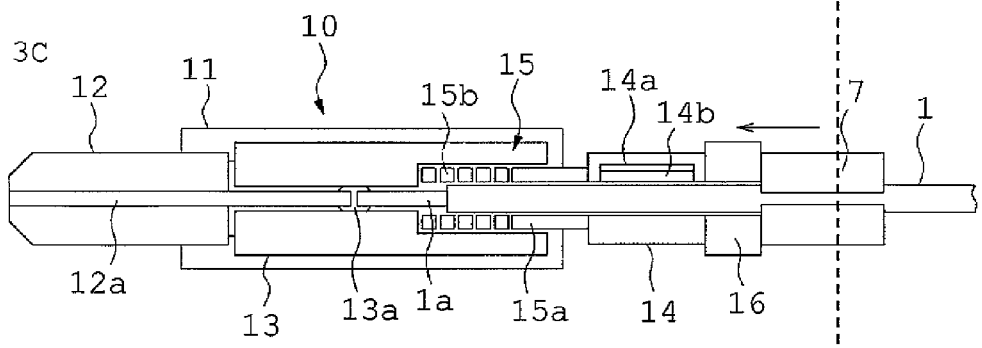

FIG. 3C is a side sectional view showing an assembly process of the optical connector.

Figure 3D:
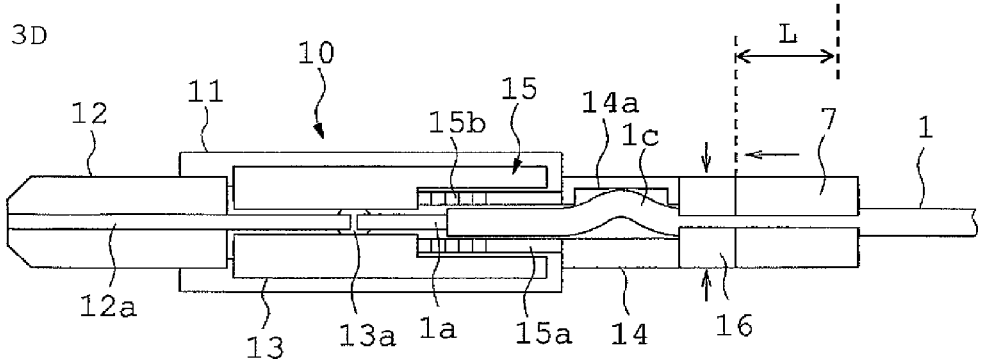

FIG. 3D is a side sectional view showing an assembly process of the optical connector.

Figure 4:
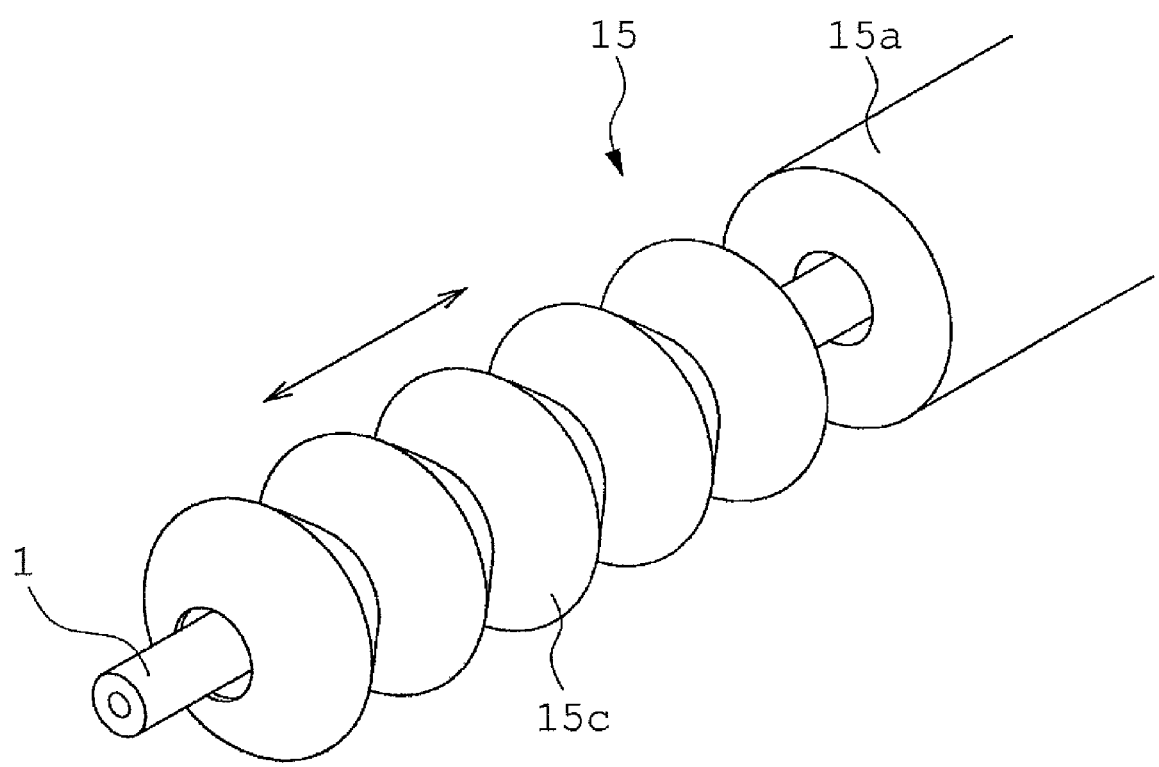

FIG. 4 is a perspective view of a buckling regulating section showing a modification of the first embodiment.

Figure 5A:
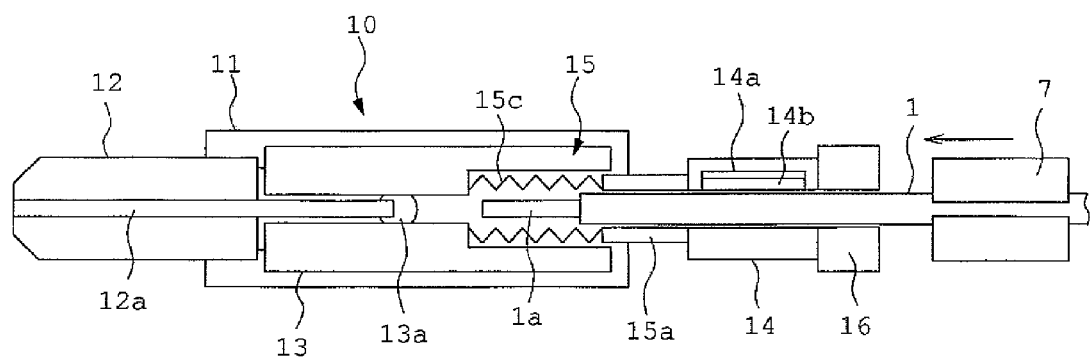

FIG. 5A is a side sectional view showing an assembly process of an optical connector.

Figure 5B:
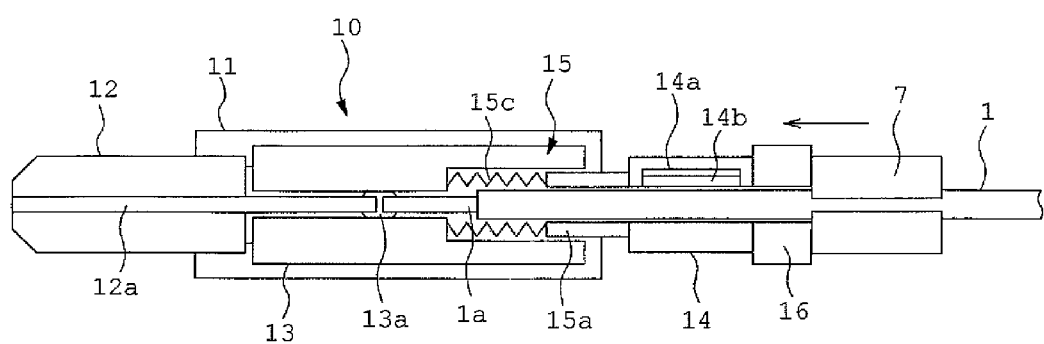

FIG. 5B is a side sectional view of an assembly process of the optical connector.

Figure 6:
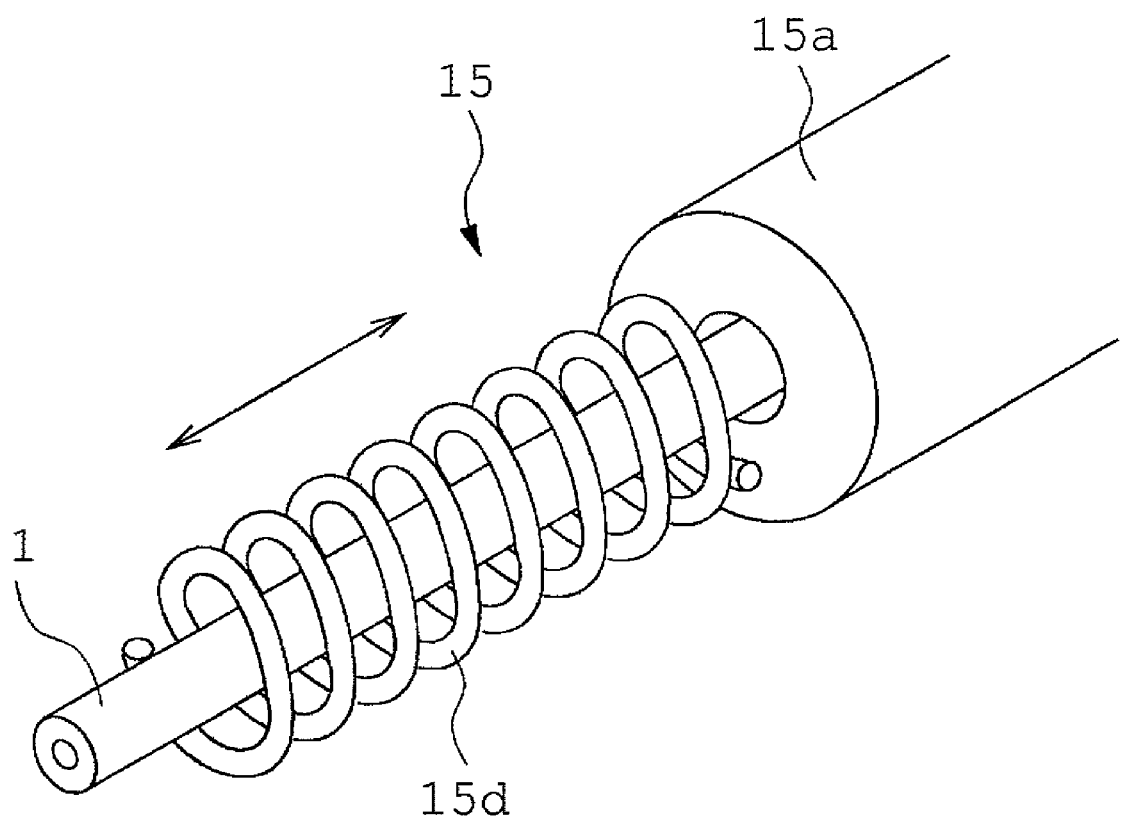

FIG. 6 is a perspective view of a buckling regulating section showing other modification of the first embodiment.

Figure 7A:
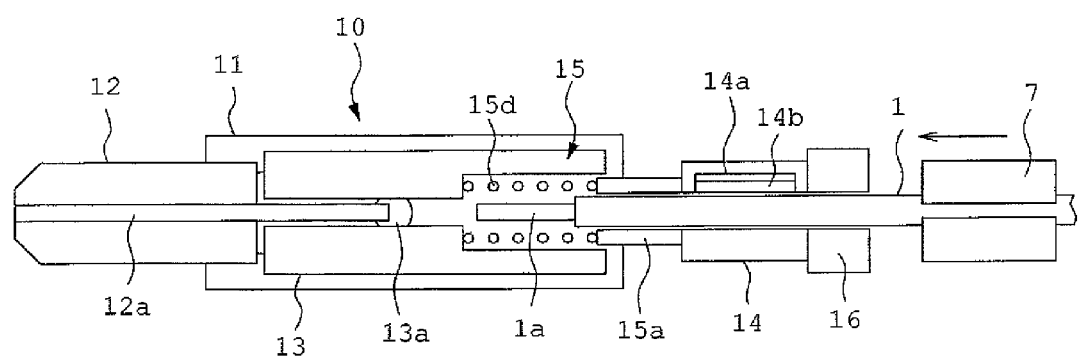

FIG. 7A is a side sectional view showing an assembly process of an optical connector.

Figure 7B:
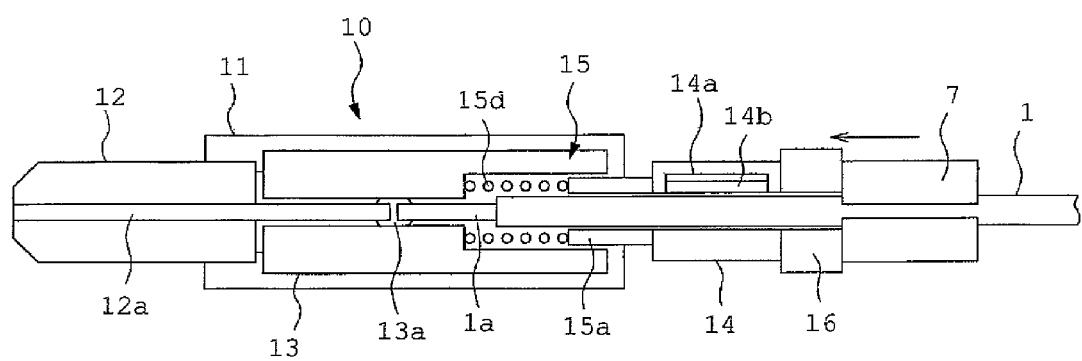

FIG. 7B is a side sectional view showing an assembly process of the optical connector.

Figure 8:
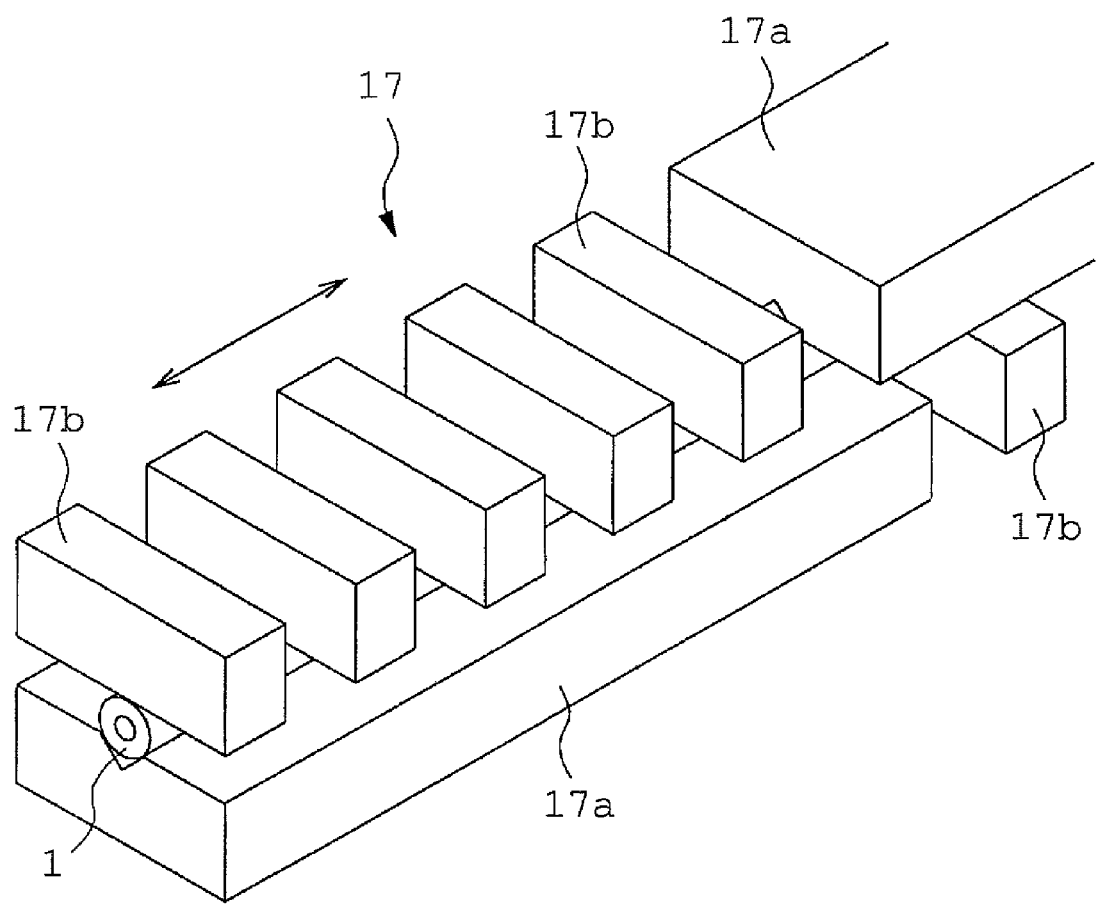

FIG. 8 is a perspective view of a buckling regulating section showing a second embodiment of the invention.

Figure 9A:
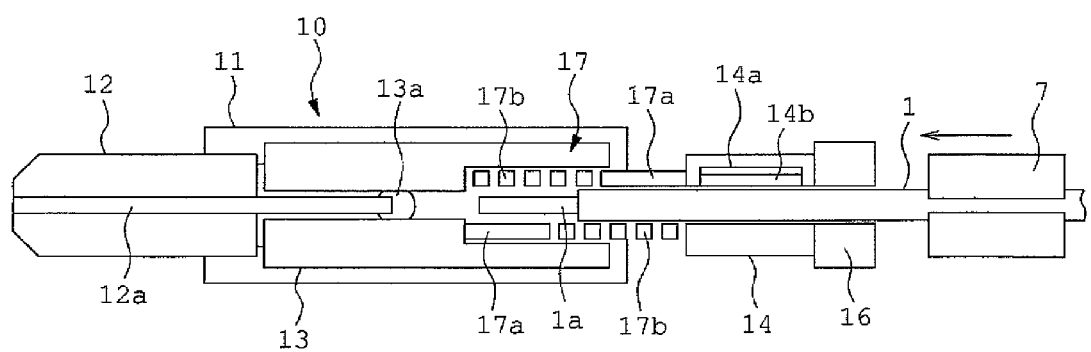

FIG. 9A is a side sectional view showing an assembly process of an optical connector.

Figure 9B:
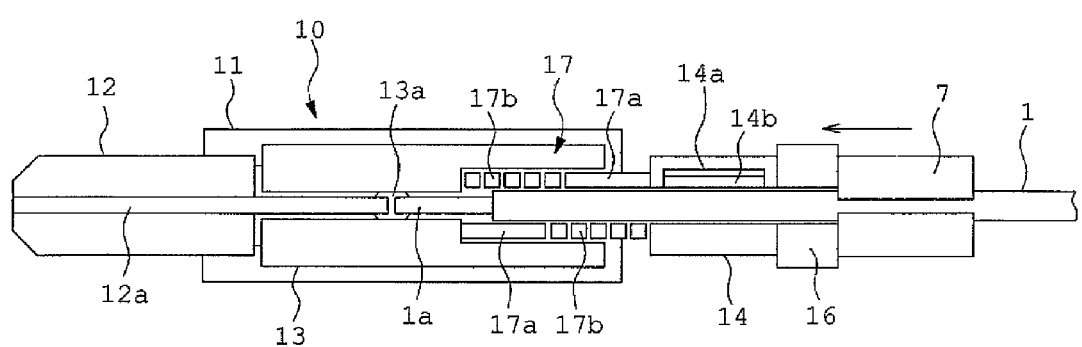

FIG. 9B is a side sectional view of an assembly process of the optical connector.

Figure 10:
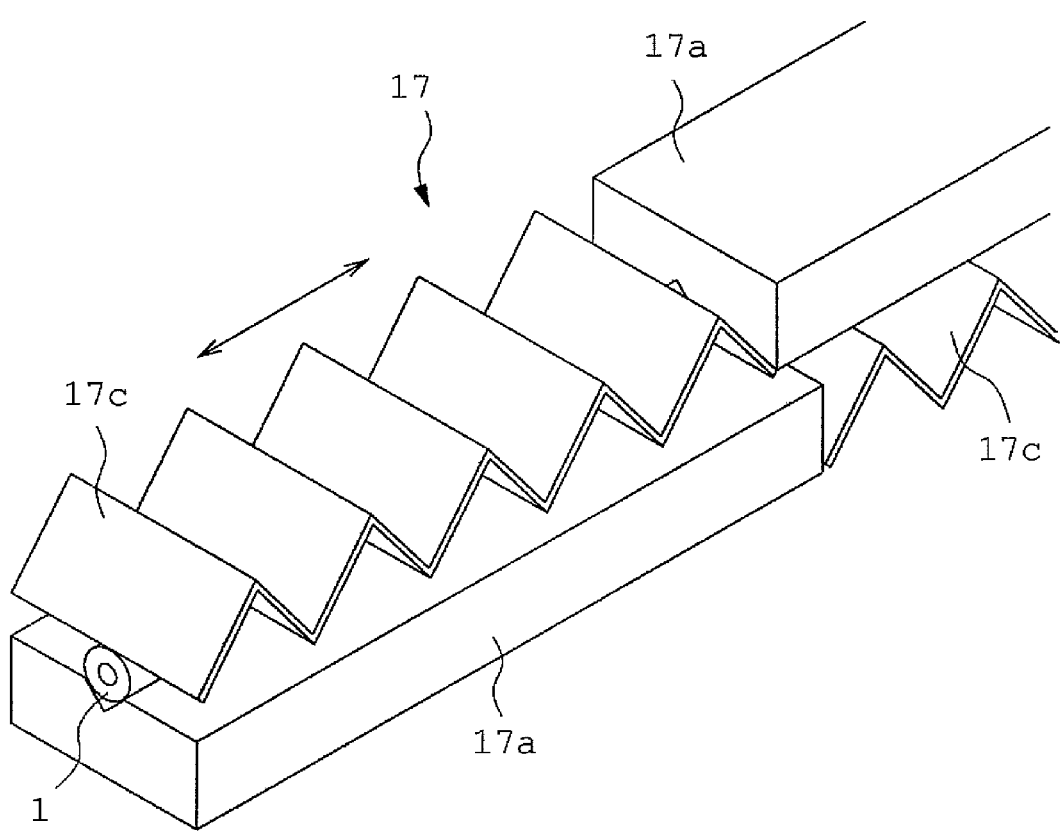

FIG. 10 is a perspective view of a buckling regulating section showing a modification of the second embodiment.

Figure 11A:
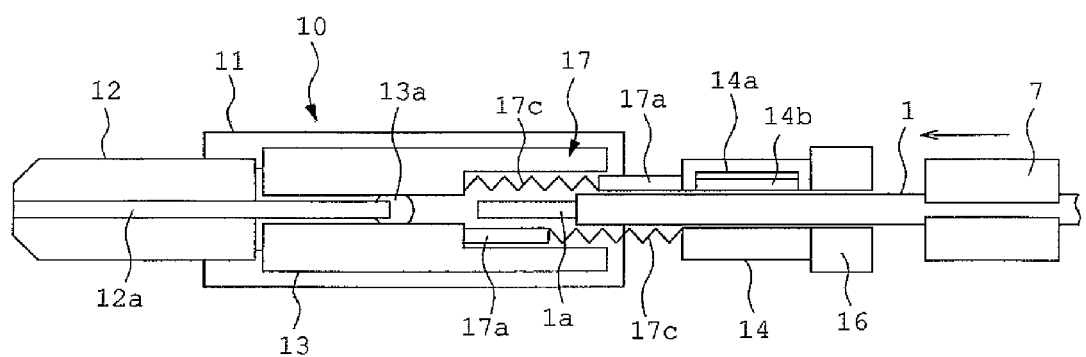

FIG. 11A is a side sectional view showing an assembly process of an optical connector.

Figure 11B:
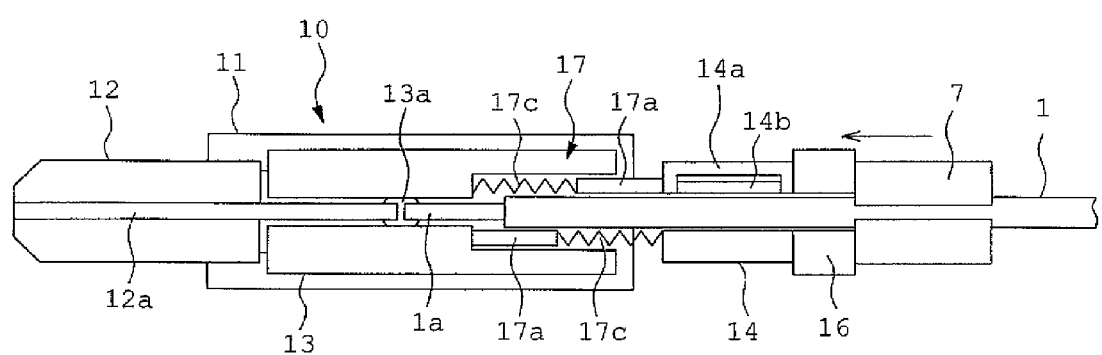

FIG. 11B is a side sectional view showing an assembly process of the optical connector.

Figure 12:
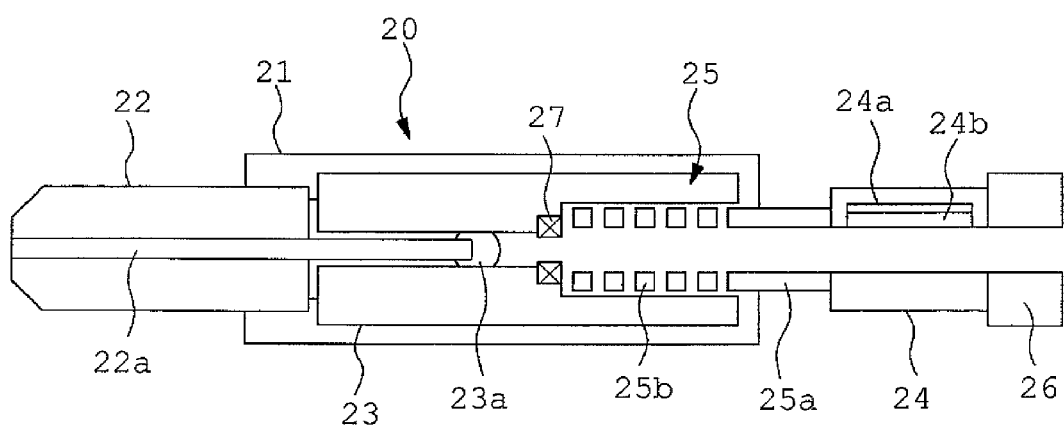

FIG. 12 is a side sectional view of an optical connector showing a third embodiment of the invention.

Figure 13A:
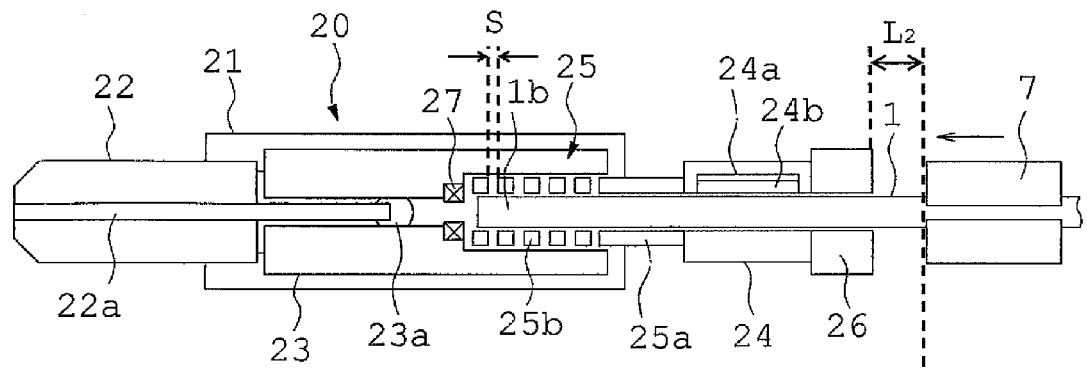

FIG. 13A is a side sectional view showing an assembly process of the optical connector.

Figure 13B:
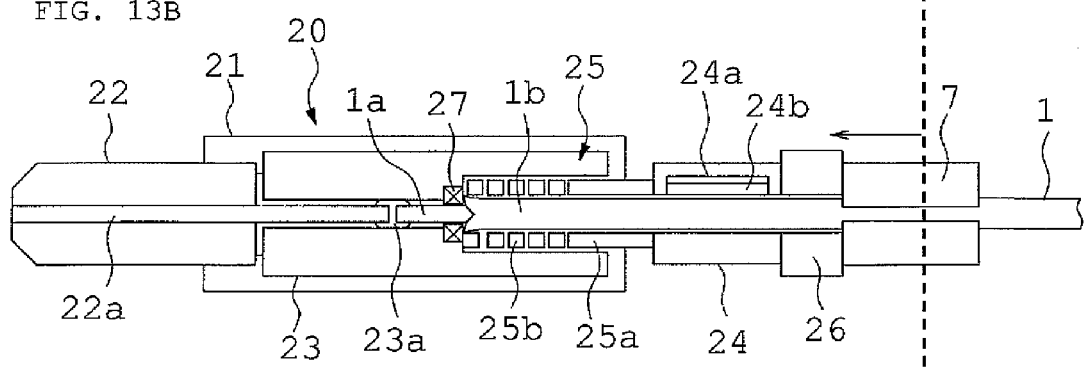

FIG. 13B is a side sectional view showing an assembly process of the optical connector.

Figure 13C:
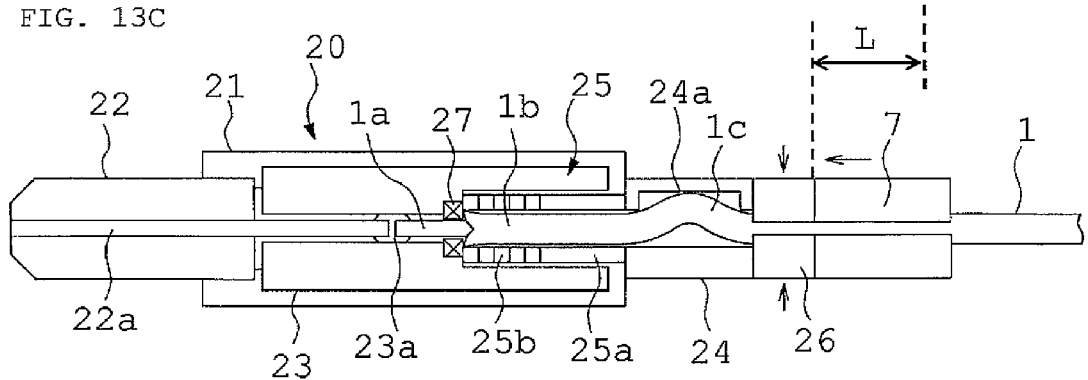

FIG. 13C is a side sectional view showing an assembly process of the optical connector.

Figure 14:
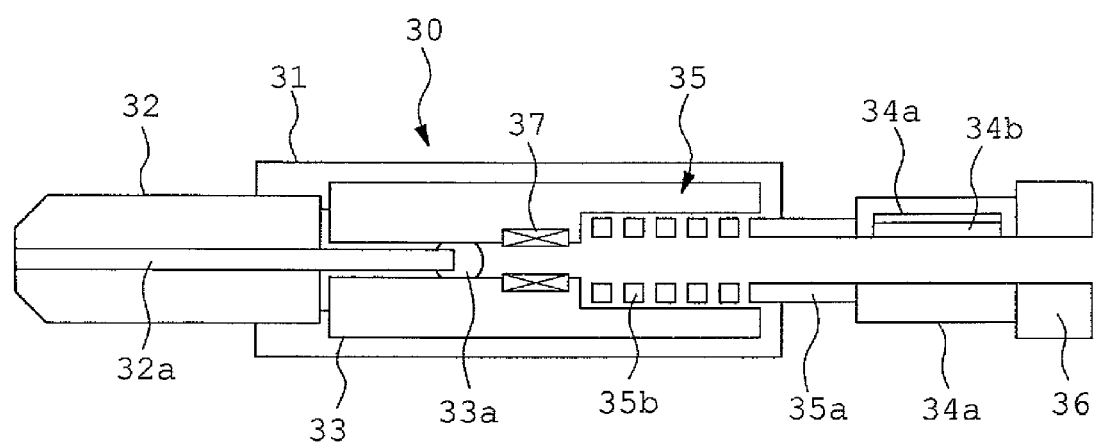

FIG. 14 is a side sectional view of an optical connector showing a fourth embodiment of the invention.

Figure 15:
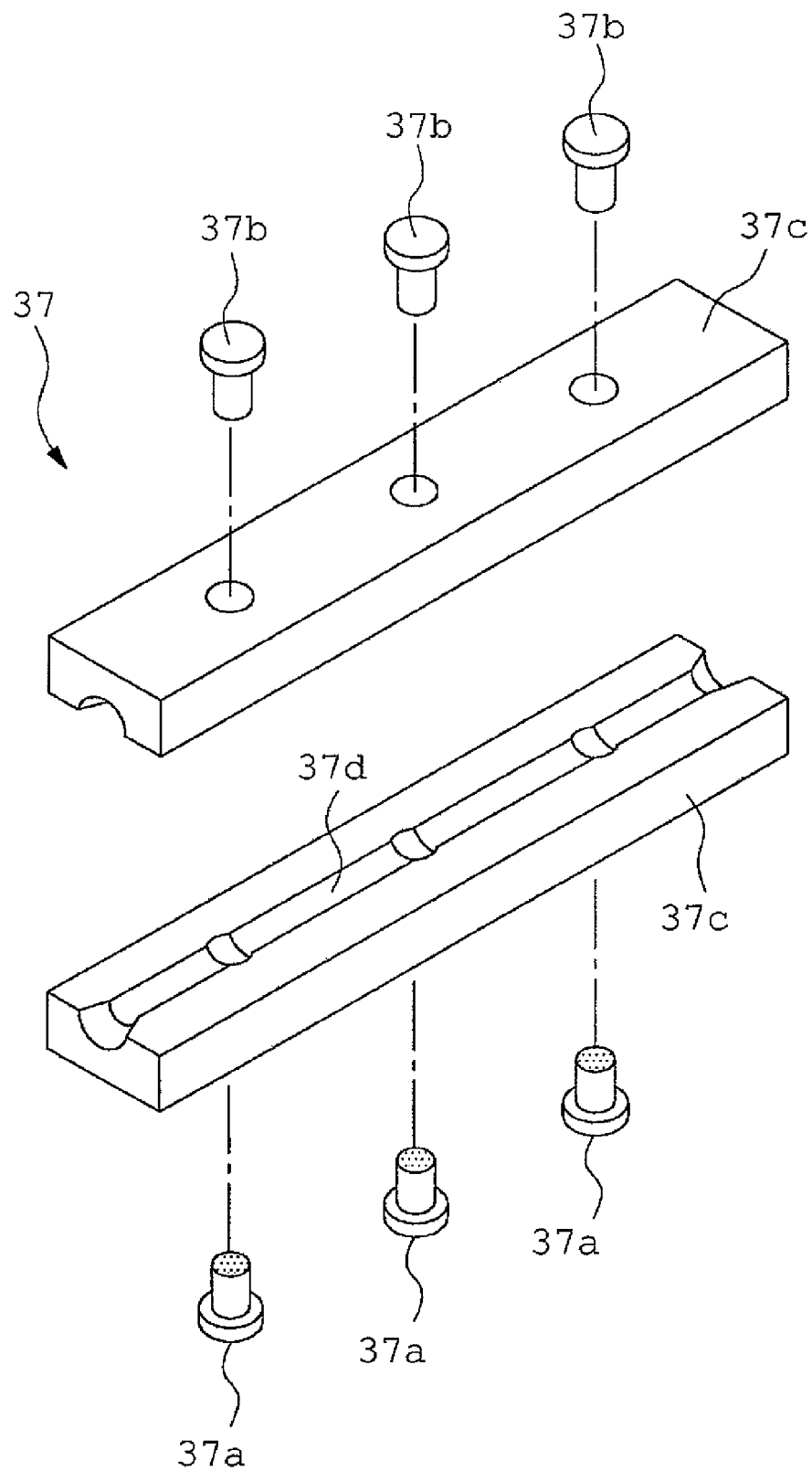

FIG. 15 is an exploded perspective view of an end surface grinding section.

Figure 16A:
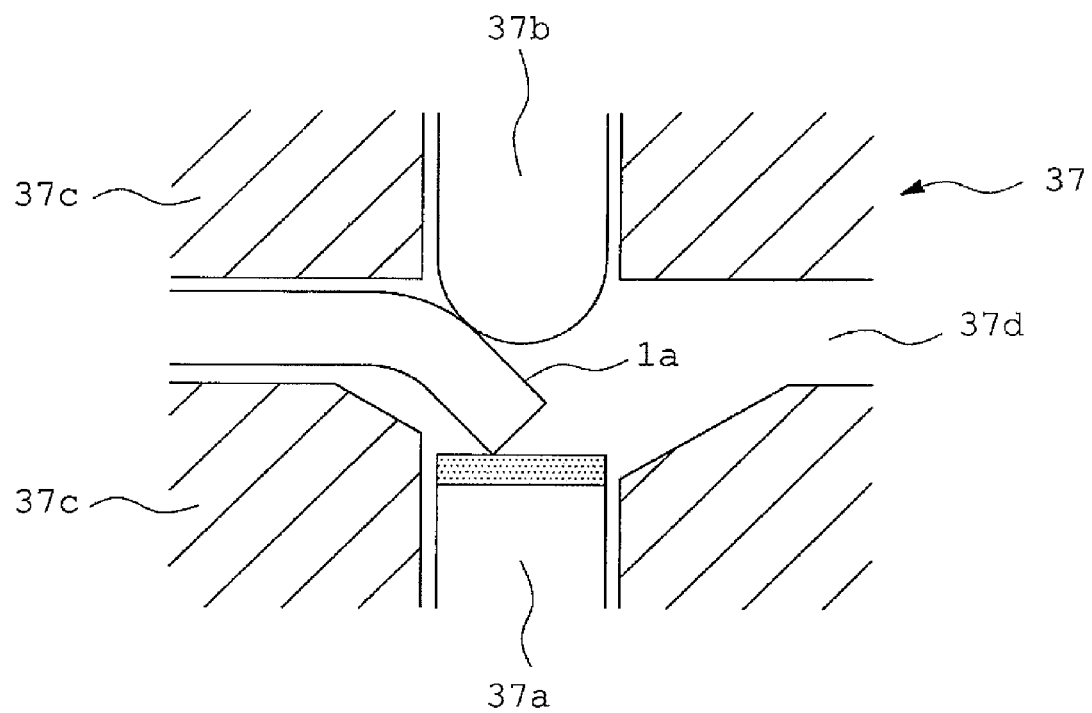

FIG. 16A is an enlarged side sectional view of a main portion of the end surface grinding section.

Figure 16B:
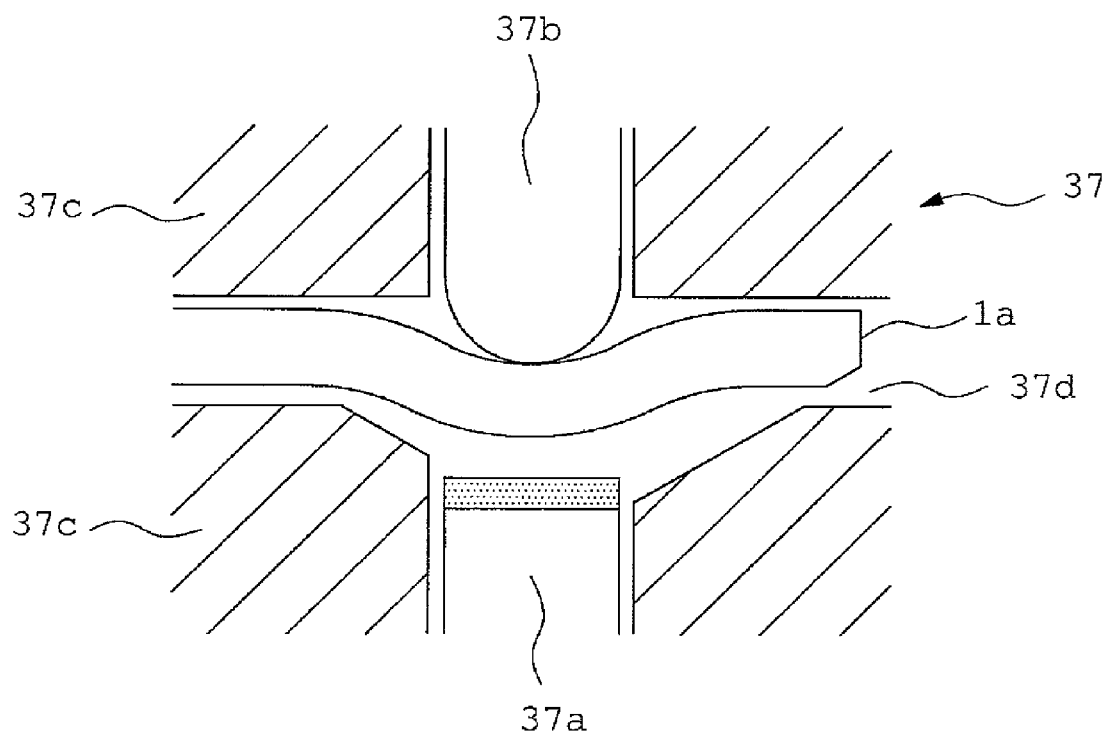

FIG. 16B is an enlarged side sectional view of the main portion of the end surface grinding section.

Figure 17A:
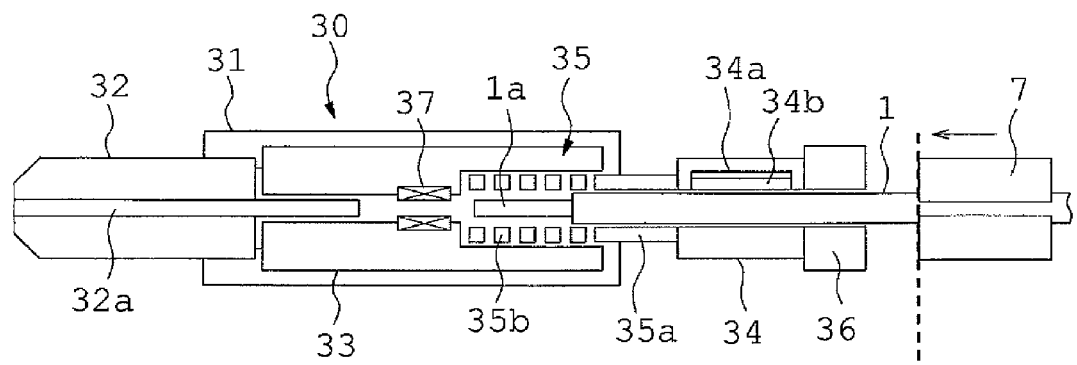

FIG. 17A is a side sectional view showing an assembly process of the optical connector.

Figure 17B:
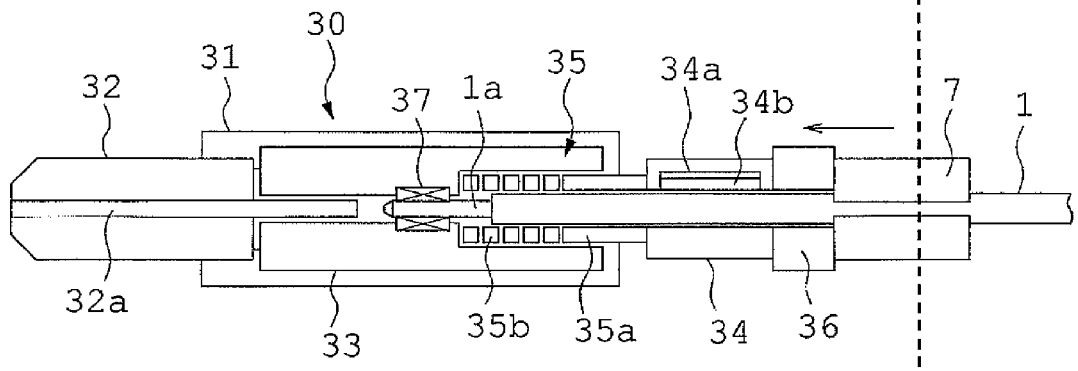

FIG. 17B is a side sectional view showing an assembly process of the optical connector.

Figure 17C:
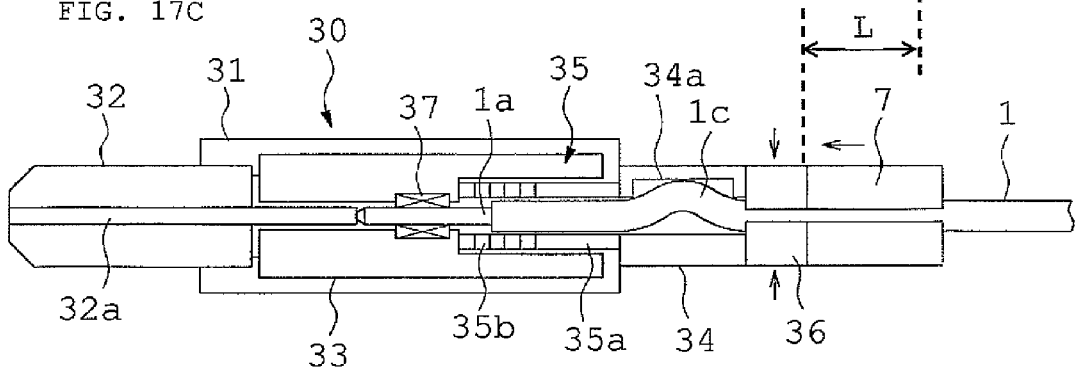

FIG. 17C is a side sectional view showing an assembly process of the optical connector.

Figure 18:
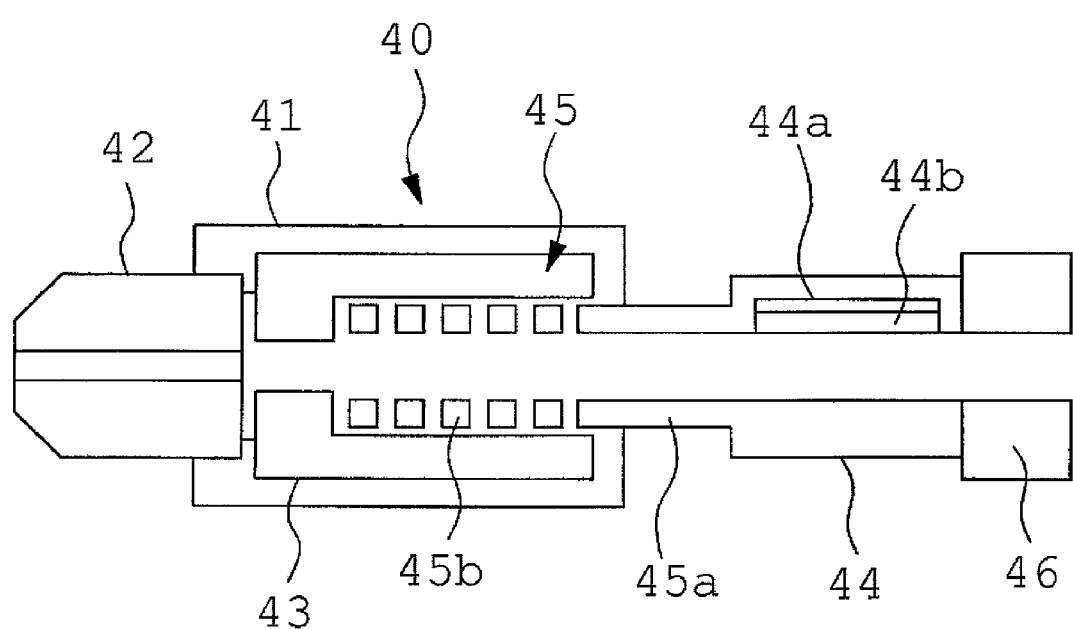

FIG. 18 is a side sectional view of an optical connector showing a fifth embodiment of the invention.

Figure 19A:
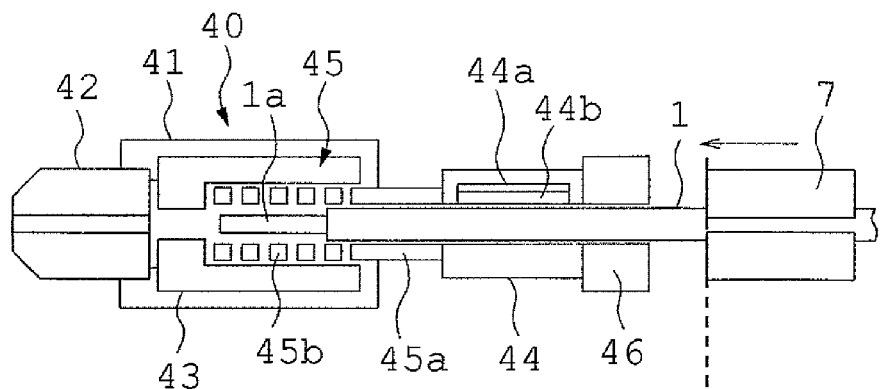

FIG. 19A is a side sectional view showing an assembly process of the optical connector.

Figure 19B:
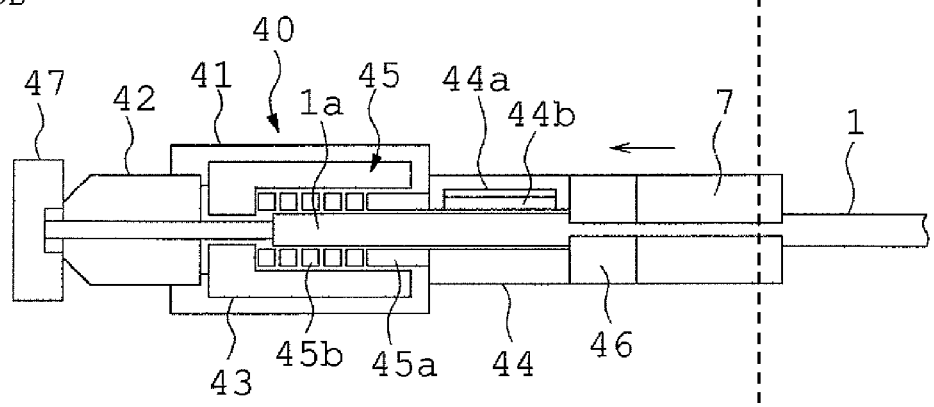
Figure 19C:
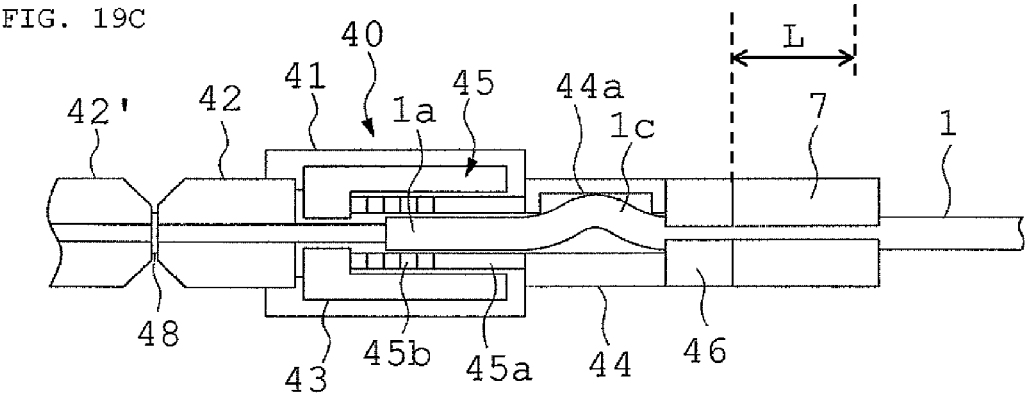

FIG. 19B is a side sectional view showing an assembly process of the optical connector FIG. 19C is a side sectional view showing an assembly process of the optical connector.

Figure 20:
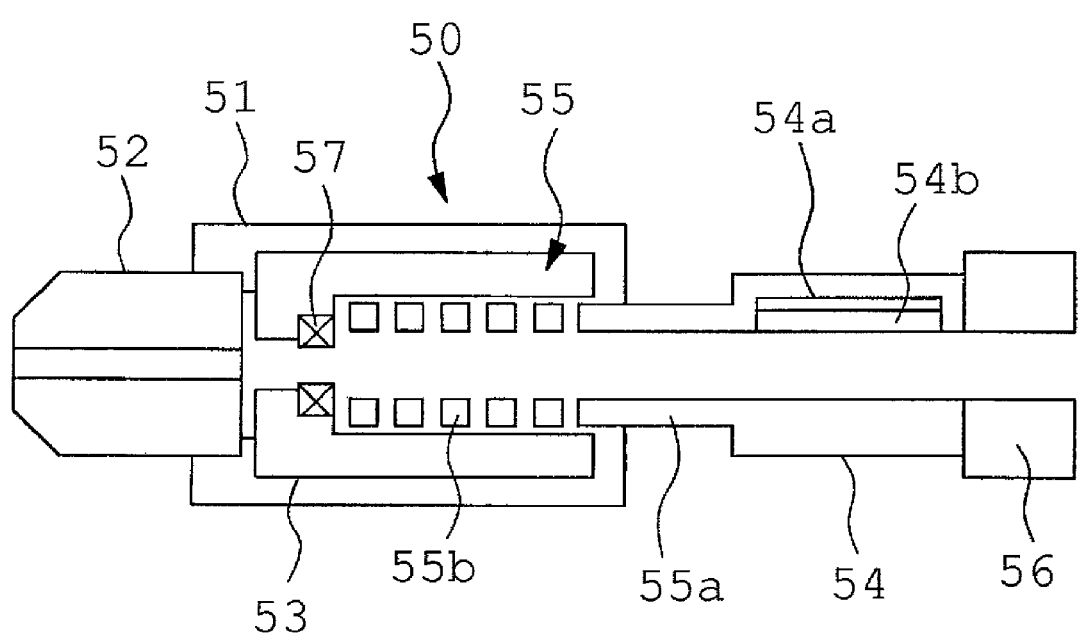

FIG. 20 is a side sectional view of an optical connector showing a sixth embodiment of the invention.

Figure 21A:
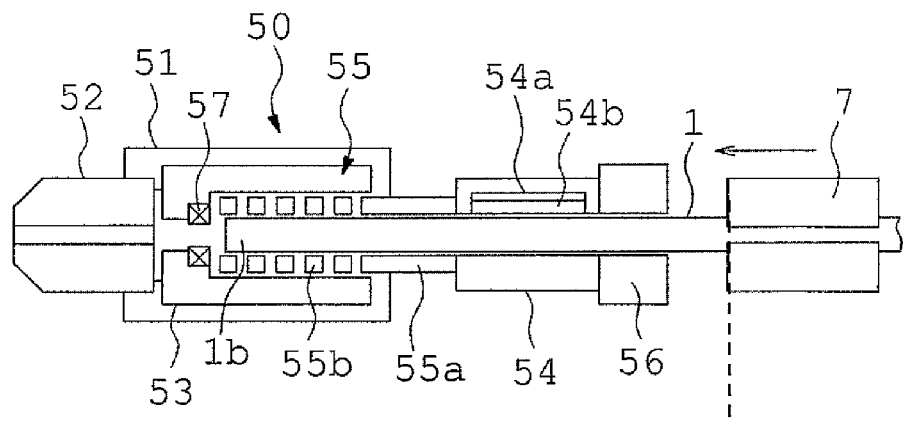

FIG. 21A is a side sectional view showing an assembly process of the optical connector.

Figure 21B:
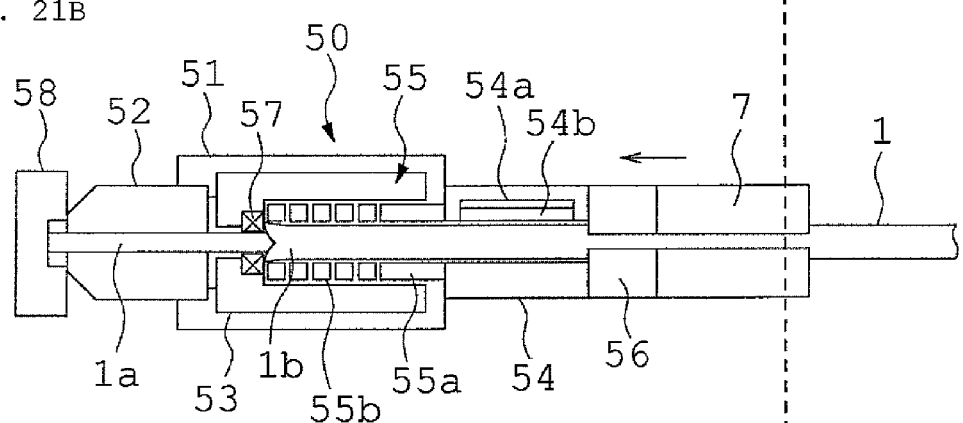
Figure 21C:
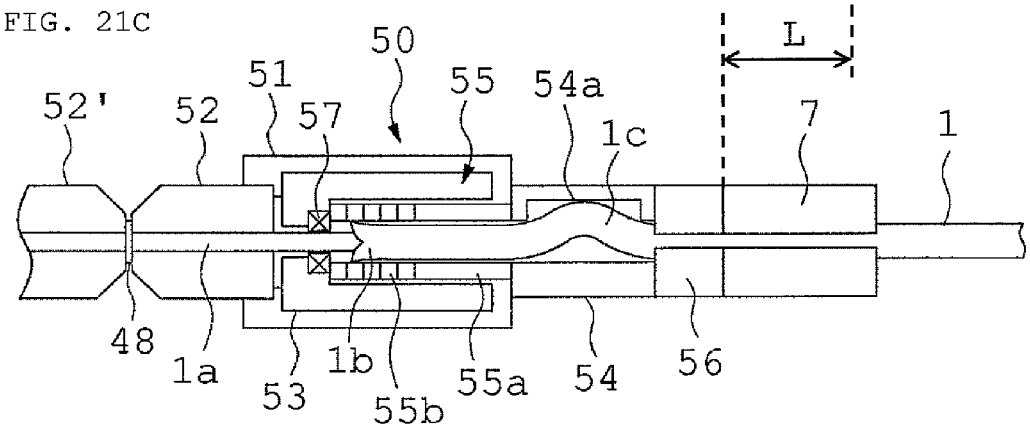

FIG. 21B is a side sectional view showing an assembly process of the optical connector FIG. 21C is a side sectional view showing an assembly process of the optical connector.

Figure 22:
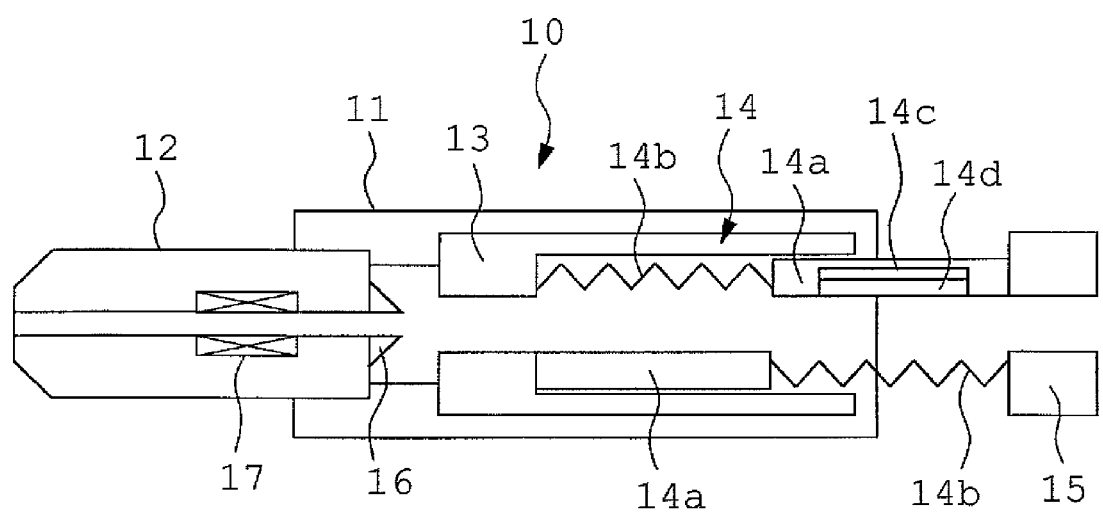

FIG. 22 is a side sectional view of an optical connector showing a seventh embodiment of the invention.

Figure 23:
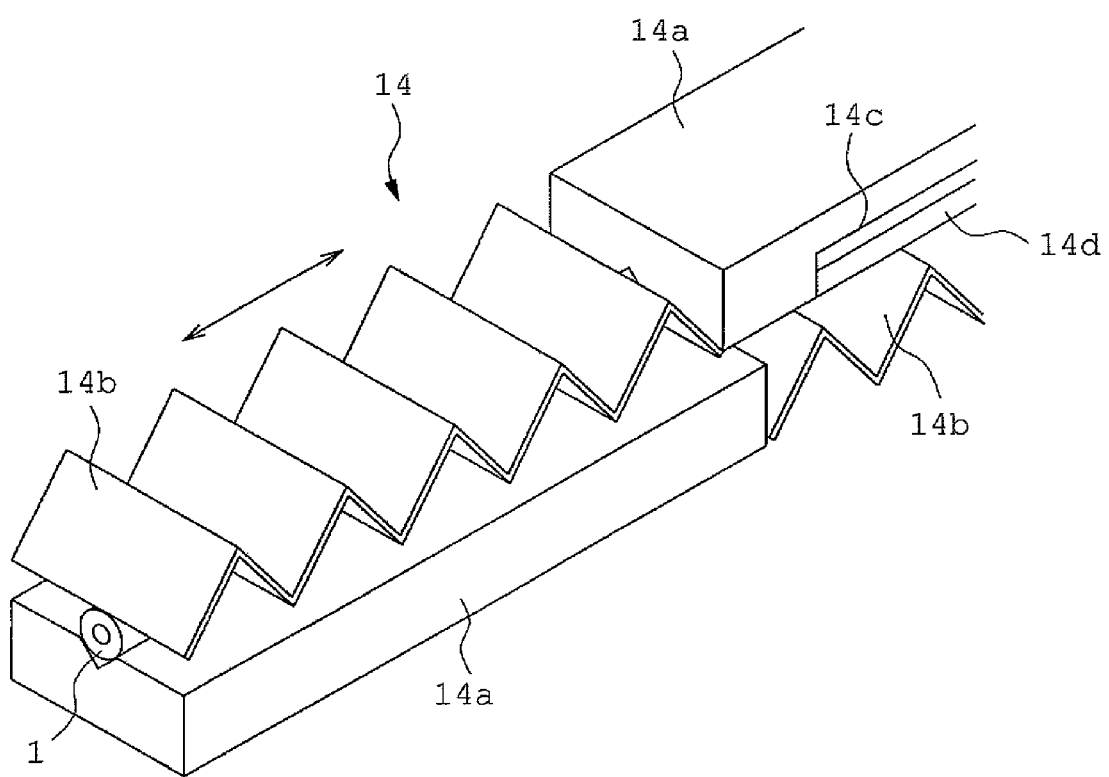

FIG. 23 is a perspective view of a part of a movable guide section.

Figure 24:
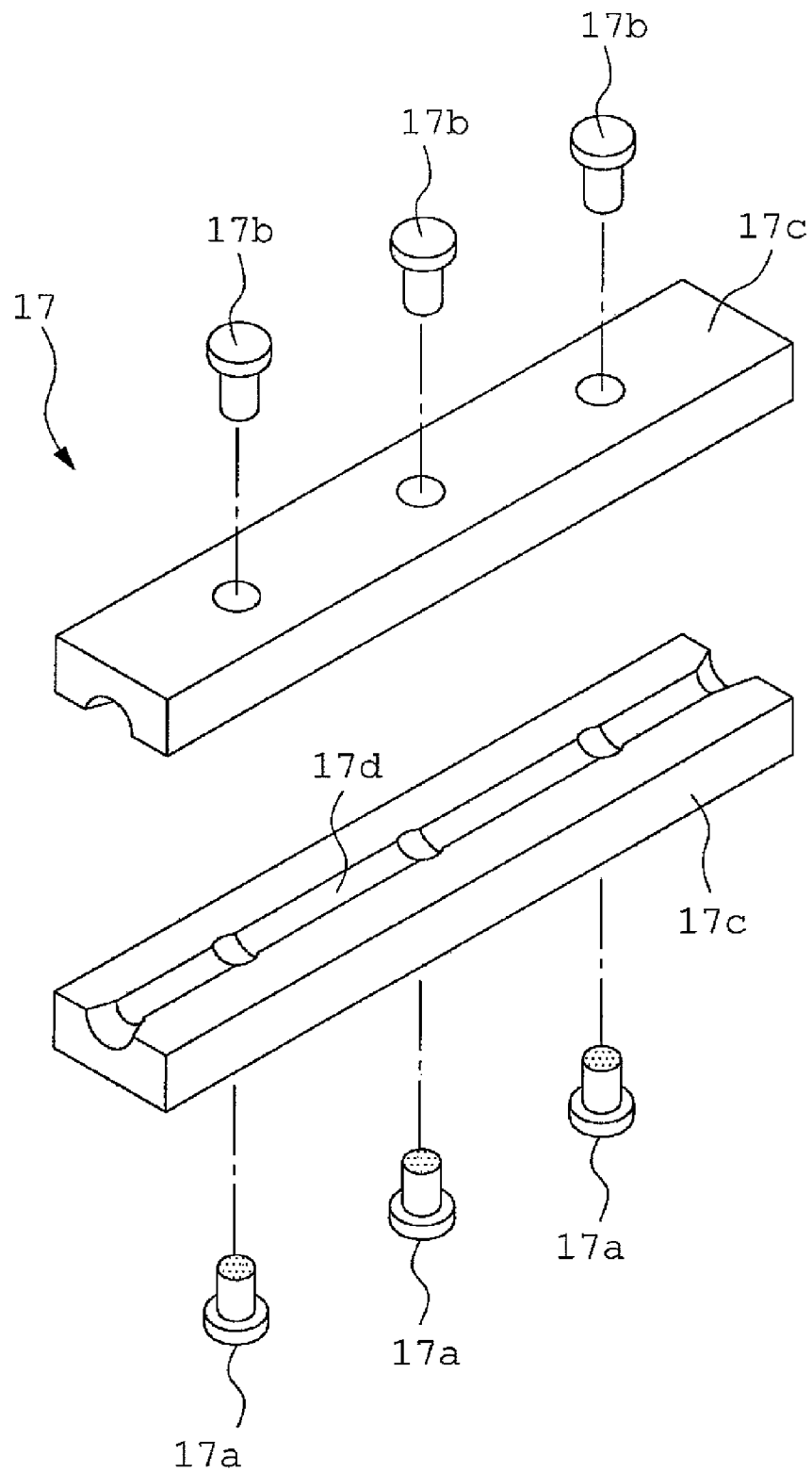

FIG. 24 is an exploded perspective view of an end surface grinding section.

Figure 25A:
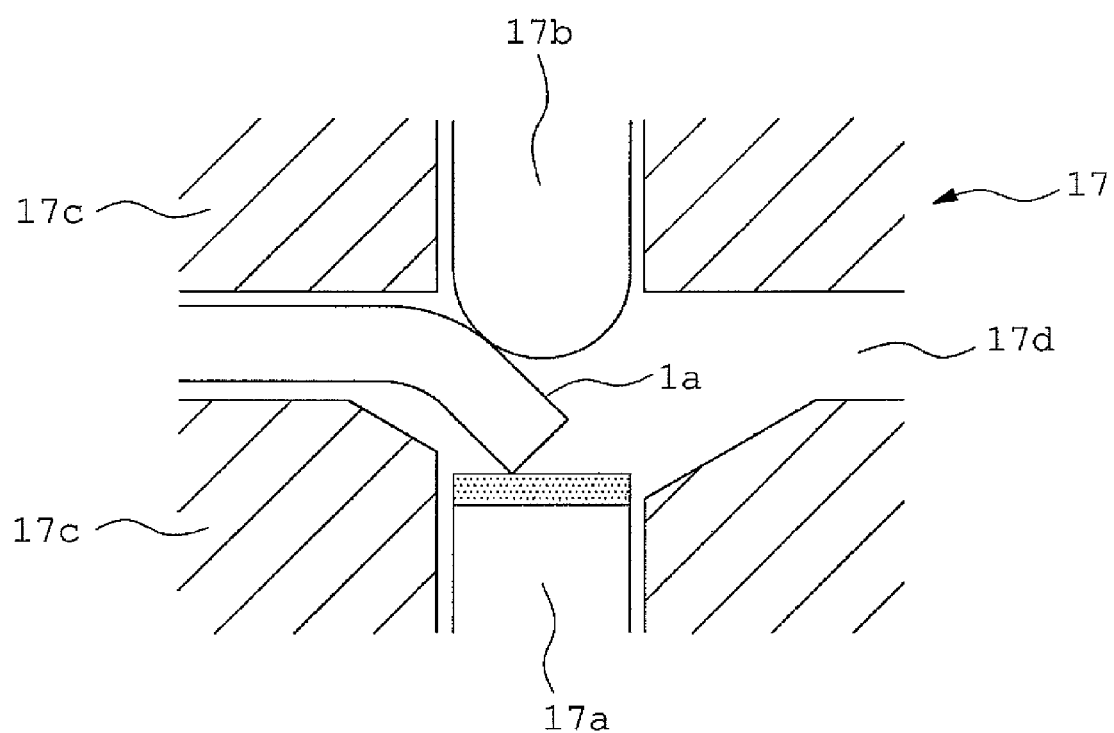

FIG. 25A is an enlarged side sectional view of a main portion of the end surface grinding section.

Figure 25B:
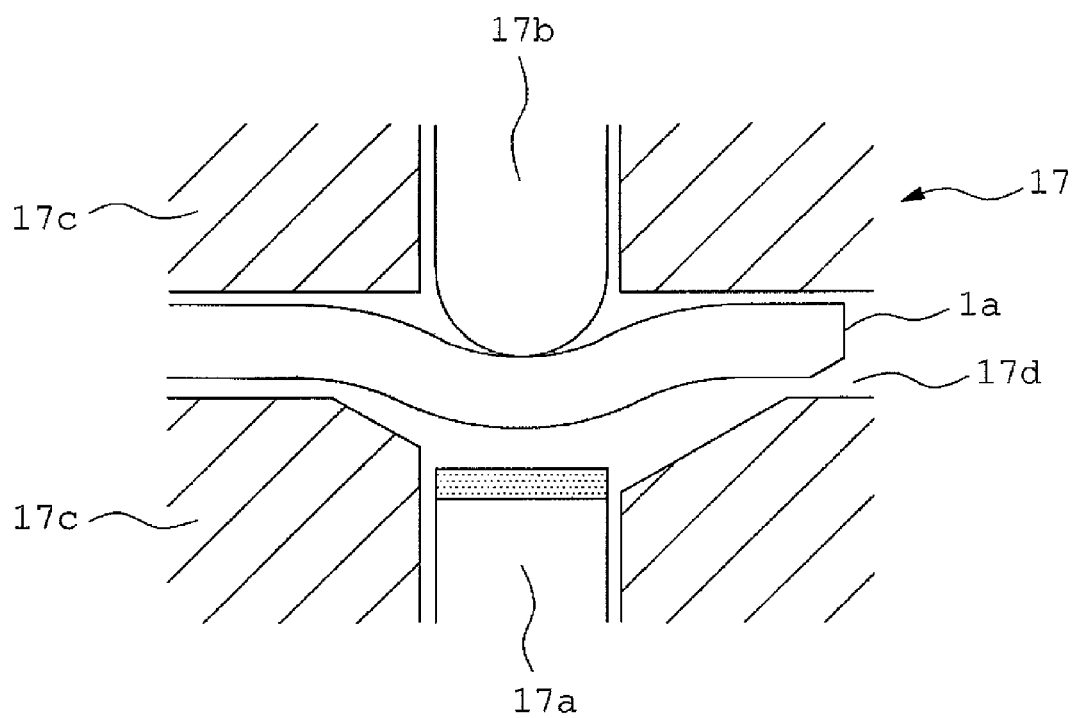

FIG. 25B is an enlarged side sectional view of the main portion of the end surface grinding section.

Figure 26A:
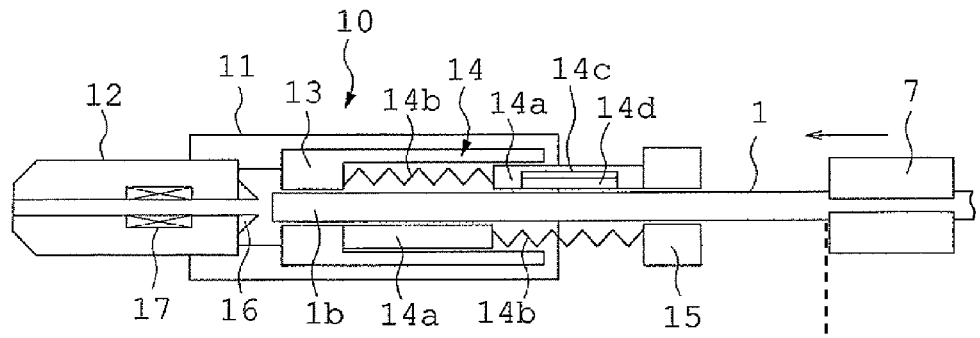

FIG. 26A is a side sectional view showing an assembly process of the optical connector.

Figure 26B:
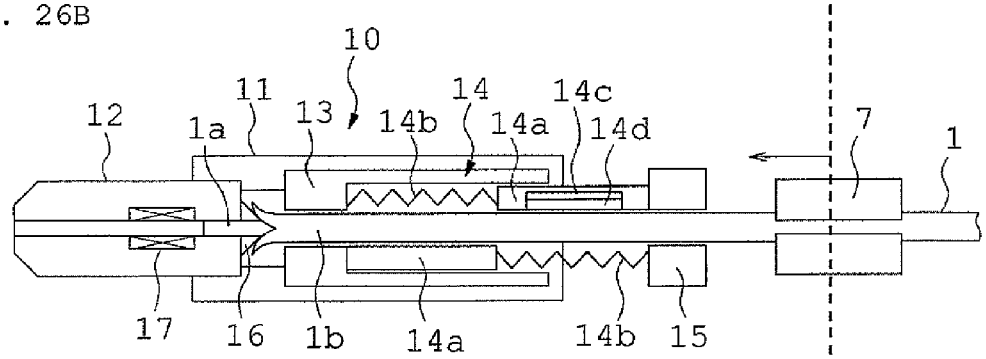

FIG. 26B is a side sectional view showing an assembly process of the optical connector.

Figure 26C:
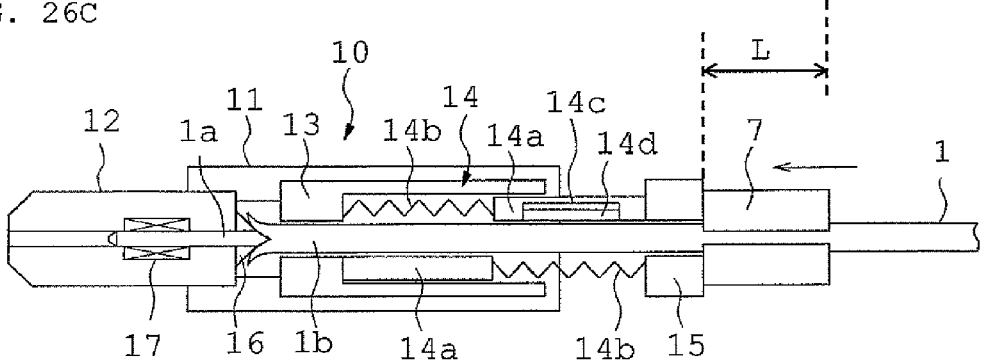

FIG. 26C is a side sectional view showing an assembly process of the optical connector.

Figure 27A:
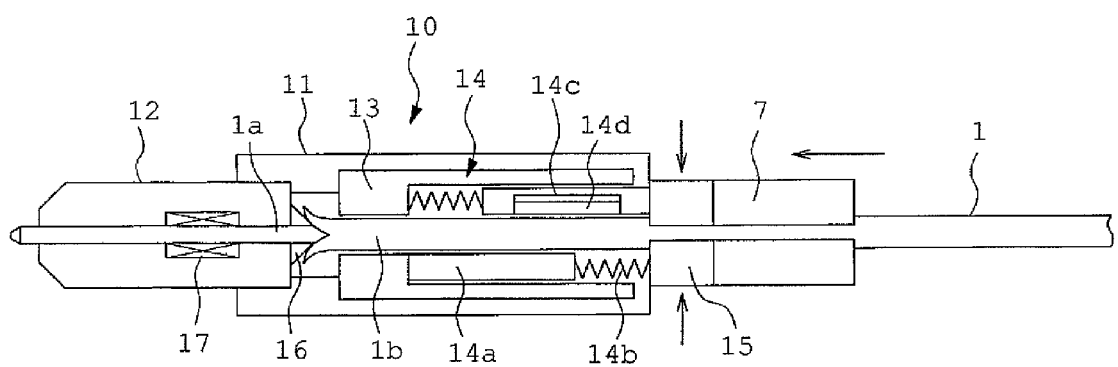

FIG. 27A is a side sectional view showing an assembly process of the optical connector.

Figure 27B:
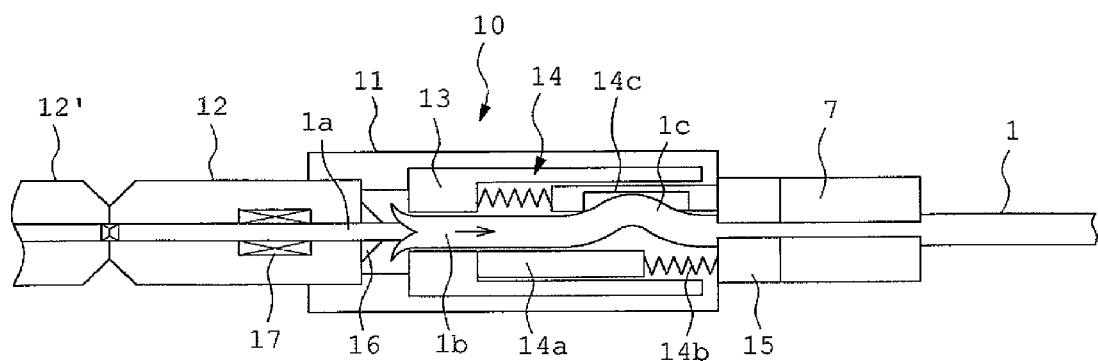

FIG. 27B is a side sectional view showing an assembly process of the optical connector.

Figure 28:
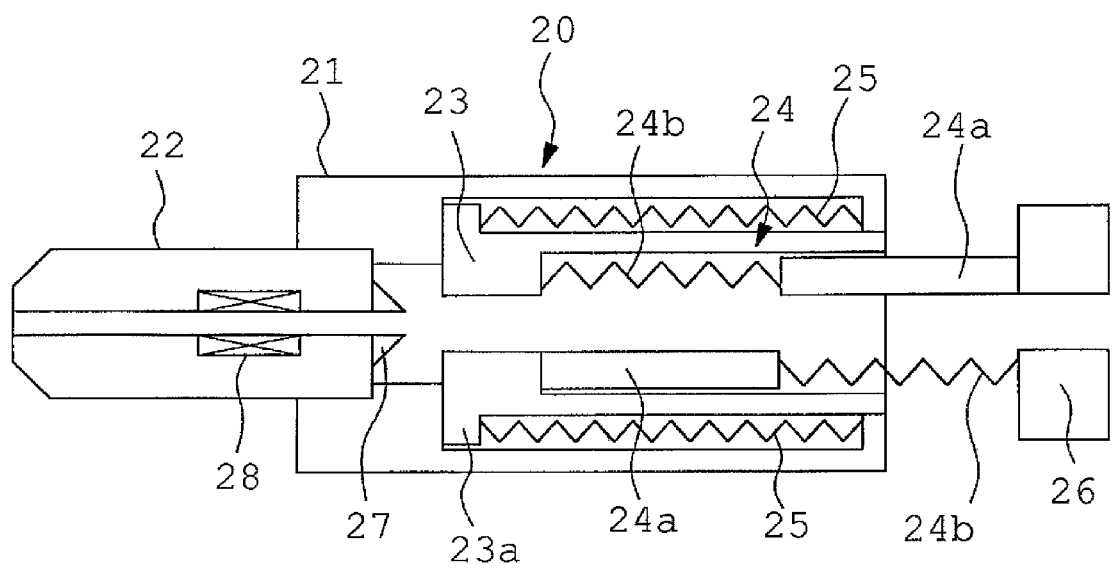

FIG. 28 is a side sectional view of an optical connector showing an eighth embodiment of the invention.

Figure 29A:
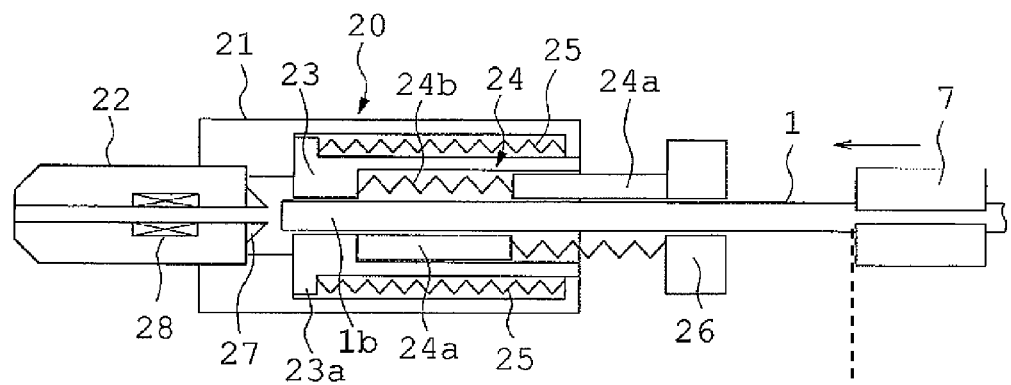

FIG. 29A is a side sectional view showing an assembly process of the optical connector.

Figure 29B:
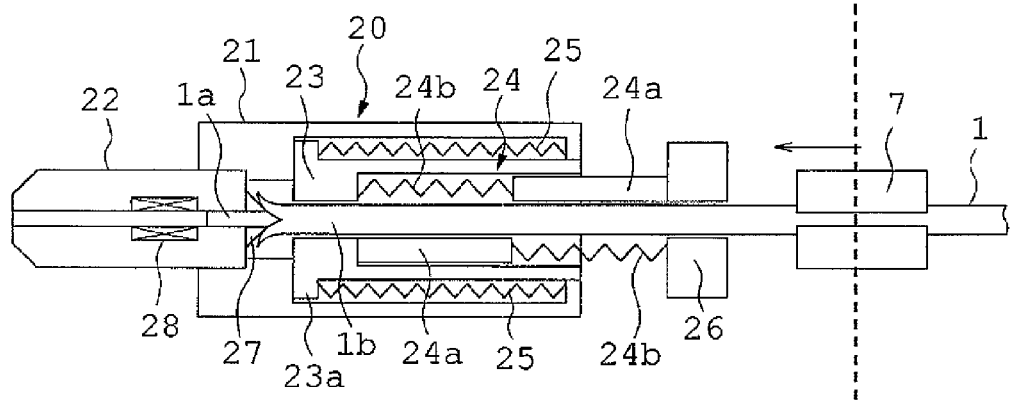

FIG. 29B is a side sectional view showing an assembly process of the optical connector.

Figure 29C:
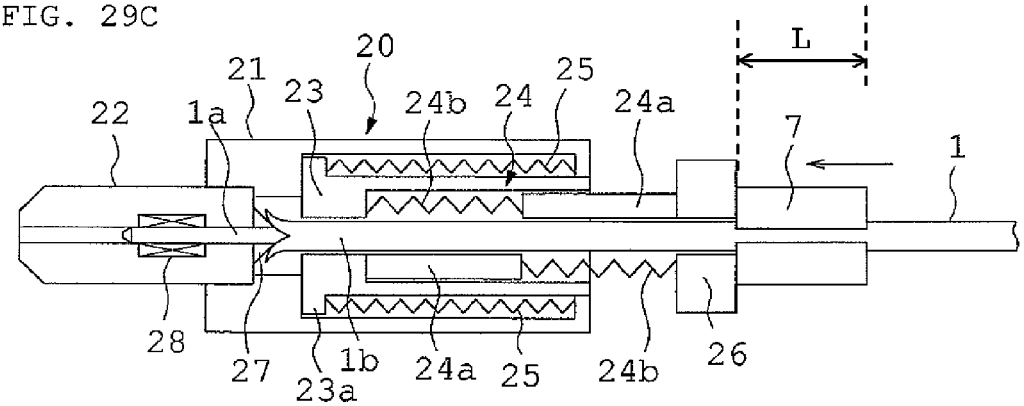

FIG. 29C is a side sectional view showing an assembly process of the optical connector.

Figure 30A:
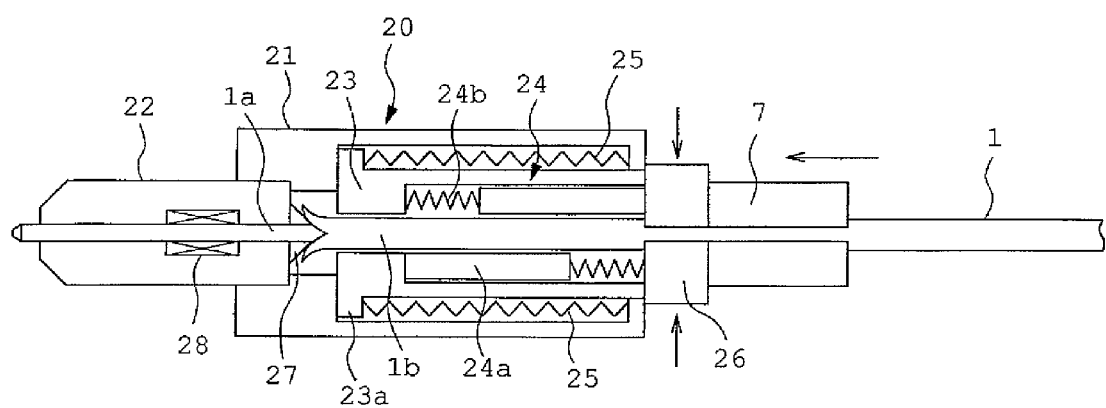

FIG. 30A is a side sectional view showing an assembly process of the optical connector.

Figure 30B:
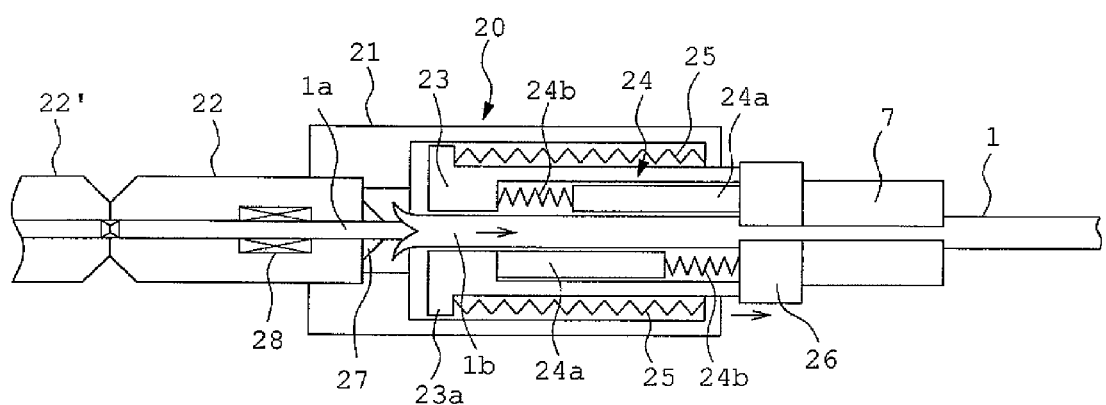

FIG. 30B is a side sectional view showing an assembly process of the optical connector.

Figure 31:
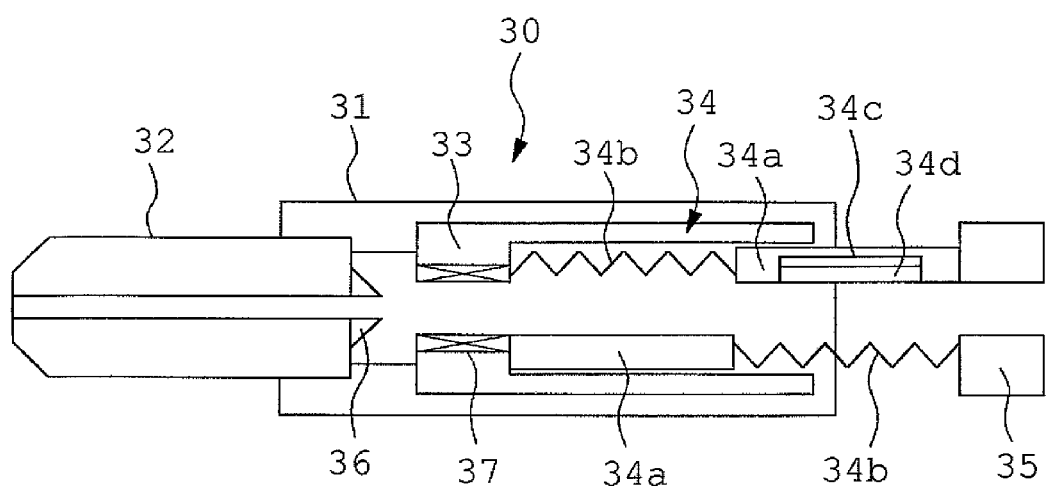

FIG. 31 is a side sectional view of an optical connector showing a ninth embodiment of the invention.

Figure 32A:
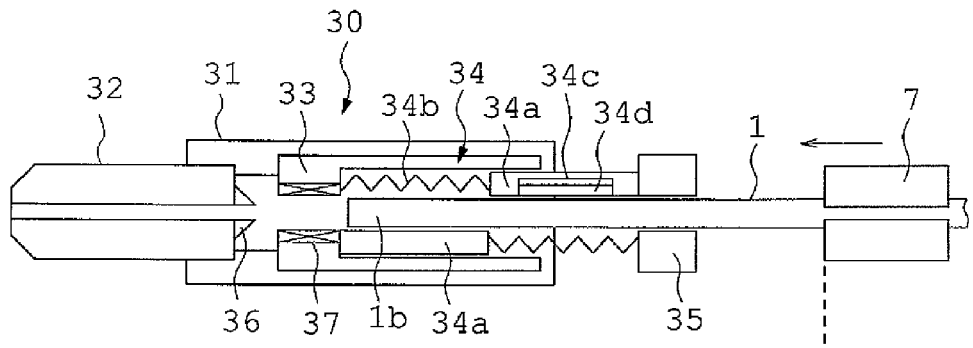

FIG. 32A is a side sectional view showing an assembly process of the optical connector.

Figure 32B:
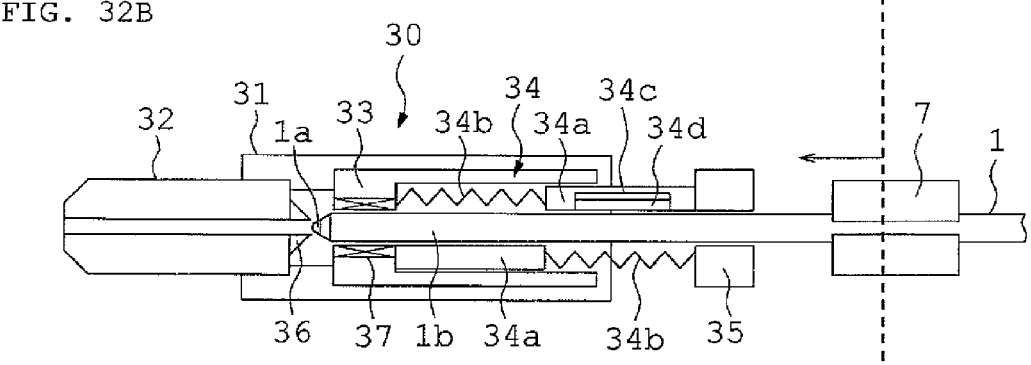

FIG. 32B is a side sectional view showing an assembly process of the optical connector.

Figure 32C:
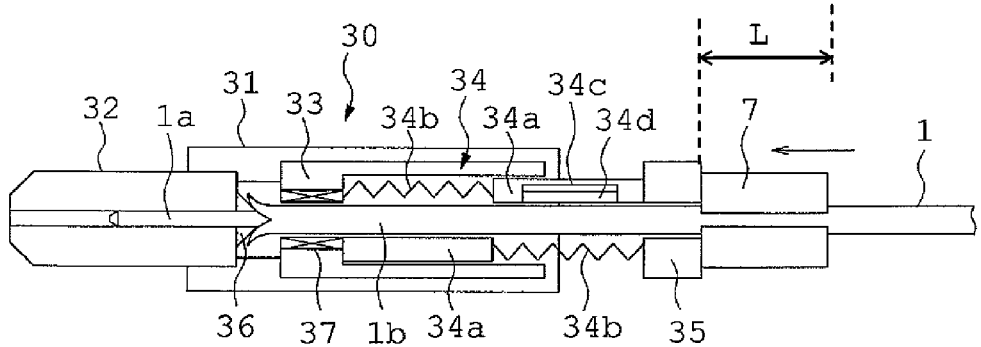

FIG. 32C is a side sectional view showing an assembly process of the optical connector.

Figure 33A:
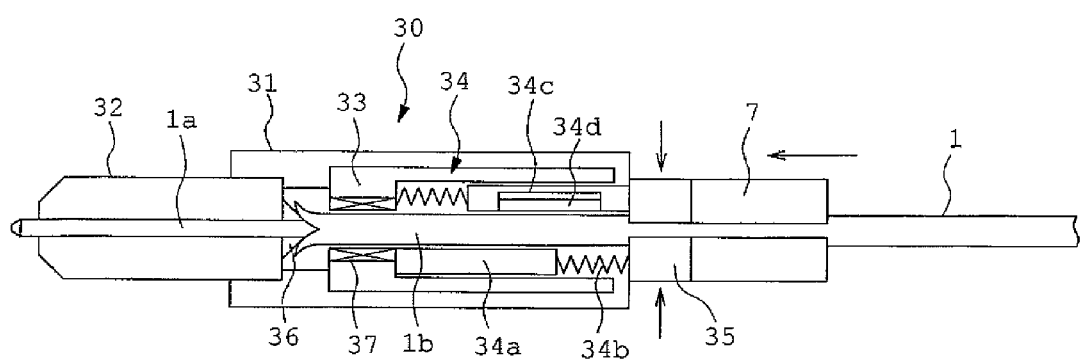

FIG. 33A is a side sectional view showing an assembly process of the optical connector.

Figure 33B:
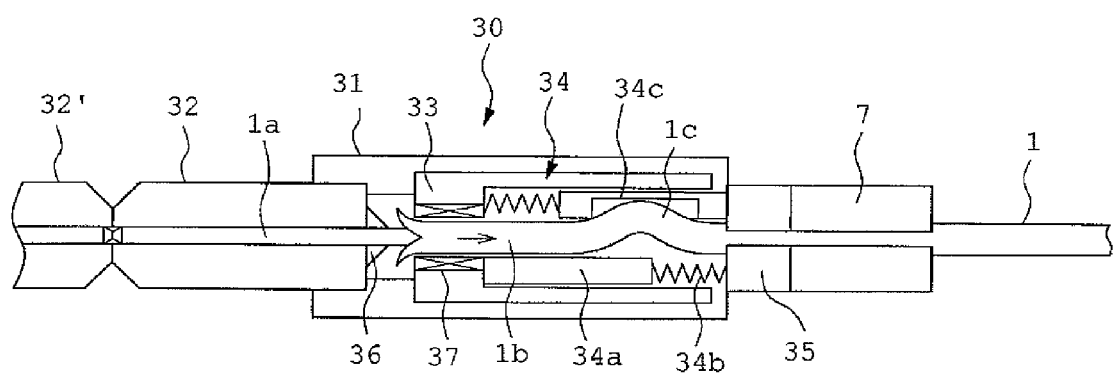

FIG. 33B is a side sectional view showing an assembly process of the optical connector.

Figure 34:
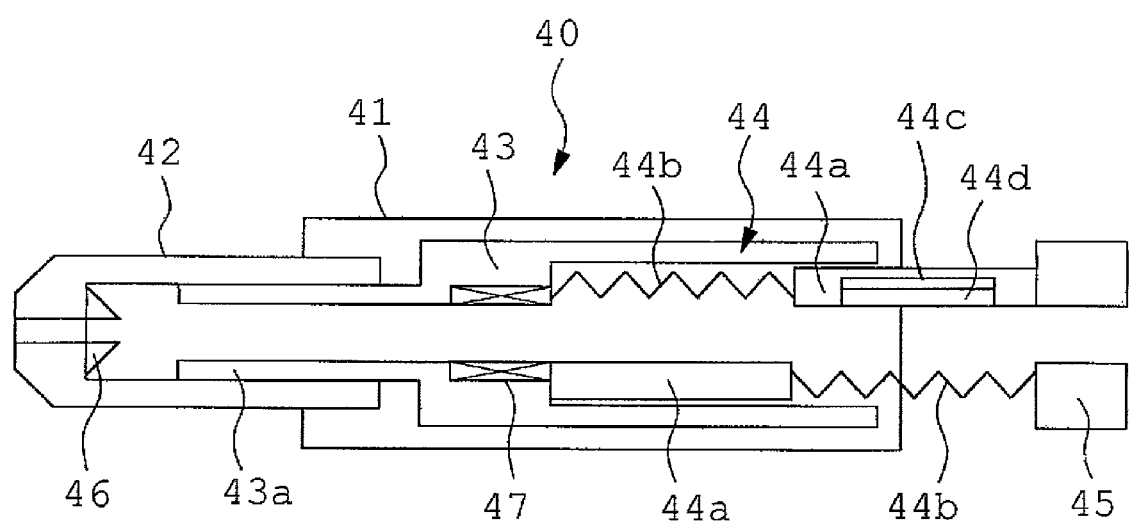

FIG. 34 is a side sectional view of an optical connector showing a tenth embodiment of the invention.

Figure 35A:
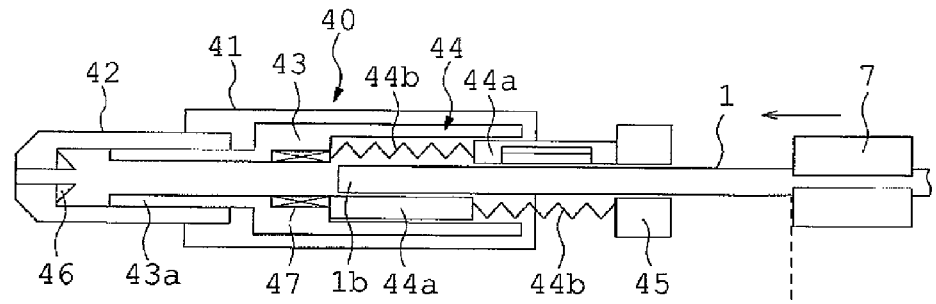

FIG. 35A is a side sectional view showing an assembly process of the optical connector.

Figure 35B:
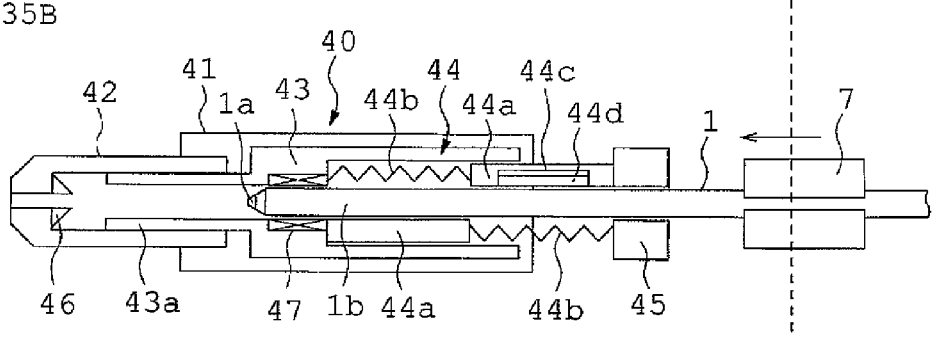

FIG. 35B is a side sectional view showing an assembly process of the optical connector.

Figure 35C:
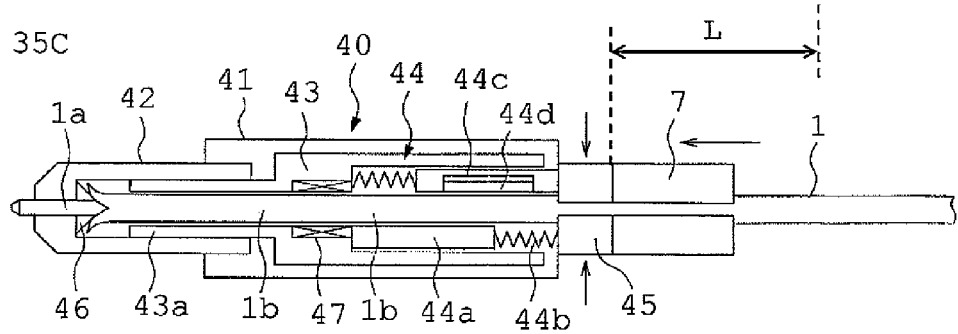

FIG. 35C is a side sectional view showing an assembly process of the optical connector.

Figure 35D:
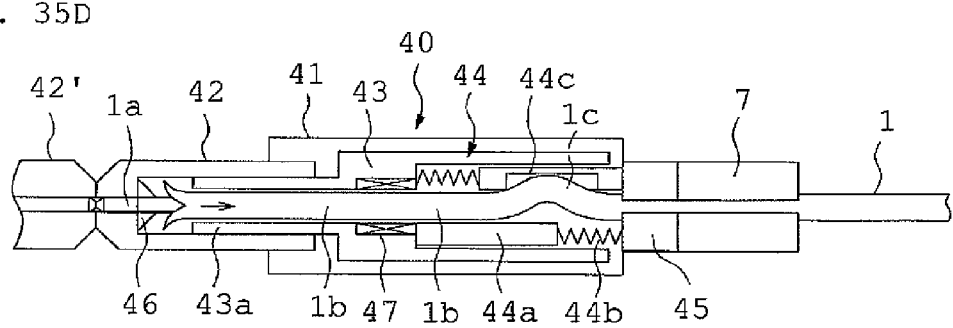

FIG. 35D is a side sectional view showing an assembly process of the optical connector.

Figure 36:
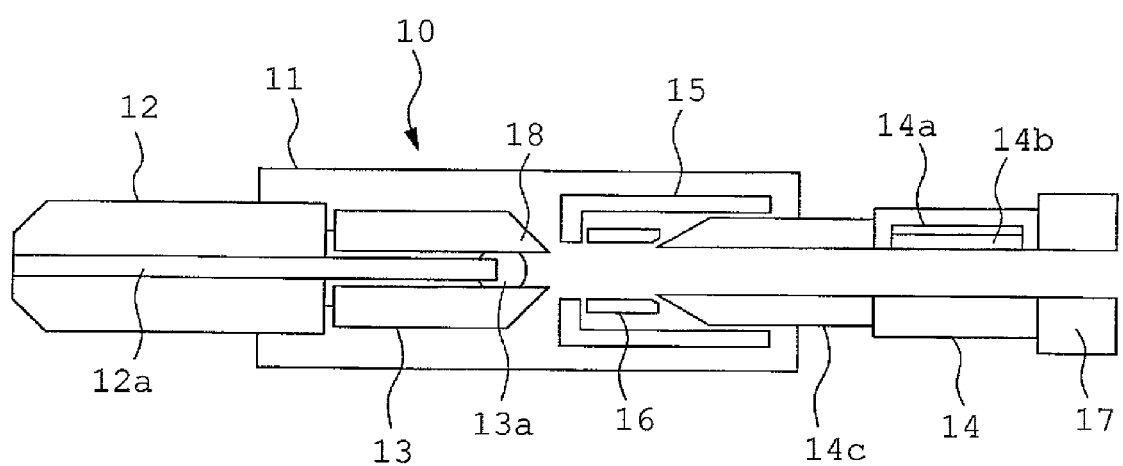

FIG. 36 is a side sectional view of an optical connector showing an eleventh embodiment of the invention.

Figure 37:
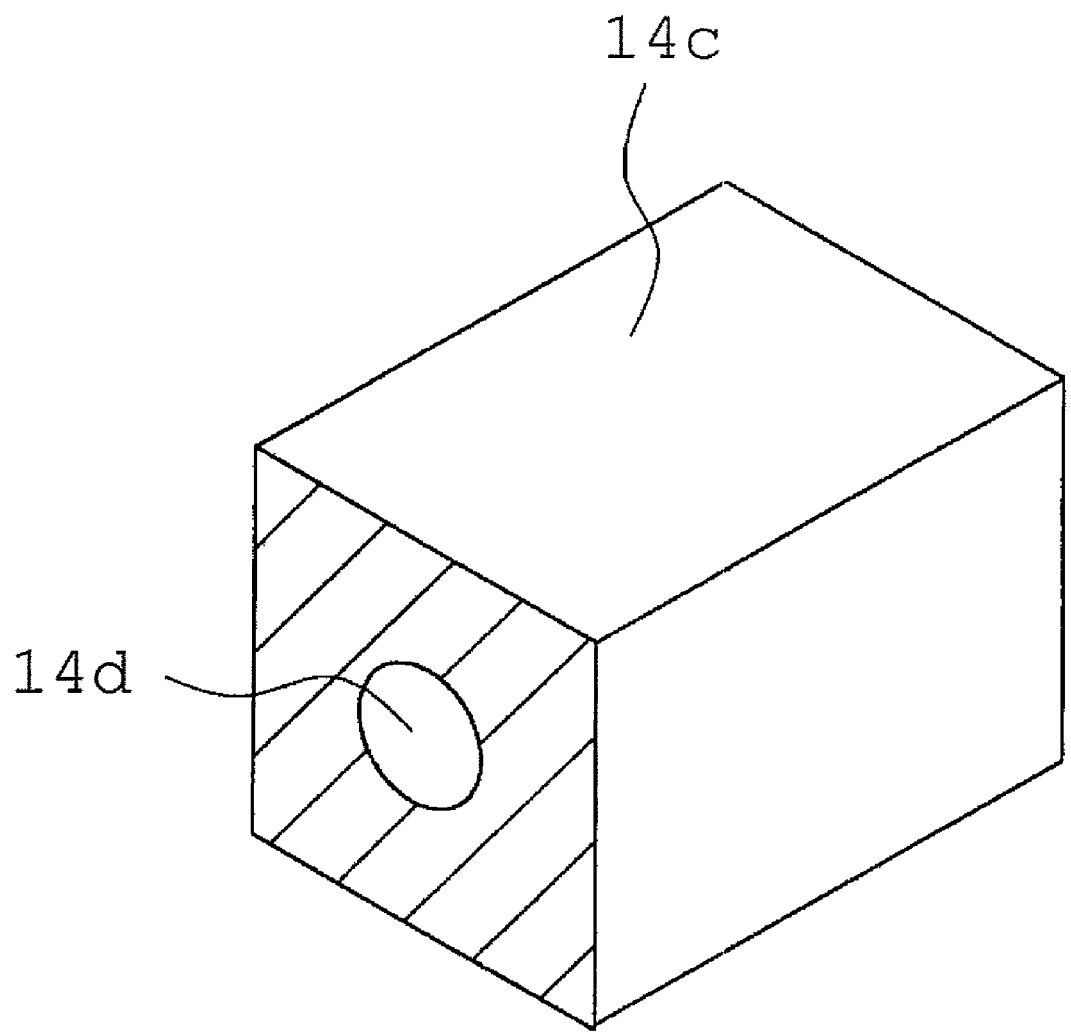

FIG. 37 is an exploded perspective view, partly in section of a guide section.

Figure 38A:
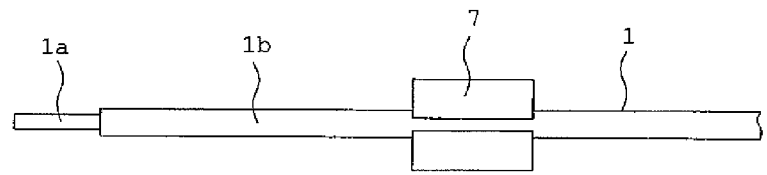

FIG. 38A is a side sectional view showing an assembly process of the optical connector.

Figure 38B:
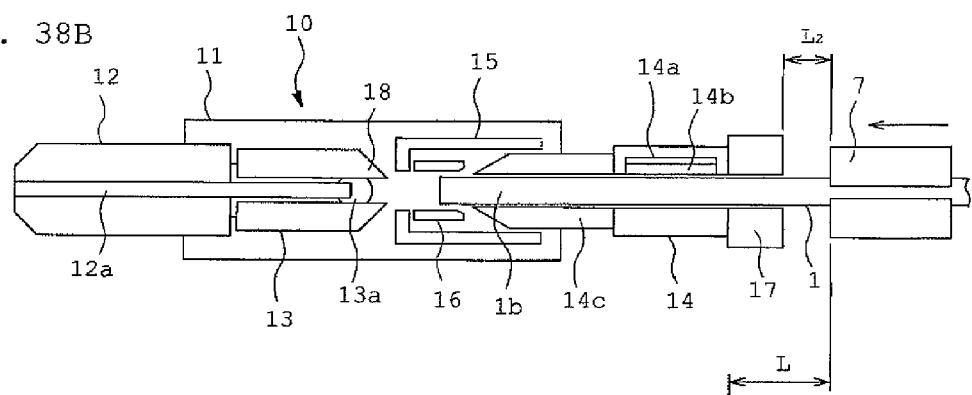

FIG. 38B is a side sectional view showing an assembly process of the optical connector.

Figure 38C:
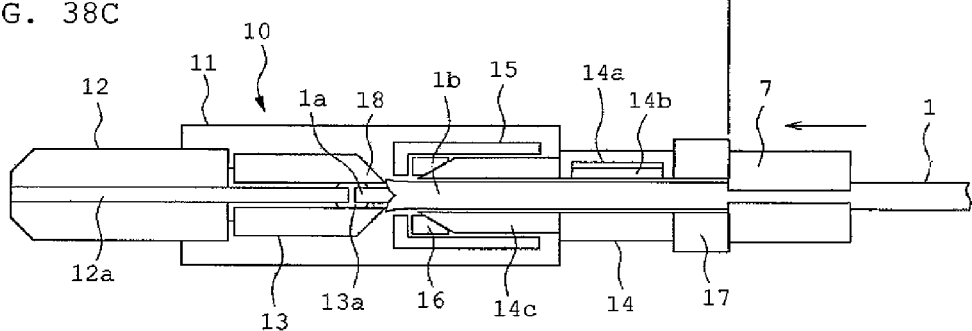

FIG. 38C is a side sectional view showing an assembly process of the optical connector.

Figure 38D:
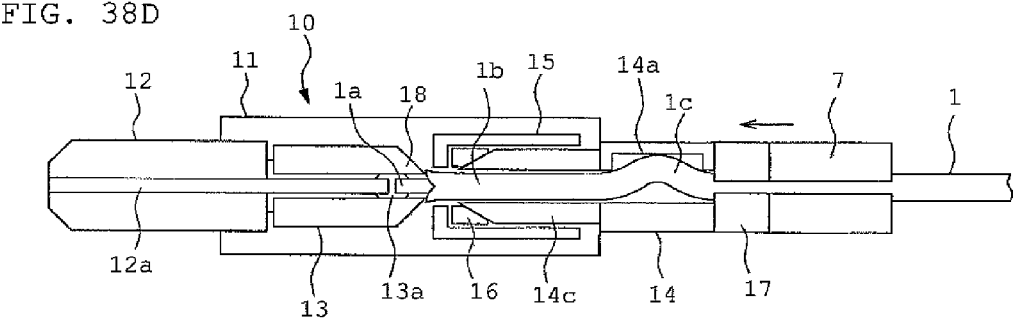

FIG. 38D is a side sectional view showing an assembly process of the optical connector.

Figure 39A:
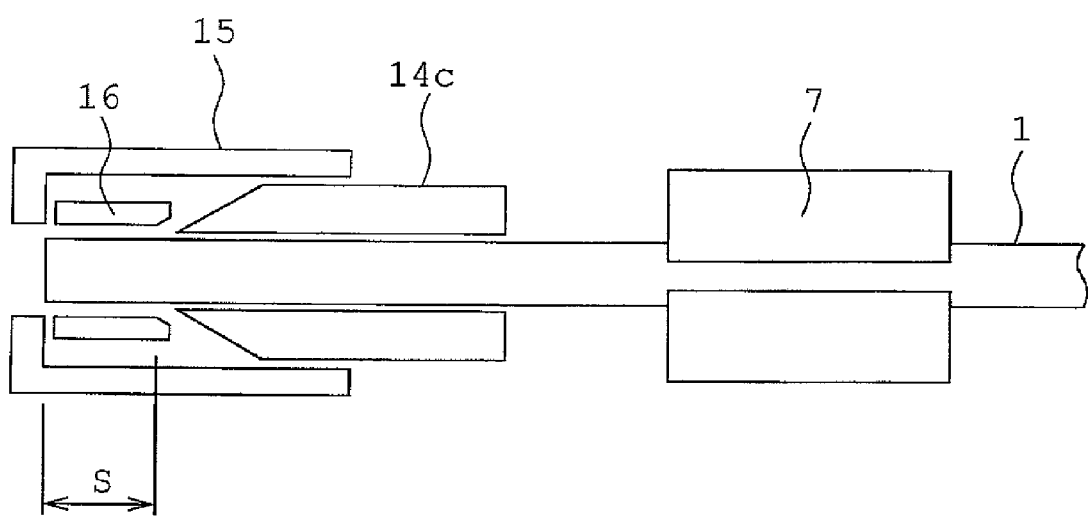

FIG. 39A is a side sectional view of a main portion showing an assembly process of the optical connector.

Figure 39B:
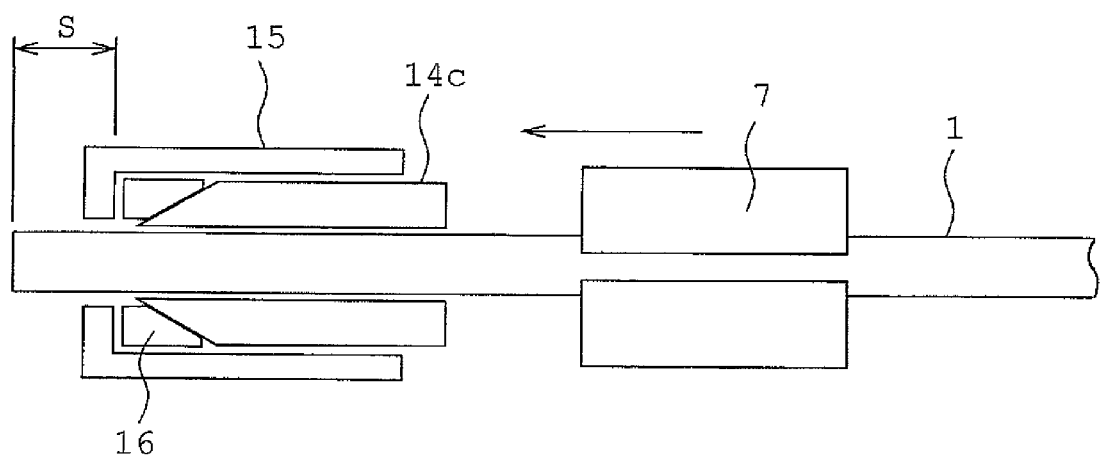

FIG. 39B is a side sectional view of the main portion showing an assembly process of the optical connector.

Figure 40:
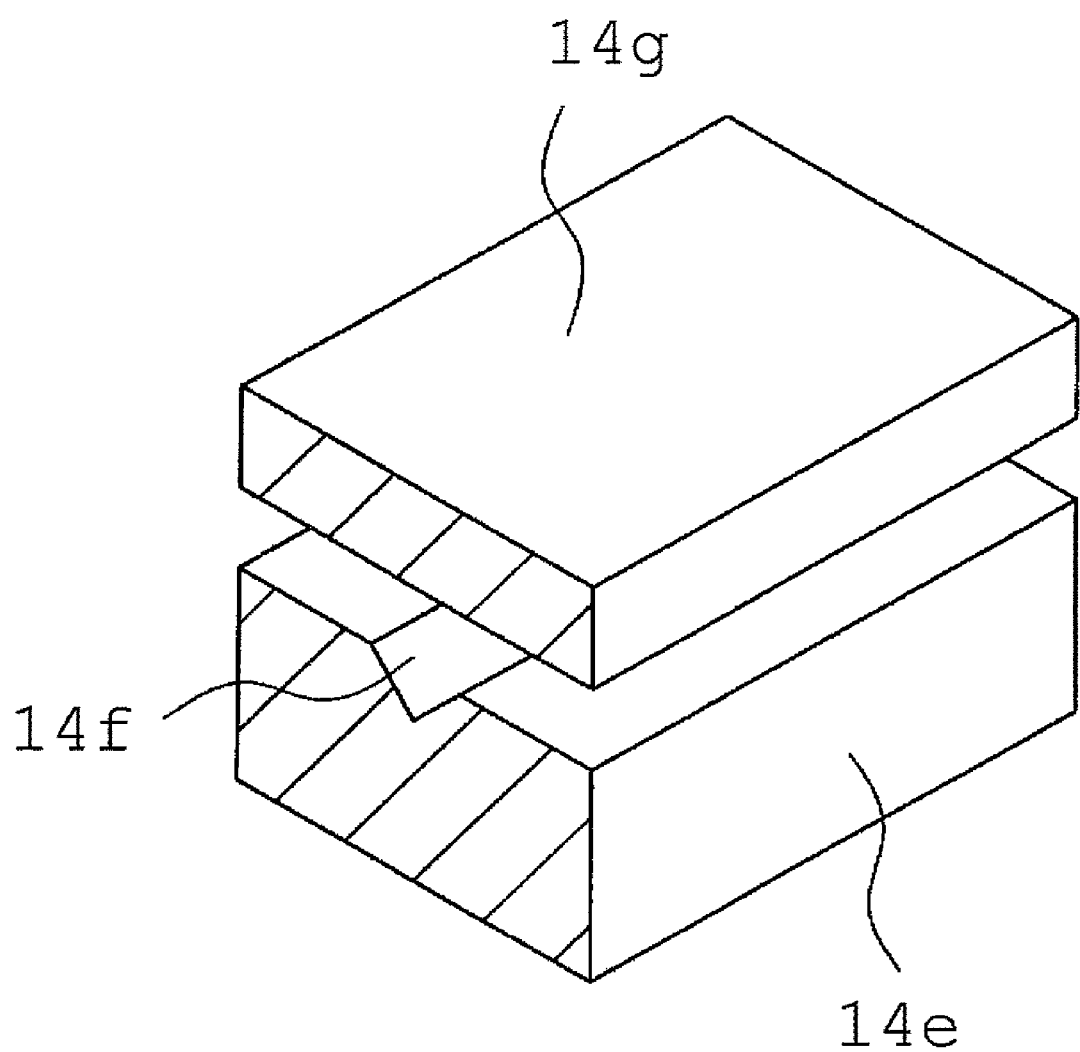

FIG. 40 is an exploded perspective view, partly in section showing a modification of the guide section.

Figure 41:
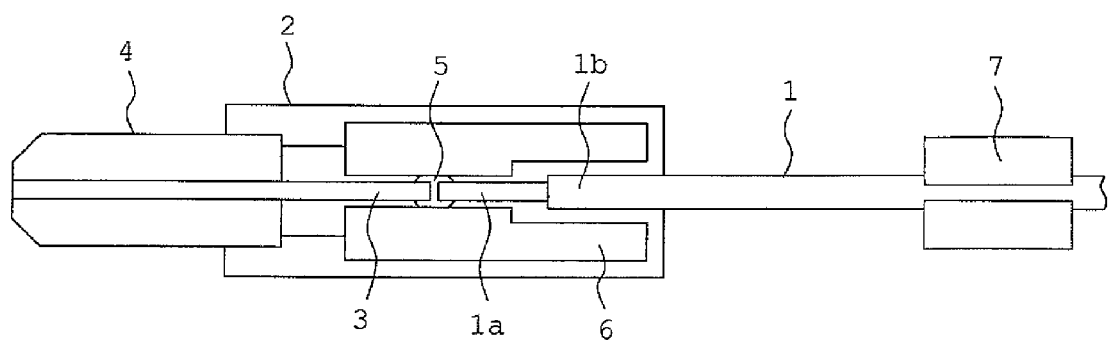

FIG. 41 is a side sectional view of an optical connector showing a conventional example.

Figure 42:
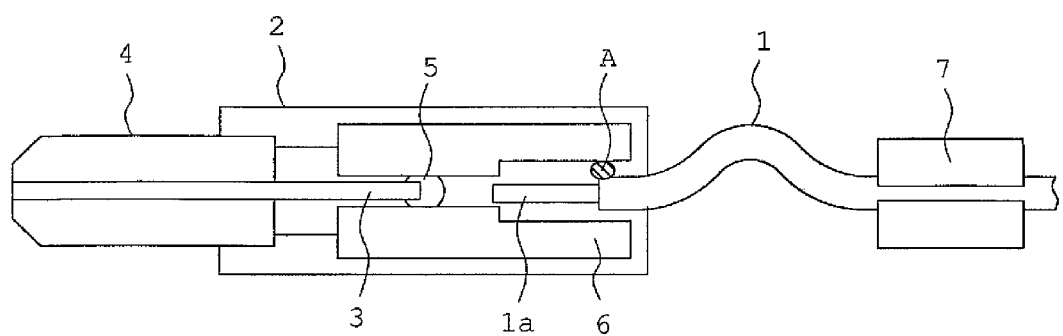

FIG. 42 is a side sectional view of an optical connector showing a conventional example.

Figure 43A:
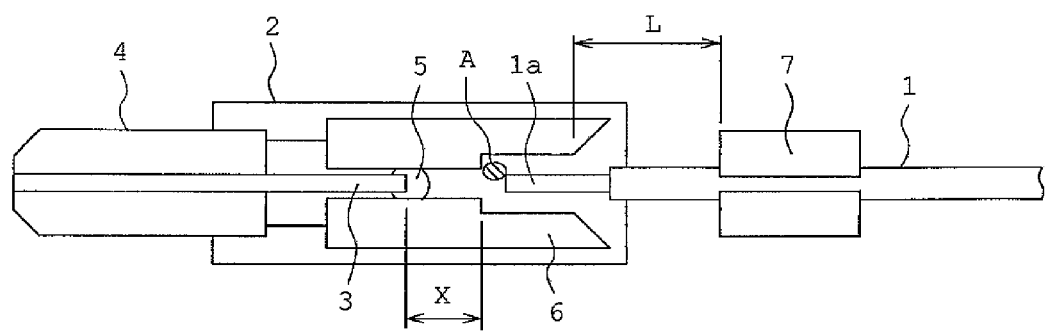

FIG. 43A is a side sectional view of an optical connector showing a conventional example.

Figure 43B:
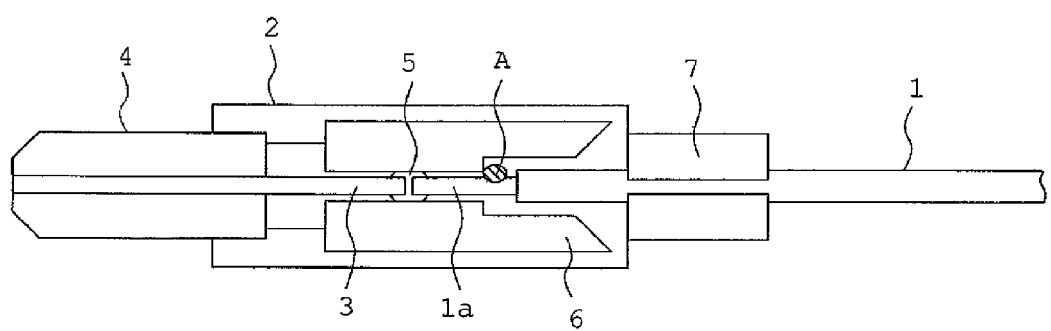

FIG. 43B is a side sectional view of the optical connector showing the conventional example.

Figure 44:
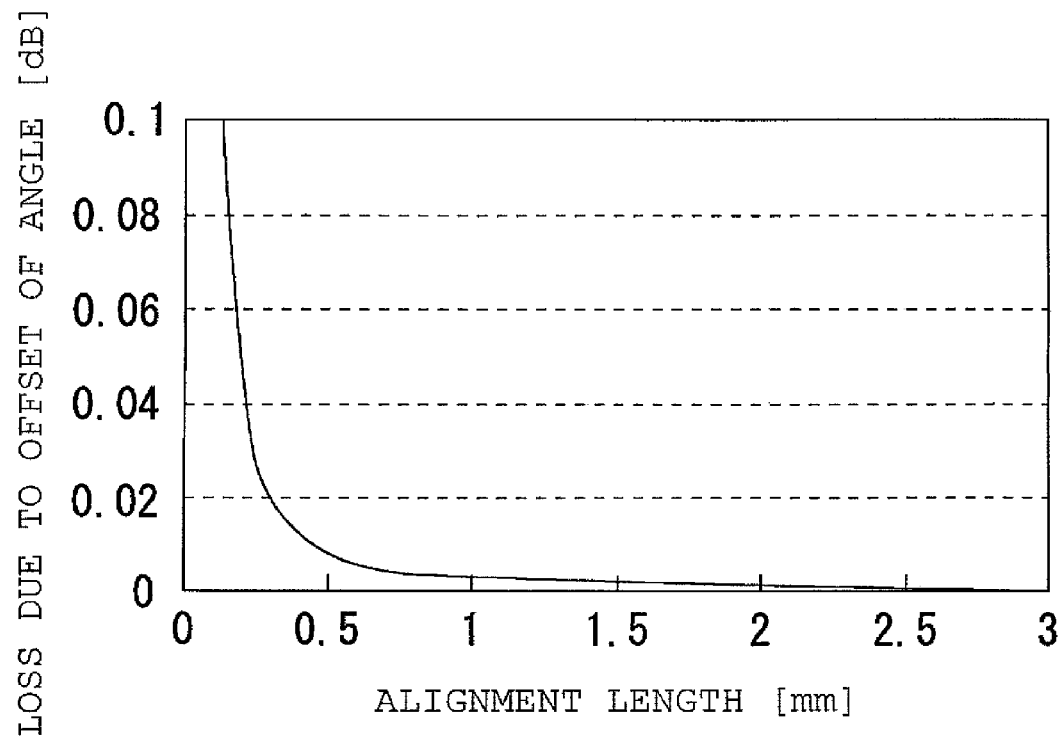

FIG. 44 is a graph showing the relation between a loss due to an angle offset and an alignment length.

Figure 45A:
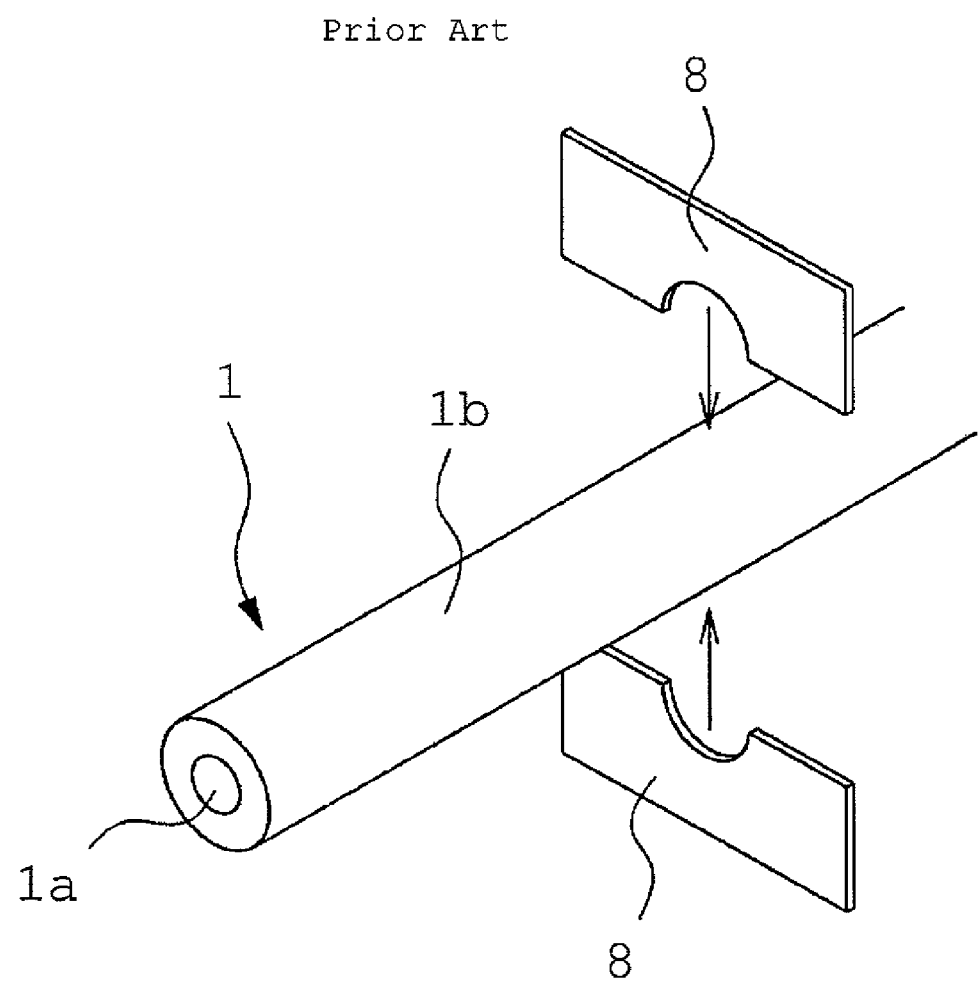

FIG. 45A is a perspective view showing a conventional coating removing method.

Figure 45B:
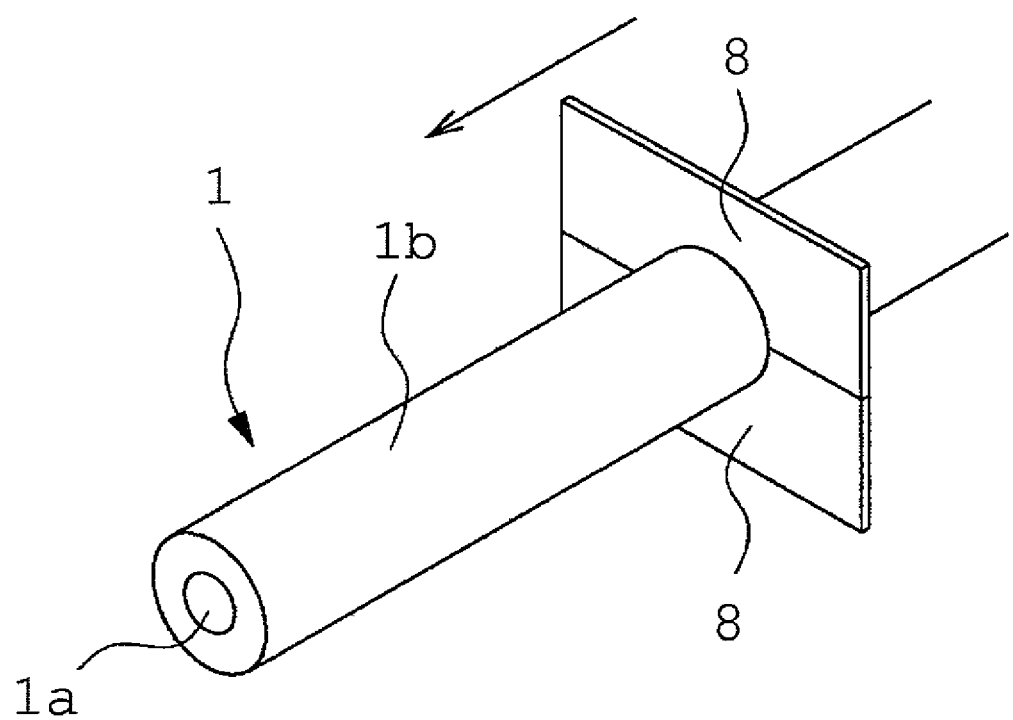

FIG. 45B is a perspective view showing the conventional coating removing method.

Figure 45C:
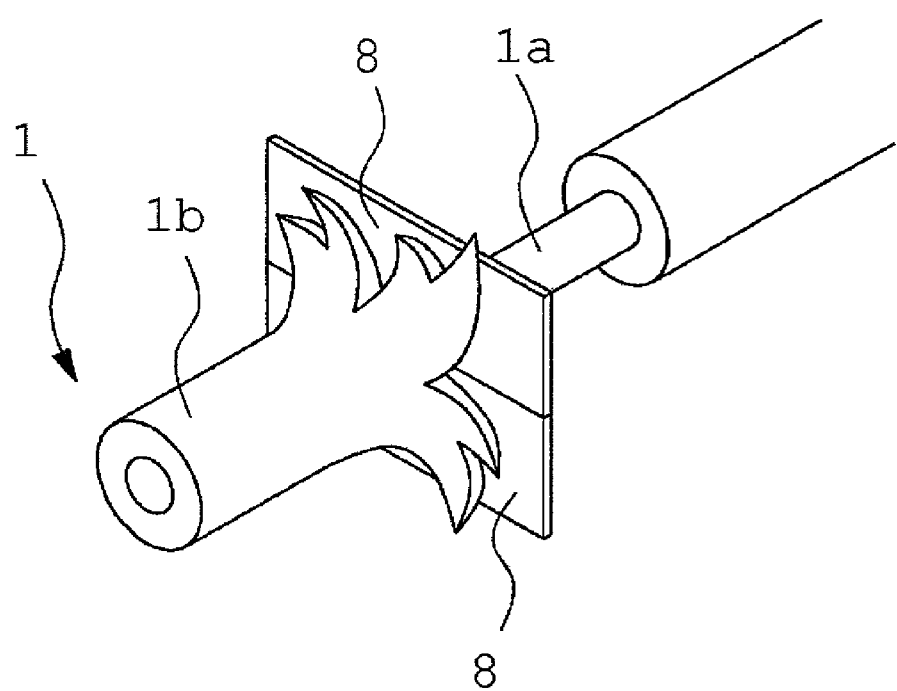

FIG. 45C is a perspective view showing the conventional coating removing method.

Figure 46A:
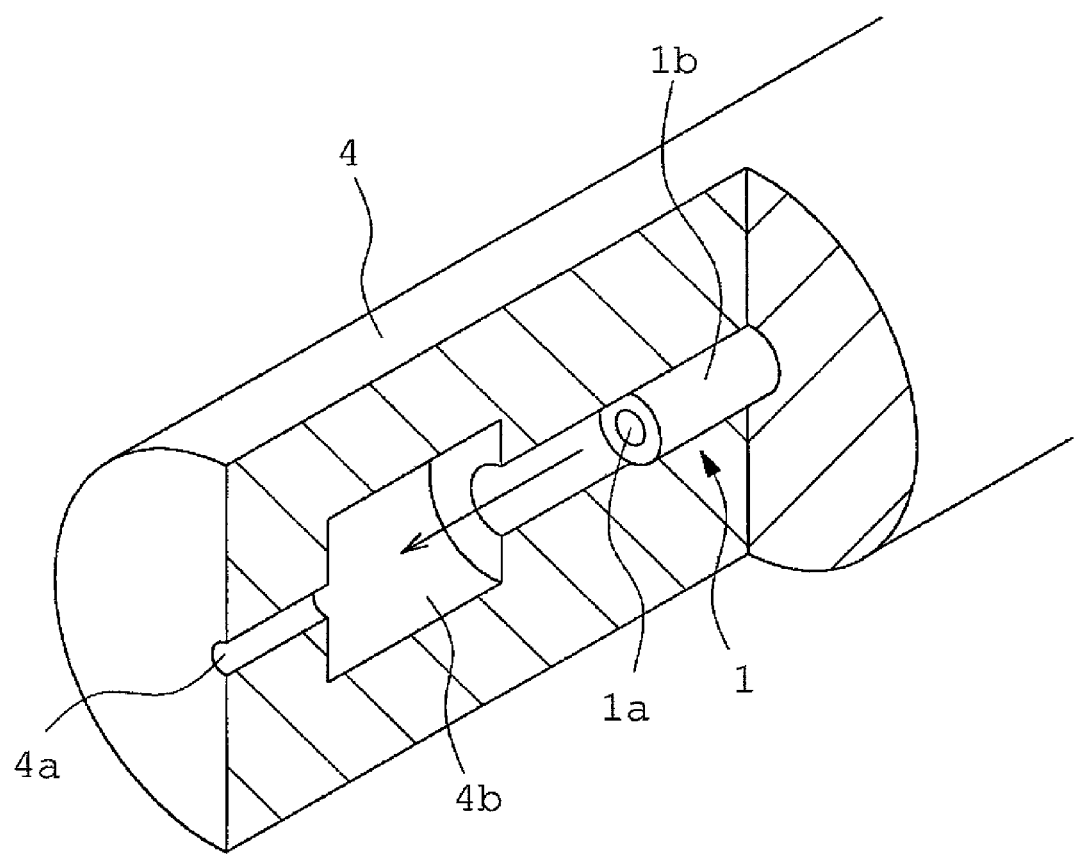

FIG. 46A is a perspective view, partly in section of an optical connector showing a conventional coating removing section.

Figure 46B:
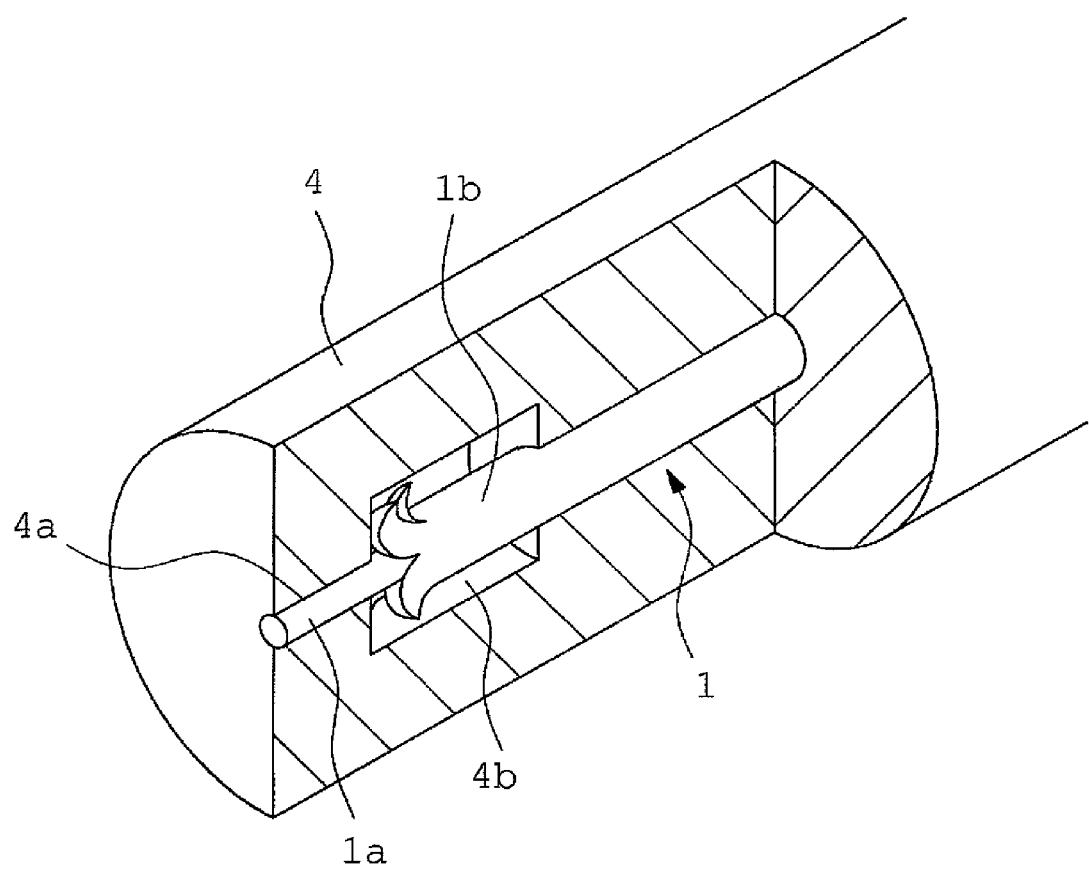

FIG. 46B is a perspective view, partly in section of the optical connector showing the conventional coating removing section.

Figure 47:
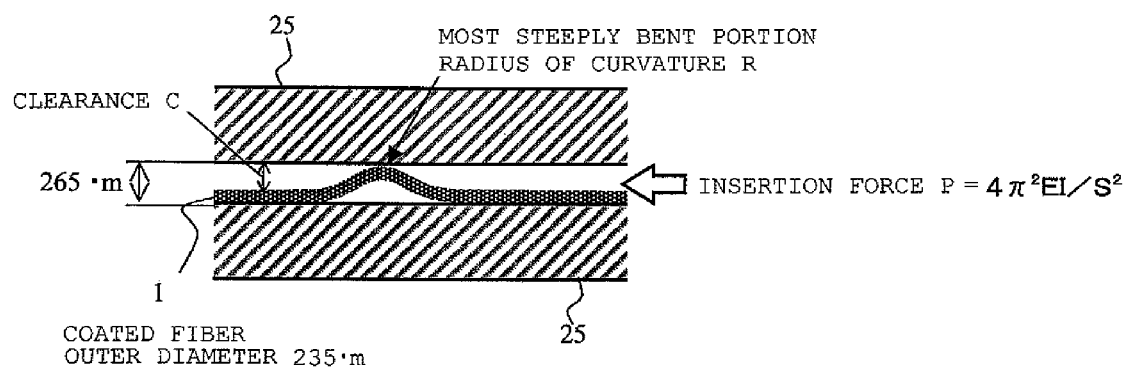
Figure 48:
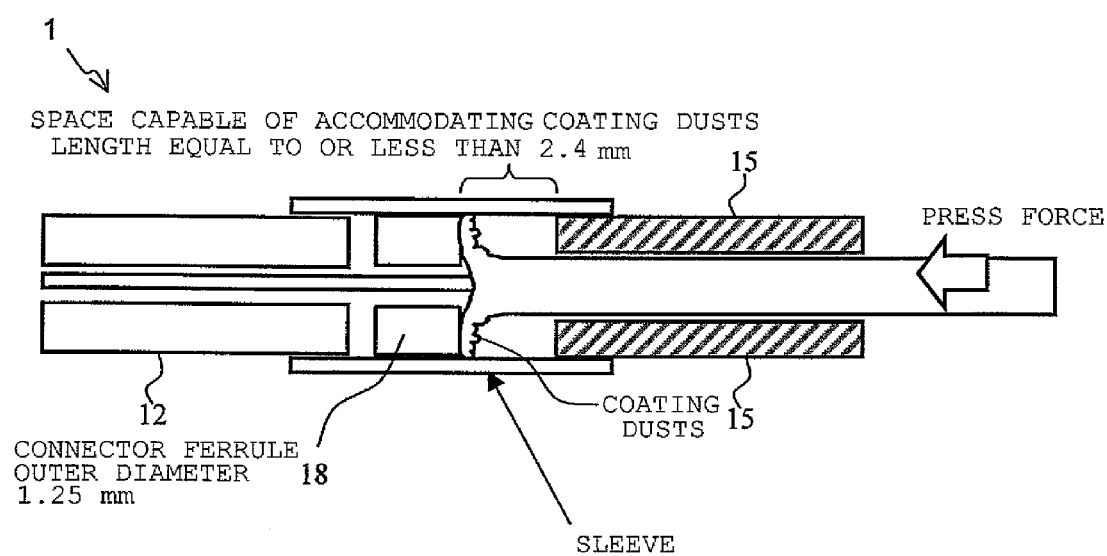

FIG. 47 is a side sectional view of an optical connector.
FIG. 48 is a side sectional view of an optical connector.

DETAILED DESCRIPTION OF THE PREFERRED EMBODIMENT

Embodiments of the invention will be explained referring to the attached drawings. The embodiments explained below are examples of the invention, and the invention is not limited by the following embodiments. Note that it is assumed that components having the same reference numerals in the specification and the drawings show components which are the same with each other.

First Embodiment

FIG. 1 to FIG. 3D show a first embodiment of the invention, and an optical connector 10 shown in the drawings connects an optical fiber 1 to a partner side connector.

The optical connector 10 includes a connector main body 11 into which the optical fiber 1 is inserted, a ferrule 12 attached to one end side of the connector main body 11, a first fiber guide 13 fixed in the connector main body 11, a second fiber guide 14 disposed movably to the connector main body 11, a buckling regulating section 15 for regulating a buckling of the optical fiber 1 inserted into the connector main body 11, and a fixing member 16 for fixing the optical fiber 1.

The connector main body 11 is formed so as to be inserted with the optical fiber 1 composed of, for example, a bare fiber 1a having an outer diameter of 125 μm and a coating 1b having an outer diameter of 250 μm and so as to be engageable with a partner side connector.

The ferrule 12 includes a hole, which has an inner diameter approximately the same as the outer diameter of the bare fiber 1a from which the coating is removed, at a center in a radial direction, and a built-in fiber 12a is inserted into the hole. The built-in fiber 12a disposes one end surface to an extreme end surface of the ferrule 12 and the end surface is subjected to a polishing preparation so as to be made to a flat surface so that the end surface can optically communicate with an optical fiber of the partner side connector. Further, the other end side of the built-in fiber 12a projects from an end surface of the ferrule 12 into the first fiber guide 13.

The first fiber guide 13 is fixed in the connector main body 11 and is formed so as to position the optical fiber 1 coaxially with the ferrule 12 by a V-shaped groove or a circular hole. The other end side of the built-in fiber 12a is inserted to one end side of the first fiber guide 13 so that the built-in fiber 12a is butted against the optical fiber 1 via an index matching oil 13a. Further, an inner diameter of the other end side of the first fiber guide 13 is formed larger than the one end side so that the buckling regulating section 15 can be disposed between an inner peripheral surface of the other end side and the optical fiber 1.

The second fiber guide 14 is formed so that the optical fiber 1 can be inserted therein and is disposed to the other end side of the connector main body 11 so as to be free to move in an axial direction of the optical fiber 1. Further, the second fiber guide 14 is fixed to the other end of the connector main body 11 after the optical fiber 1 is inserted. A buckling receiving section 14a capable of receiving a buckling portion of the optical fiber 1 is disposed in the second fiber guide 14, and the buckling receiving section 14a is closed by a detachable lid member 14b. That is, a buckling portion generated by forcibly pushing the optical fiber 1 can be received in the buckling receiving section 14a by removing the lid member 14b.

The buckling regulating section 15 is composed of a cylindrical fixed guide section 15a into which the optical fiber 1 can be inserted and movable guide sections 15b as movable members which are composed of plural ring-shaped members and into which the optical fiber 1 can be inserted, and the fixed guide section 15a is fixed to one end of the second fiber guide 14. The movable guide sections 15b are interposed between the fixed guide section 15a and the first fiber guide 13, and the respective ring-shaped members of the movable guide sections 15b are disposed each other at intervals S in the axial direction of the optical fiber 1. That is, in the buckling regulating section 15, when the second fiber guide 14 is moved to the connector main body 11 side, the respective ring-shaped members of the movable guide sections 15b approach with each other so that an overall length of the buckling regulating section 15 becomes short.

The fixing member 16 is disposed to the other end side of the second fiber guide 14 and is formed so as to fix the optical fiber 1 by tightening the inserted optical fiber 1.

Next, an assembly method of the optical connector 10 will be explained referring to FIG. 3A, FIG. 3B, FIG. 3C and FIG. 3D.

First, as shown in FIG. 3A, the optical fiber 1, from which the coating 1b on the extreme end side has been previously removed, is held by the fiber holder 7, and the optical fiber 1 is inserted into the second fiber guide 14 as shown in FIG. 3B. The optical fiber 1 inserted into the second fiber guide 14 is inserted into the first fiber guide 13 by inserting the buckling regulating section 15 as shown in FIG. 3C, and an extreme end side of the bare fiber 1a is butted against the built-in fiber 12a via the index matching oil 13a. The fiber holder 7 is abutted against the fixing member 16 when the optical fiber 1 is inserted. Since the fixing member 16, the second fiber guide 14, and the movable guide sections 15b are integrated, when the optical fiber 1 is inserted, they are forcibly pushed in an inside direction of the connector by the fiber holder 7. At the time, an insertion area L of a predetermined length is secured between the first fiber guide 13 and the second fiber guide 14 by the movable guide sections 15b of the buckling regulating section 15, and the buckling of the optical fiber 1 is regulated by the fixed guide section 15a and the movable guide sections 15b while the movable guide sections 15b become short in the insertion direction of the optical fiber 1 in the buckling regulating section 15. Further, since the buckling receiving section 14a of the second fiber guide 14 has been closed by the lid member 14b, no buckling of the optical fiber 1 is generated by the buckling receiving section 14a. Next, after the optical fiber 1 is butted against the built-in fiber 12a in the first fiber guide 13, as shown in FIG. 3D, the lid member 14b is removed from the second fiber guide 14, and the optical fiber 1 is further forcibly pushed into the connector main body 11 and the second fiber guide 14 is fixed to the connector main body 11 as well as a rear end side of the optical fiber 1 is fixed by the fixing member 16. With the operation, although a buckling portion 1c is generated to the optical fiber 1 in the second fiber guide 14, the buckling portion 1c is received in the buckling receiving section 14a, and an end surface of the optical fiber 1 is pressed to an end surface of the built-in fiber 12a by a restoring force of the buckling portion 1c.

The insertion area L and the insertion force P when the fiber is inserted are determined by the intervals S and a number N of the respective ring-shaped members of the movable guide sections 15b. That is, the insertion area L is shown as follows.

$$L = S \times N \qquad (2)$$

The insertion force P is shown as follows likewise Expression (1).

$$P = 4\pi^2 EI/L^2 \qquad (3)$$

That is, although an ordinary ferrule length of an optical connector is 8-10 mm (refer to, for example, JIS C 5973, "F04 type optical fiber connector"), when an optical connector is assembled using a ferrule of the length, it is necessary to project an optical fiber 8-10 mm or more. Thus, when the insertion area L is set to 10 mm or more, N≥5 is necessary when S=2 mm. From what is described above, when S=2 mm and N=5, since a maximum insertion force of about 8.4 N and the insertion area L of 10 mm can be secured, both the insertion force and the insertion area can be made larger than limit values (insertion force of 2.7 N and the insertion area of 2 mm) in a conventional structure which does not have the buckling regulating section 15 of the invention.

As described above, according to the embodiment, since the buckling regulating section 15 for regulating a buckling of the optical fiber 1 when the optical fiber 1 is inserted is provided, the buckling regulating section 15 is disposed with the movable guide sections 15b whose length can be varied in the optical fiber insertion direction, and the buckling of the optical fiber 1 is regulated while the movable guide sections 15b become short in the insertion direction of the optical fiber 1, even if the insertion area is made long, no buckling is generated to the optical fiber 1, and the insertion force of the optical fiber 1 can be made sufficiently large. With the configuration, even when foreign substances such as dusts enter and an insertion resistance increases, the optical fiber 1 can be securely inserted.

FIG. 4 to FIG. 5B show a modification of the first embodiment, and a movable guide section of a buckling regulating section 15 of the modification has a different configuration. A movable guide section 15c shown in the drawings is composed of a bellows-like member interposed between a fixed guide section 15a and a first fiber guide 13 is formed so as to be free to expand and contract in an axial direction of an optical fiber 1. That is, in the buckling regulating section 15, as shown in FIG. 5A, when a second fiber guide 14 is moved to a connector main body 11 side, as shown in FIG. 5B, the movable guide section 15c is contracted in the axial direction of the optical fiber 1 so that an overall length of the buckling regulating section 15 becomes short.

FIG. 6 to FIG. 7B show other modification of the first embodiment, and a movable guide section of a buckling regulating section 15 of the modification has a different configuration. A movable guide section 15d shown in the drawings is composed of a spring-shaped member interposed between a fixed guide section 15a and a first fiber guide 13 and is formed so as to be free to expand and contract in an axial direction of an optical fiber 1. That is, in the buckling regulating section 15, as shown in FIG. 7A, when a second fiber guide 14 is moved to a connector main body 11 side, as shown in FIG. 7B, a movable guide section 15d is contracted in the axial direction of the optical fiber 1 so that an overall length of the buckling regulating section 15 becomes short.

Second Embodiment

FIG. 8 to FIG. 9B show a second embodiment of the invention, and a configuration of a buckling regulating section is different from the first embodiment. Note that components which are the same as those of the above embodiment are shown by being denoted by the same reference numerals.

A buckling regulating section 17 of the embodiment is composed of a pair of sheet-like fixed guide sections 17a for guiding an optical fiber 1 by a V-shaped groove and movable guide sections 17b composed of plural block-like members for guiding the optical fiber 1. The respective fixed guide sections 17a are disposed on an opposite side each other across the optical fiber 1, the fixed guide section 17a on one side is fixed to a first fiber guide 13, and the fixed guide sections 17a on the other side are fixed to a second fiber guide 14. The plural movable guide sections 17b are disposed between the fixed guide sections 17a and the second fiber guide 14 on one side and between the fixed guide sections 17a and the first fiber guide 13 on the other side, respectively, and the respective block-like members of the movable guide sections 17b are disposed at interval in an axial direction of the optical fiber 1. That is, the buckling regulating section 17 is configured such that when the second fiber guide 14 is moved to a connector main body 11 side as shown in FIG. 9A, the respective block-like members of the movable guide sections 17b approach to each other and an overall length of the buckling regulating section 17 becomes short as shown in FIG. 9B.

FIG. 10 to FIG. 11B show a modification of the second embodiment, and a configuration of a movable guide section of a buckling regulating section 17 is different. A movable guide section 17c shown in the drawings is composed of a wave-shaped sheet-like member interposed between fixed guide sections 17a and a first fiber guide 13 and is formed so as to be free to expand and contract in an axial direction of an optical fiber 1. That is, the buckling regulating section 17 is configured such that when a second fiber guide 14 is moved to a connector main body 11 side as shown in FIG. 11A, the movable guide section 17c is contracted in the axial direction of the optical fiber 1 and an overall length of the buckling regulating section 17 becomes short as shown in FIG. 11B.

Third Embodiment

FIG. 12 to FIG. 13C show a third embodiment of the invention, and an optical connector 20 shown in the drawings connects an optical fiber 1 to a partner side connector.

The optical connector 20 includes a connector main body 21 into which the optical fiber 1 is inserted, a ferrule 22 attached to one end side of the connector main body 21, a first fiber guide 23 fixed in the connector main body 21, a second fiber guide 24 disposed movably to the connector main body 21, a buckling regulating section 25 for regulating a buckling of the optical fiber 1 inserted into the connector main body 21, a fixing member 26 for fixing the optical fiber 1, and a coating removing section 27 for removing a coating of the optical fiber 1 inserted into the connector main body 21, and the second fiber guide 24 is provided with a buckling receiving section 24a and a lid member 24b, and the buckling regulating section 25 is provided with a fixed guide section 25a and movable guide sections 25b likewise the first embodiment. Note that since a configuration other than the coating removing section 27 is the same as the first embodiment, a detailed description is omitted.

The coating removing section 27 is disposed in the first fiber guide 23 and has an insert hole into which a bare fiber 1a can be inserted. The coating removing section 27 is configured such that when an extreme end surface of the optical fiber 1 inserted into the connector main body 21 is abutted against the coating removing section 27, a coating 1b of the optical fiber 1 is exfoliated by an insertion force of the optical fiber 1. In the case, since an inner diameter of the insertion hole of the coating removing section 27 into which the bare fiber 1a is inserted must be larger than an outer diameter of the bare fiber 1a and smaller than an outer diameter of a coated portion of the optical fiber 1, the inner diameter of the insertion hole is formed in, for example, 175 μm or more to 200 μm or less.

Next, an assembly method of the optical connector 20 will be explained referring to FIG. 13A, FIG. 13B and FIG. 13C.

First, the coated optical fiber 1 is held by a fiber holder 7 and the optical fiber 1 is inserted into the second fiber guide 24 as shown in FIG. 13A. The optical fiber 1 inserted into the second fiber guide 24 passes through the buckling regulating section 25, is inserted into the first fiber guide 23, and the coating 1b is removed by the coating removing section 27 as shown in FIG. 13B. An extreme end side of the bare fiber 1a whose coating 1b on the extreme end side is removed is butted against a built-in fiber 22a via an index matching oil 23a. At the time, an insertion area L of a predetermined length is secured between the first fiber guide 23 and the second fiber guide 24 by the movable guide sections 25b of the buckling regulating section 25, and, in the buckling regulating section 25, the buckling of the optical fiber 1 is regulated by the fixed guide section 25a and the movable guide sections 25b while the movable guide sections 25b become short in the insertion direction of the optical fiber 1. Further, since the buckling receiving section 24a of the second fiber guide 24 has been closed by the lid member 24b, no buckling of the optical fiber 1 is generated by the buckling receiving section 24a. Next, after the optical fiber 1 is butted against the built-in fiber 22a in the first fiber guide 23, as shown in FIG. 13C, the lid member 24b is removed from the second fiber guide 24, the optical fiber 1 is further forcibly pushed into the connector main body 21, and the second fiber guide 24 is fixed to the connector main body 21 as well as a rear end side of the optical fiber 1 is fixed by the fixing member 26. With the operation, although a buckling portion 1c is generated to the optical fiber 1 in the second fiber guide 24, the buckling portion 1c is received in the buckling receiving section 24a, and an end surface of the optical fiber 1 is pressed to an end surface of the built-in fiber 22a by a restoring force of the buckling portion 1c.

The insertion area L and the insertion force P when the fiber is inserted are determined by intervals S and a number N of the movable members of the movable guide sections 25b. That is, the insertion area L becomes as shown below.

$$L = S \times N + L_2 \quad (4)$$

Here, $L_2$ represents a length, which can be buckled, of a rear end of a connector (refer to FIG. 3). When a longer one of $L_2$ and S is represented by 1, the insertion force P becomes as shown below likewise Expression (1).

$$P = 4\pi^2 EI/l^2 \quad (5)$$

Ordinarily, although an average of maximum coating removing forces is prescribed to 5 N (refer to, for example, IEC-60793-2-50, Optical fibers—Part 2-50: Product specifications—Sectional specification for class B single-mode fibres), when it is assumed that an insertion force necessary to remove a coating in the optical connector 20 is the same as that, S and $L_2$ become $L_2 \leq 2.4$ mm and $S \leq 2.4$ mm from Expression (5).

Next, a lower limit of the intervals S of the movable members will be explained using FIG. 47. An outer diameter of the coating of the optical fiber 1 is ordinarily 235-265 μm, and it is necessary that an inner diameter of the fixed guide section 25a is at least 265 μm. At the time, a clearance between the coated optical fiber 1 and the fixed guide section 25a is 265−235=30 μm at maximum.

When the clearance is represented by C, a minimum bending radius R in a buckling regulating portion when a force P is applied to the optical fiber 1 is shown by the following expression (6) from a balance of a bending moment.

$$R = EI/CP. \quad (6)$$

When Expression (5) is substituted for Expression (6) assuming 1=S, the following expression (7) is obtained.

$$R = S2/4\pi C2 \quad (7)$$

In contrast, it is known that when R becomes 2.5 mm or less, break probability of an optical fiber dramatically increases (refer to, for example, The Institute of Electronics, Information and Communication Engineers, 2008 Society General Assembly, Lecture papers "Optical fiber life estimation method", B-13-40). Since C=30 μm, S≥1.45 mm is achieved to establish R (2.5 mm.

As described above, according to the embodiment, since the buckling regulating section 25 for regulating a buckling of the optical fiber 1 when the optical fiber 1 is inserted is provided, the buckling regulating section 25 is provided with the movable guide sections 25b whose length is variable in an optical fiber insertion direction, and the movable guide sections 25b regulate a buckling of the optical fiber 1 while becoming short in the insertion direction of the optical fiber 1, even if the insertion area is made long likewise the above embodiment, no buckling is generated to the optical fiber 1 and the insertion force of the optical fiber 1 can be made sufficiently large. With the configuration, even when foreign substances such as dusts enter and an insertion resistance is increased, the optical fiber 1 can be securely inserted.

Further, since the coating 1b of the optical fiber 1 is removed making use of the insertion force of the optical fiber 1 to the connector main body 21 by providing the coating removing section 27 for removing the coating 1b of the optical fiber 1 by an abutment against the optical fiber 1, it is not necessary to separately remove the coating 1b of the optical fiber 1 using a dedicated tool before the optical fiber 1 is inserted, thereby an assembly job of the optical connector 20 can be efficiently executed. At the time, even if the insertion force of the optical fiber 1 is increased to remove the coating 1b, since the buckling of the optical fiber 1 can be prevented by the buckling regulating section 25, the coating 1b of the optical fiber 1 can be securely removed by the coating removing section 27. Note that when a flaw such as a cut is made to an extreme end of the coating 1b of the optical fiber 1, the insertion force for removing the coating 1b can be reduced.

Removed coating dusts remain inside of the connector. Since a space for accommodating the coating dusts in the connector is limited, when the accommodation space is filled with the coating dusts, the coating cannot be further removed. In the state, when a press force is applied to the optical fiber, there is a high possibility that an excessive force is applied to the fiber and the fiber is broken. Accordingly, it is necessary to limit a maximum removing length of the coating to a range in which the coating dusts can be accommodated.

This will be explained using FIG. 48. An outer diameter of a ferrule 12 of a widely used optical connector 10 is 1.25 mm even when the ferrule 12 is thin (refer to, for example, IEC-61754-6, Fiber optic connector interfaces—Part 6: Type MU connector family). It is necessary that the ferrule 12 is aligned with a guide folder 15. An engagement by a sleeve (cylinder) which is widely used to align a connector is used in the alignment. Since a length of the space for accommodating coating dusts in front of a coating removing section 18 is 2.4 mm and an inner diameter of the sleeve is 1.25 mm, a volume of the accommodation space of the coating dusts becomes 3.75 mm3. Since a coating is formed in a cylindrical shape having an outer diameter of 0.25 mm and an inner diameter of 0.125 mm, a length of the coating which can be accommodated is 79.9 mm at maximum. Since a maximum removing length of the coating is the same as a maximum contraction amount of a buckling regulating section 16, a contraction amount S (S (N in a case of plural pieces) is preferably 79.9 mm or less.

Fourth Embodiment

FIG. 14 to FIG. 17C show a fourth embodiment of the invention, and an optical connector 30 shown in the drawings connects an optical fiber 1 to a partner side connector.

The optical connector 30 includes a connector main body 31 into which the optical fiber 1 is inserted, a ferrule 32 attached to one end side of the connector main body 31, a first fiber guide 33 fixed in the connector main body 31, a second fiber guide 34 disposed movably to the connector main body 31, a buckling regulating section 35 for regulating a buckling of the optical fiber 1 inserted into the connector main body 31, a fixing member 36 for fixing the optical fiber 1, and an end surface grinding section 37 for grinding an extreme end surface of the optical fiber 1 inserted into the connector main body 31 in a taper shape, and the second fiber guide 34 is provided with a buckling receiving section 34a and a lid member 34b, and the buckling regulating section 35 is provided with a fixed guide section 35a and movable guide sections 35b likewise the third embodiment. Note that since a configuration other than the end surface grinding section 37 is the same as the third embodiment, a detailed description is omitted. Further, no index matching oil is disposed in the first fiber guide 33.

The end surface grinding section 37 is disposed in the first fiber guide 33 and composed of, as shown in FIG. 15, plural grinding members 37a disposed each other at intervals in an insertion direction of the optical fiber 1, plural dummy members 37b disposed to confront the respective grinding members 37a, and a pair of holding members 37c for holding the respective grinding members 37a and the respective dummy members 37b, respectively. In the end surface grinding section 37, when a bare fiber 1a is inserted along a guide groove 37d disposed to the holding members 37c, an extreme end of the bare fiber 1a is guided by the dummy members 37b as shown in FIG. 16A and comes into contact with the grinding members 37a and one side of the extreme end of the bare fiber 1a is ground in a taper shape by the grinding members 37a as shown in FIG. 16B. Further, the end surface grinding section 37 includes the other holding member 37c having respective grinding members 37a and respective dummy members 37b disposed on an opposite side each other and grinds an extreme end surface of the bare fiber 1a throughout its entire periphery in a taper shape by grinding the other side of the extreme end of the bare fiber 1a whose one side of the extreme end has been ground.

Next, an assembly method of the optical connector 30 will be explained referring to FIG. 17A, FIG. 17B and FIG. 17C.

First, the optical fiber 1 whose coating 1b on an extreme end side has been previously removed is held by a fiber holder 7, and the optical fiber 1 is inserted into the second fiber guide 34 as shown in FIG. 17A. The optical fiber 1 inserted into the second fiber guide 34 is inserted into the first fiber guide 33 passing through the buckling regulating section 35 as shown in FIG. 17B and the extreme end surface is ground in a taper shape by the end surface grinding section 37. An extreme end side of the bare fiber 1a from which the extreme end surface has been ground in the taper shape is butted against a built-in fiber 32a via an index matching oil 33a. At the time, an insertion area L of a predetermined length is secured between the first fiber guide 33 and the second fiber guide 34 by movable guide sections 35b of the buckling regulating section 35, and, in the buckling regulating section 35, a buckling of the optical fiber 1 is regulated by the fixed guide section 35a and the movable guide sections 35b while the movable guide sections 35b become short in an insertion direction of the optical fiber 1. Further, since the buckling receiving section 34a of the second fiber guide 34 has been closed by the lid member 34b, no buckling of the optical fiber 1 is generated by the buckling receiving section 34a. Next, after the optical fiber 1 is butted against the built-in fiber 32a in the first fiber guide 33, the lid member 34b is removed from the second fiber guide 34, as shown in FIG. 17C, the optical fiber 1 is further forcibly pushed into the connector main body 31, and the second fiber guide 34 is fixed to the connector main body 31 as well as a rear end side of the optical fiber 1 is fixed by the fixing member 36. With the operation, although a buckling portion 1c is generated to the optical fiber 1 in the second fiber guide 34, the buckling portion 1c is received in the buckling receiving section 34a, and an end surface of the optical fiber 1 is pressed to an end surface of the built-in fiber 32a by a restoring force of the buckling portion 1c.

As described above, according to the embodiment, since the buckling regulating section 35, which regulates a buckling of the optical fiber 1 when the optical fiber 1 is inserted, is provided, the buckling regulating section 35 is provided with the movable guide sections 35b whose length is variable in the optical fiber insertion direction, and the movable guide sections 35b regulate the buckling of the optical fiber 1 while becoming short in the insertion direction of the optical fiber 1, even if the insertion area is made long likewise the above embodiment, no buckling of the optical fiber 1 is generated and an insertion force of the optical fiber 1 can be made sufficiently large. With the configuration, even when foreign substances such as dusts enter and an insertion resistance increases, the optical fiber 1 can be securely inserted.

Further, since the extreme end surface of the optical fiber 1 is ground making use of the insertion force of the optical fiber 1 to the connector main body 31 by providing the end surface grinding section 37 for grinding the extreme end surface of the optical fiber 1 in the taper shape in contact with the optical fiber 1, it is not necessary to separately grind the extreme end surface of the optical fiber 1 using a dedicated tool before the optical fiber 1 is inserted, and an assembly job of the optical connector 30 can be efficiently executed. At the time, even if the insertion force of the optical fiber 1 is increased to grind the extreme end surface, since a buckling of the optical fiber 1 can be prevented by the buckling regulating section 35, the extreme end surface of the optical fiber 1 can be securely ground by the end surface grinding section 37.

Further, since an area of a butting end surface becomes small by grinding off a corner of the extreme end surface of the optical fiber 1 and an intimate contact property necessary to an optical connection is sufficiently increased, a large reflection attenuation amount can be obtained without using an index matching oil.

Fifth Embodiment

FIG. 18 to FIG. 19C show a fifth embodiment of the invention, and an optical connector 40 shown in the drawings connects an optical fiber 1 to a partner side connector.

The optical connector 40 includes a connector main body 41 into which the optical fiber 1 is inserted, a ferrule 42 attached to one end side of the connector main body 41, a first fiber guide 43 fixed in the connector main body 41, a second fiber guide 44 disposed movably to the connector main body 41, a buckling regulating section 45 for regulating a buckling of the optical fiber 1 inserted into the connector main body 41, and a fixing member 46 for fixing the optical fiber 1.

The connector main body 41 is formed so as to be inserted with the optical fiber 1 composed of, for example, a bare fiber 1a having an outer diameter of 125 μm and a coating 1b having an outer diameter of 250 μm and so as to be engageable with the partner side connector.

The ferrule 42 includes a hole which has an inner diameter approximately the same as the outer diameter of the bare fiber 1a from which the coating is removed at a center in a radial direction, and the bare fiber 1a is held in the hole.

The first fiber guide 43 is fixed in the connector main body 41 and is formed so as to position the optical fiber 1 coaxially with the ferrule 42 by a V-shaped groove or a circular hole.

The second fiber guide 44 is formed so that the optical fiber 1 can be inserted therein and disposed to the other end side of the connector main body 41 so as to be free to move in an axial direction of the optical fiber 1. Further, the second fiber guide 44 is fixed to the other end of the connector main body 41 after the optical fiber 1 is inserted. A buckling receiving section 44a capable of receiving a buckling portion of the optical fiber 1 is disposed in the second fiber guide 44, and the buckling receiving section 44a is closed by a detachable lid member 44b. That is, the lid member 44b is removed when the optical connector 10 is connected to the partner side connector, and a buckling portion generated by forcibly pushing the optical fiber 1 when the connector is connected is received in the buckling receiving section 44a.

The buckling regulating section 45 is composed of a cylindrical fixed guide section 45a into which the optical fiber 1 can be inserted and movable guide sections 45b as movable members which are composed of plural ring-shaped members and into which the optical fiber 1 can be inserted, and the fixed guide section 45a is fixed to one end of the second fiber guide 44. The movable guide sections 45b are interposed between the fixed guide section 45a and the first fiber guide 43, and the respective ring-shaped members of the movable guide sections 45b are disposed at intervals each other in the axial direction of the optical fiber 1. That is, in the buckling regulating section 45, when the second fiber guide 44 is moved to the connector main body 41 side, the respective ring-shaped members of the movable guide sections 45b approach with each other so that an overall length of the buckling regulating section 45 becomes short.

The fixing member 45 is disposed to the other end side of the second fiber guide 44 and is formed so as to fix the optical fiber 1 by tightening the inserted optical fiber 1.

Next, an assembly method of the optical connector 40 will be explained referring to FIG. 19A, FIG. 19B and FIG. 19C.

First, the optical fiber 1 from which a coating 1b on an extreme end side has been previously removed is held by a fiber holder 7, and the optical fiber 1 is inserted into the second fiber guide 44 of as shown in FIG. 19A. The optical fiber 1 inserted into the second fiber guide 44 is inserted into the first fiber guide 43 passing through the buckling regulating section 45. At the time, an insertion area L of a predetermined length is secured between the first fiber guide 43 and the second fiber guide 44 by the movable guide sections 45b of the buckling regulating section 45, and, in the buckling regulating section 45, the buckling of the optical fiber 1 is regulated by the fixed guide section 45a and the movable guide sections 45b while the movable guide sections 45b become short in an insertion direction of the optical fiber 1. Subsequently, as shown in FIG. 19B, the bare fiber 1a is inserted into the ferrule 42 and projects to the outside from an extreme end of the ferrule 42. At the time, the bare fiber 1a is regulated to a predetermined projecting length by causing an extreme end of the bare fiber 1a to abut against an abutment plate 47 disposed outside of the ferrule 42, and, in the state, the second fiber guide 44 is fixed to the connector main body 41 as well as a rear end side of the optical fiber 1 is fixed by the fixing member 46.

When the optical connection 40 assembled as described above is connected to the partner side connector, the lid member 44b is removed from the second fiber guide 44, and the ferrule 42 is butted against a ferrule 42' of the partner side connector via an index matching oil 48 as shown in FIG. 19C. At the time, although the optical fiber 1 is forcibly pushed into the connector main body 41 by an engagement pressure to the partner side connector, since the rear end side of the optical fiber 1 is fixed by the fixing member 46, a buckling portion 1c is generated to the optical fiber 1 in the second fiber guide 44. The buckling portion 1c is received in the buckling receiving section 44a, and a fiber end surface is pressed to a fiber end surface of the partner side connector by a restoring force of the buckling portion 1c. Since the fiber end surface is aligned by the ferrule 42 so that its core center agrees with a core center of the partner side fiber and the fiber end surfaces are caused to come into intimate contact with each other by the restoring force of the buckling portion 1c, the fiber end surfaces allow a signal light to pass therethrough each other.

As described above, according to the embodiment, since the buckling regulating section 45, which regulates a buckling of the optical fiber 1 when the optical fiber 1 is inserted, is provided, the buckling regulating section 45 is provided with the movable guide sections 45b whose length is variable in the optical fiber insertion direction, and the movable guide sections 45b regulate the buckling of the optical fiber 1 while becoming short in the insertion direction of the optical fiber 1, even if the insertion area is made long likewise the above embodiment, no buckling of the optical fiber 1 is generated and an insertion force of the optical fiber 1 can be made sufficiently large. With the configuration, even when foreign substances such as dusts enter and an insertion resistance increases, the optical fiber 1 can be securely inserted.

Note that, in the embodiment, a grinding preparation of an extreme end surface of the optical fiber 1 may be executed making use of the insertion force of the optical fiber 1 by providing an end surface grinding section similar to the fourth embodiment.

Sixth Embodiment

FIG. 20 to FIG. 21C show a sixth embodiment of the invention, and an optical connector 50 shown in the drawings connects an optical fiber 1 to a partner side connector.

The optical connector 50 includes a connector main body 51 into which the optical fiber 1 is inserted, a ferrule 52 attached to one end side of the connector main body 51, a first fiber guide 53 fixed in the connector main body 51, a second fiber guide 54 disposed movably to the connector main body 51, a buckling regulating section 55 for regulating a buckling of the optical fiber 1 inserted into the connector main body 51, a fixing member 56 for fixing the optical fiber 1, and a coating removing section 57 for removing a coating of the optical fiber 1 inserted into the connector main body 51, and the second fiber guide 54 is provided with a buckling receiving section 54a and a lid member 54b, and the buckling regulating section 55 is provided with a fixed guide section 55a and movable guide sections 55b. Note that since a configuration other than the coating removing section 57 is the same as the fifth embodiment, a detailed description is omitted. Further, since the configuration of the coating removing section 57 is the same as the third embodiment, a detailed description is omitted.

Next, an assembly method of the optical connector 50 will be explained referring to FIG. 21A, FIG. 21B and FIG. 21C.

First, the coated optical fiber 1 is held by a fiber holder 7, and the optical fiber 1 is inserted into the second fiber guide 54 as shown in FIG. 21A. The optical fiber 1 inserted into the second fiber guide 54 is inserted into the first fiber guide 53 passing through the buckling regulating section 55. At the time, an insertion area L of a predetermined length is secured between the first fiber guide 53 and the second fiber guide 54 by the movable guide sections 55b of the buckling regulating section 55, and, in the buckling regulating section 55, the buckling of the optical fiber 1 is regulated by the movable guide sections 55b while the movable guide sections 55b become short in an insertion direction of the optical fiber 1. Subsequently, as shown in FIG. 21B, a coating 1b on an extreme end side of the optical fiber 1 is removed by the coating removing section 57 as well as a bare fiber 1a whose coating 1b on the extreme end side is removed is inserted into the ferrule 52 and projects from an extreme end of the ferrule 52 to the outside. At the time, the bare fiber 1a is regulated to a predetermined projection length by causing an extreme end of the bare fiber 1a to abut against an abutment plate 58 disposed to outside of the ferrule 52, and, in the state, the second fiber guide 54 is fixed to the connector main body 51 as well as a rear end side of the optical fiber 1 is fixed by the fixing member 56.

When the optical connector 50 assembled as described above is connected to the partner side connector, the lid member 54b is removed from the second fiber guide 54, and the ferrule 52 is butted against a ferrule 52' of the partner side connector via an index matching oil 59 as shown in FIG. 21C. At the time, although the optical fiber 1 is forcibly pushed into the connector main body 11 by an engagement pressure to the partner side connector, since the rear end side of the optical fiber 1 is fixed by the fixing member 56, a buckling portion 1c is generated to the optical fiber 1 in the second fiber guide 54. The buckling portion 1c is received in the buckling receiving section 54a, and a fiber end surface is pressed to a fiber end surface of the partner side connector by a restoring force of the buckling portion 1c. Since the fiber end surface is aligned by the ferrule 52 so that its core center agrees with a core center of the partner side fiber and the fiber end surfaces are caused to come into intimate contact with each other by the restoring force of the buckling portion 1c, the fiber end surfaces allow a signal light to pass therethrough each other.

As described above, according to the embodiment, since the buckling regulating section 55, which regulates a buckling of the optical fiber 1 when the optical fiber 1 is inserted, is provided, the buckling regulating section 55 is provided with the movable guide sections 55b whose length is variable in the optical fiber insertion direction, and the movable guide sections 55b regulate the buckling of the optical fiber 1 while becoming short in the insertion direction of the optical fiber 1, even if the insertion area is made long likewise the above embodiment, no buckling of the optical fiber 1 is generated and an insertion force of the optical fiber 1 can be made sufficiently large. With the configuration, even when foreign substances such as dusts enter and an insertion resistance increases, the optical fiber 1 can be securely inserted.

Further, since the coating 1b of the optical fiber 1 is removed making use of the insertion force of the optical fiber 1 to the connector main body 51 by providing the coating removing section 57 for removing the coating 1b of the optical fiber 1 by an abutment against the optical fiber 1, it is not necessary to separately remove the coating 1b of the optical fiber 1 using a dedicated tool before the optical fiber 1 is inserted, and an assembly job of the optical connector 50 can be efficiently executed. At the time, even if the insertion force of the optical fiber 1 is increased to remove the coating 1b, since the buckling of the optical fiber 1 can be prevented by the buckling regulating section 55, the coating 1b of the optical fiber 1 can be securely removed by the coating removing section 57. Note that when a flaw such as a cut is made to an extreme end of the coating 1b of the optical fiber 1, the insertion force for removing the coating 1b can be reduced.

Note that, in the respective embodiments, although a press force is applied to the fiber end surface by the restoring force of the buckling portion 1c, when optical characteristics of the fiber end surface are good, the buckling portion 1c may be omitted.

Seventh Embodiment

FIG. 22 to FIG. 27B show a seventh embodiment of the invention, and an optical connector 10 shown in the drawings connects an optical fiber 1 to a partner side connector.

The optical connector 10 includes a connector main body 11 into which the optical fiber 1 is inserted, a ferrule 12 attached to one end side of the connector main body 11, a first fiber guide 13 fixed in the connector main body 11, a second fiber guide 14 disposed movably to the first fiber guide 13, a fixing member 15 for fixing the optical fiber 1, a coating removing section 16 for removing a coating of the optical fiber 1 inserted into the connector main body 11, and an end surface grinding section 17 for grinding an extreme end surface of the optical fiber 1 inserted into the connector main body 11 in a taper shape.

The connector main body 11 is formed so as to be inserted with the optical fiber 1 composed of, for example, a bare fiber 1a having an outer diameter of 125 μm and a coating 1b having an outer diameter of 250 μm and so as to be engageable with the partner side connector.

The ferrule 12 includes a hole which has an inner diameter approximately the same as the outer diameter of the bare fiber 1a from which the coating is removed at a center in a radial direction, and the inserted bare fiber 1a is held in the hole.

The first fiber guide 13 is fixed in the connector main body 11 and is formed so as to position the optical fiber 1 coaxially with the ferrule 12 by a V-shaped groove or a circular hole on one end side. An inner diameter of the other end side of the first fiber guide 13 is formed larger than one end side, and the second fiber guide 14 is disposed inside of first fiber guide 13 so as to be free to move.

The second fiber guide 14 is formed so that the optical fiber 1 can be inserted therein and disposed to the other end side of the first fiber guide 13 so as to be free to move in an axial direction of the optical fiber 1. The second fiber guide 14 is composed of a pair of sheet-like fixed guide sections 14a for guiding the optical fiber 1 by a V-shaped groove and a pair of movable guide sections 14b as buckling regulating sections composed of wave-shaped sheet-like members for guiding the optical fiber 1. The respective fixed guide sections 14a are disposed on an opposite side each other across the optical fiber 1, the fixed guide section 14a on one side is disposed in the first fiber guide 13, and the fixed guide section 14a on the other side is fixed to the second fiber guide 14. The respective movable guide sections 14b are disposed between the fixed guide section 14a on one side and the fixing member 15 and between the fixed guide sections 14a on the other side and the first fiber guide 13, respectively, and the respective movable guide sections 14b are formed so as to be free to expand and contract in the axial direction of the optical fiber 1. That is, when the second fiber guide 14 is moved to the connector main body 11 side, the movable guide sections 14b are contracted and their lengths in an optical fiber insertion direction become short. Further, a buckling receiving section 14c capable of receiving a buckling portion of the optical fiber 1 is disposed in the second fiber guide 14, and the buckling receiving section 14c is closed by a detachable lid member 14d. That is, the buckled portion generated by forcibly pushing the optical fiber 1 can be received in the buckling receiving section 14c by removing the lid member 14d. Further, the second fiber guide 14 is fixed to the other end of the connector main body 11 after the optical fiber 1 is inserted.

The fixing member 15 is disposed to the other end side of the second fiber guide 14 and is formed so as to fix the optical fiber 1 by tightening the inserted optical fiber 1.

The coating removing section 16 is disposed to a base end side of the ferrule 12 and composed of a conical member having an insertion hole through which the bare fiber 1a can be inserted. The coating removing section 16 is configured such that when an extreme end surface of the optical fiber 1 inserted into the connector main body 11 is abutted against the coating removing section 16, the coating removing section 16 exfoliates a coating 1b of the optical fiber 1 while cutting and opening it by an insertion force of the optical fiber 1 and causes the bare fiber 1a to be inserted into the ferrule 12. In the case, since an inner diameter of an insertion hole of the coating removing section 16 into which the bare fiber 1a is inserted must be larger than the outer diameter of the bare fiber 1a and smaller than the outer diameter of a coated portion of the optical fiber 1, the inner diameter of the insertion hole is formed to, for example, 175 μm or more to 200 μm or less. Note that an abutment surface of the coating removing section 16 against the optical fiber 1 may be formed vertical to the axial direction of the optical fiber 1.

The end surface grinding section 17 is disposed in the ferrule 12 and, as shown in FIG. 24, is composed of plural grinding members 17a disposed at intervals each other in the insertion direction of the optical fiber 1, plural dummy members 17b disposed to confront the respective grinding members 17a, and a pair of holding members 17c for holding the respective grinding members 17a and the respective dummy members 17b, respectively. The end surface grinding section 17 is configured such that when the bare fiber 1a is inserted along a guide groove 17d disposed to the holding members 17c, an extreme end of the bare fiber 1a is guided by the dummy members 17b and comes into contact with the grinding members 17a as shown in FIG. 25A, and one side of the extreme end of the bare fiber 1a is ground by the grinding members 17a in a taper shape as shown in FIG. 25B. Further, the end surface grinding section 17 includes the other holding members 17c having respective grinding members 17a and respective dummy members 17b disposed on an opposite side each other and grinds an extreme end surface of the bare fiber 1a throughout its entire periphery by grinding the other side of the extreme end of the bare fiber 1a in the taper shape whose one side of the extreme end has been ground.

Next, an assembly method of the optical connector 10 will be explained referring to FIG. 26A to FIG. 27B.

First, as shown in FIG. 26A, the coated optical fiber 1 is held by a fiber holder 7 and inserted into the second fiber guide 14. The optical fiber 1 inserted into the second fiber guide 14 is abutted against the coating removing section 16 by being guided by the first and second fiber guides 13, 14 and the coating 1b is removed by the coating removing section 16 as shown in FIG. 26B. The bare fiber 1a from which the coating 1b is removed is inserted into the ferrule 12, and after a corner portion of the extreme end surface is ground in the taper shape by the end surface grinding section 17 in the ferrule 12 as shown in FIG. 26C, the bare fiber 1a projects to the outside from an extreme end of the ferrule 12 as shown in FIG. 27A. At the time, the bare fiber 1a may be regulated to a predetermined projection length by causing the extreme end of the bare fiber 1a to abut against an abutment plate (not shown) disposed to outside of the ferrule 12. Further, the second fiber guide 14 is secured with an insertion area L of a predetermined length as large as a contraction amount of the movable guide sections 14b, and the movable guide sections 14b regulate a buckling of the optical fiber 1 while becoming short in the insertion direction of the optical fiber 1. At the time, since the buckling receiving section 14c of the second fiber guide 14 is closed by a lid member 14d, no buckling is generated to the optical fiber 1 in the second fiber guide 14. Then, the second fiber guide 14 is fixed to the connector main body 11 as well as a rear end side of the optical fiber 1 is fixed by the fixing member 15.

When the optical fiber 10 assembled as described above is connected to the partner side connector, the lid member 14b is removed from the second fiber guide 14, and the ferrule 12 is butted against a ferrule 12' of the partner side connector as shown in FIG. 27B. At the time, although the optical fiber 1 is forcibly pushed into the connector main body 11 by an engagement pressure to the partner side connector, since the rear end side of the optical fiber 1 is fixed by the fixing member 15, a buckling portion 1c is generated to the optical fiber 1 in the second fiber guide 14. The buckling portion 1c is received in the buckling receiving section 14c, and a fiber end surface is pressed to a fiber end surface of the partner side connector by a restoring force of the buckling portion 1c. In the case, since a corner portion of the extreme end surface of the optical fiber 1 is ground off, an area of a butted end surface is reduced and a pressure necessary to an optical connection can be sufficiently obtained. Since the fiber end surface is aligned by the ferrule 12 so that its core center agrees with a core center of the partner side fiber and the fiber end surfaces are caused to come into intimate contact with each other by the restoring force of the buckling portion 1c, the fiber end surfaces allow a signal light to pass therethrough each other.

As described above, according to the embodiment, since the coating removing section 16 for removing the coating 1b of the optical fiber 1 by the insertion force of the optical fiber 1 to the connector main body 11 is provided, it is not necessary to separately remove the coating 1b of the optical fiber 1 using a dedicated tool before the optical fiber 1 is inserted, an assembly job of the optical connector 10 can be efficiently executed.

Further, since the end surface grinding section 17 for grinding a corner portion of the extreme end surface of the optical fiber 1 by the insertion force of the optical fiber 1 to the connector main body 11 is provided, it is not necessary to separately execute an end surface grinding preparation of the optical fiber 1 using a dedicated tool before the optical fiber 1 is inserted and an assembly job of the optical connector 10 can be efficiently executed.

Further, the second fiber guide 14 is provided with the movable guide sections 14b whose lengths are variable in the optical fiber insertion direction, and the movable guide sections 14b regulate the buckling of the optical fiber 1 while becoming short in the insertion direction of the optical fiber 1, even if an insertion area is made long, no buckling of the optical fiber 1 is generated and the insertion force of the optical fiber 1 can be made sufficiently large. With the configuration, even when foreign substances such as dusts enter and an insertion resistance increases, the optical fiber 1 can be securely inserted. At the time, even if the insertion force of the optical fiber 1 is increased by the coating removing section 16 and the end surface grinding section 17, since the buckling of the optical fiber 1 can be prevented by the movable guide sections 14b, the coating removing and the end surface grinding can be securely executed. Note that when a flaw such as a cut is made to an extreme end of the coating 1b of the optical fiber 1, the insertion force for removing the coating 1b can be reduced.

Further, since the optical fiber 1 is pressed toward an extreme end side of the optical fiber 1 by a restoring force of a buckling portion 1c of the optical fiber 1 buckled in a connector main body 11, an end surface of the optical fiber 1 can be caused to come into intimate contact with an end surface of the partner side connector, and can be connected to the partner side connector so as to securely transmit light thereto.

Note that although what is shown in the embodiment is the movable guide sections 14b formed of the wave shaped sheet-like members, it is also possible to configure the movable guide sections of movable members of other shape such as plural ring-like members and block-like members or bellows-like members, coil-spring-like members, and the like which are disposed at intervals each other.

Eighth Embodiment

FIG. 28 to FIG. 30B show an eighth embodiment of the invention, and an optical connector 20 shown in the drawings connects an optical fiber 1 to a partner side connector.

The optical connector 20 includes a connector main body 21 into which the optical fiber 1 is inserted, a ferrule 22 attached to one end side of the connector main body 21, a first fiber guide 23 fixed in the connector main body 21, a second fiber guide 24 disposed movably to the first fiber guide 23, a press member 25 for pressing the first fiber guide 23 toward one end side of the connector main body 21, a fixing member 26 for fixing the optical fiber 1 to the second fiber guide 24, a coating removing section 27 for removing a coating of the optical fiber 1 inserted into the connector main body 21, and an end surface grinding section 28 for grinding an extreme end surface of the optical fiber 1 inserted into the connector main body 21 in a taper shape, and the second fiber guide 24 is provided with a fixed guide section 24a and movable guide sections 24b likewise the seventh embodiment. In the case, the second fiber guide 24 is provided with no buckling receiving section and no lid member. Note that since a configuration other than the first fiber guide 23 and the press member 25 is the same as the seventh embodiment, a detailed description is omitted.

The first fiber guide 23 is disposed movably in an axial direction in the connector main body 21 and is formed so as to position the optical fiber 1 coaxially with the ferrule 2212 by a V-shaped groove or a circular hole on one end side. An inner diameter of the other end side of the first fiber guide 23 is formed larger than one end side, and the second fiber guide 24 is disposed inside of the first fiber guide 23 so as to be free to move. Further, an end of the first fiber guide 23 is disposed with a flange-like locking section 23a to which the press member 25 is locked.

The press member 25 is composed of a spring member as an elastic member bent in a wave shape and interposed between an inner peripheral surface of the connector main body 21 and an outer peripheral surface of the first fiber guide 23. In the case, the press member 25 is disposed between the other end of the connector main body 21 and the locking section 23a of the first fiber guide 23 in a compressed state and urges the first fiber guide 23 toward one end side of the connector main body 21.

Next, an assembly method of the optical connector 20 will be explained referring to FIG. 29 and FIG. 30.

First, as shown in FIG. 29A, the coated optical fiber 1 is held by a fiber holder 7 and inserted into the second fiber guide 24. The optical fiber 1 inserted into the second fiber guide 24 is guided by the first and second fiber guide 23, 24, abutted against the coating removing section 27, and a coating 1b is removed by the coating removing section 27 as shown in FIG. 29B. A bare fiber 1a from which the coating 1b is removed is inserted into the ferrule 22, and after a corner portion of an extreme end surface is ground in a taper shape by the end surface grinding section 28 in the ferrule 22 as shown in FIG. 29C, the bare fiber 1a projects to the outside from an extreme end of the ferrule 22 as shown in FIG. 30A. At the time, the bare fiber 1a may be regulated to a predetermined projection length by causing the extreme end of the bare fiber 1a to abut against an abutment plate (not shown) disposed to outside of the ferrule 22. Further, the second fiber guide 24 is secured with an insertion area L of a predetermined length as large as a contraction amount of the movable guide sections 24b, and the movable guide sections 24b regulate a buckling of the optical fiber 1 while becoming short in the insertion direction of the optical fiber 1. Then, the fixing member 26 is fixed to the first fiber guide 23 as well as a rear end side of the optical fiber 1 is fixed by the fixing member 26. With the operation, the optical fiber 1, the first fiber guide 23, the second fiber guide 24, and the fixing member 26 are integrated and become free to move in an axial direction of the optical fiber 1 with respect to the connector main body 21.

When the optical connector 20 assembled as described above is connected to the partner side connector, the ferrule 22 is butted against a ferrule 22' of the partner side connector as shown in FIG. 30B. At the time, although the optical fiber 1 is forcibly pushed into the connector main body 21 by an engagement pressure to the partner side connector, since the rear end side of the optical fiber 1 is fixed by the fixing member 26, the optical fiber 1, the first fiber guide 23, the second fiber guide 24, and the fixing member 26 move rearward against an urging force of the press member 25, and a fiber end surface is pressed to a fiber end surface of the partner side connector by a press force of the press member 25. In the case, since the corner portion of the extreme end surface of the optical fiber 1 is ground off, an area of a butted end surface is reduced and a pressure necessary to an optical connection can be sufficiently obtained. Since the fiber end surface is aligned by the ferrule 22 so that its core center agrees with a core center of the partner side fiber and the fiber end surfaces are caused to come into intimate contact with each other by the press force of the press member 25, the fiber end surfaces allow a signal light to pass therethrough each other.

As described above, according to the embodiment, likewise the seventh embodiment, a coating removing of the optical fiber 1 and an end surface grinding preparation of the optical fiber 1 can be executed by an insertion force of the optical fiber 1 to the connector main body 21 as well as a buckling of the optical fiber 1 can be regulated by the movable guide sections 24b of the second fiber guide 24.

Further, according to the embodiment, since the optical fiber 1 disposed in the connector main body 21 is pressed to an extreme end side by an elastic force by the press member 25, an end surface of the optical fiber 1 can be caused to come into contact with the end surface of the partner side connector and can be connected to the partner side connector so as to be able to securely transmit light thereto.

Ninth Embodiment

FIG. 31 to FIG. 33B show a ninth embodiment of the invention, and an optical connector 30 shown in the drawings connects an optical fiber 1 to a partner side connector.

The optical connector 30 includes a connector main body 31 into which the optical fiber 1 is inserted, a ferrule 32 attached to one end side of the connector main body 31, a first fiber guide 33 fixed in the connector main body 31, a second fiber guide 34 disposed movably to the first fiber guide 33, a fixing member 35 for fixing the optical fiber 1, a coating removing section 36 for removing a coating of the optical fiber 1 inserted into the connector main body 31, and an end surface grinding section 37 for grinding an extreme end surface of the optical fiber 1 inserted into the connector main body 31 in a taper shape, and the second fiber guide 34 is provided with a fixed guide section 34a, movable guide sections 34b, a buckling receiving section 34c, and a lid member 34d likewise the seventh embodiment.

The embodiment is different from the seventh embodiment in that the end surface grinding section 37 is disposed to one end side of the first fiber guide 33. Note that since the other configuration is the same as the seventh embodiment, a detailed description is omitted.

Next, an assembly method of the optical connector 30 will be explained referring to FIG. 32A to FIG. 33B.

First, as shown in FIG. 32A, the coated optical fiber 1 is held by a fiber holder 7 and is inserted into the second fiber guide 34. The optical fiber 1 inserted into the second fiber guide 34 is guided by the first and second fiber guides 33, 34 and a corner portion of an extreme end surface is ground by the end surface grinding section 37 in the taper shape as shown in FIG. 32B. The bare fiber 1a from which the extreme end surface has been ground is inserted into the ferrule 32 after the coating 1b has been removed by the coating removing section 36 as shown in FIG. 32C and projects to the outside from an extreme end of the ferrule 32 as shown in FIG. 33A. At the time, the bare fiber 1a may be regulated to a predetermined projection length by causing an extreme end of the bare fiber 1a to abut against an abutment plate (not shown) disposed to outside of the ferrule 32. Further, the second fiber guide 34 is secured with an insertion area L of a predetermined length as large as a contraction amount of the movable guide sections 34b, and the movable guide sections 34b regulate a buckling of the optical fiber 1 while becoming short in the insertion direction of the optical fiber 1. At the time, since the buckling receiving section 34c of the second fiber guide 34 is closed by the lid member 34d, no buckling is generated to the optical fiber 1 in the second fiber guide 34. Then, the second fiber guide 34 is fixed to the connector main body 31 as well as a rear end side of the optical fiber 1 is fixed by the fixing member 35.

When the optical connector 30 assembled as described above is connected to the partner side connector, the lid member 34d is removed from the second fiber guide 34, and the ferrule 32 is butted against a ferrule 32' of the partner side connector as shown in FIG. 33B. At the time, although the optical fiber 1 is forcibly pushed into the connector main body 31 by an engagement pressure to the partner side connector, since the rear end side of the optical fiber 1 is fixed by the fixing member 35, a buckling portion 1c is generated to the optical fiber 1 in the second fiber guide 34. The buckling portion 1c is received in the buckling receiving section 34c, and a fiber end surface is pressed to a fiber end surface of the partner side connector by a restoring force of the buckling portion 1c. In the case, since a corner portion of the extreme end surface of the optical fiber 1 is ground off, an area of a butted end surface is reduced and a pressure necessary to an optical connection can be sufficiently obtained. Since the fiber end surface is aligned by the ferrule 32 so that its core center agrees with a core center of the partner side fiber and the fiber end surfaces are caused to come into intimate contact with each other by a restoring force of the buckling portion 1c, the fiber end surfaces allow a signal light to pass therethrough each other.

As described above, according to the embodiment, likewise the seventh embodiment, a coating removing of the optical fiber 1 and an end surface grinding preparation of the optical fiber 1 can be executed by an insertion force of the optical fiber 1 to the connector main body 31 as well as a buckling of the optical fiber 1 can be regulated by the movable guide sections 34b of the second fiber guide 34.

Tenth Embodiment

FIG. 34 to FIG. 35D show a tenth embodiment of the invention, and an optical connector 40 shown in the drawings connects an optical fiber 1 to a partner side connector.

The optical connector 40 includes a connector main body 41 into which the optical fiber 1 is inserted, a ferrule 42 attached to one end side of the connector main body 41, a first fiber guide 43 fixed in the connector main body 41, a second fiber guide 44 disposed movably to the first fiber guide 43, a fixing member 45 for fixing the optical fiber 1, a coating removing section 46 for removing a coating of the optical fiber 1 inserted into the connector main body 41, and an end surface grinding section 47 for grinding an extreme end surface of the optical fiber 1 inserted into the connector main body 41 in a taper shape, and the second fiber guide 44 is provided with a fixed guide section 44a, movable guide sections 44b, a buckling receiving section 44c, and a lid member 44d likewise the seventh embodiment.

The embodiment is different from the ninth embodiment in that the end surface grinding section 46 is disposed in the ferrule 42. Note that since an configuration other than the ferrule 42 is the same as the ninth embodiment, a detailed description is omitted.

The ferrule 42 includes a hole which has an inner diameter approximately the same as an outer diameter of the bare fiber 1a from which the coating is removed at a center in a radial direction on one end side and holds the bare fiber 1a inserted into the hole. An inner diameter of the ferrule 42 on the other end side is formed larger than one end side, and the end surface grinding section 47 is disposed to a stepped surface to the fiber insertion hole on one end side. In the case, an extending section 43a extending from the first fiber guide 43 is inserted on the other end side of the ferrule 42.

Next, an assembly method of the optical connector 40 will be explained referring to FIG. 35A, FIG. 35B, FIG. 35C and FIG. 35D.

First, as shown in FIG. 35A, the coated optical fiber 1 is held by a fiber holder 7 and is inserted into the second fiber guide 44. The optical fiber 1 inserted into the second fiber guide 44 is guided by the first and second fiber guide 43, 44 and a corner portion of an extreme end surface is ground in a taper shape by the end surface grinding section 47 as shown in FIG. 35B. The bare fiber 1a from which the extreme end surface has been ground is inserted into the ferrule 42 and projects to the outside from an extreme end of the ferrule 42 after a coating 1b is removed by the coating removing section 46 as shown in FIG. 35C. At the time, the bare fiber 1a may be regulated to a predetermined projection length by causing an extreme end of the bare fiber 1a to abut against an abutment plate (not shown) disposed to outside of the ferrule 42. Further, the second fiber guide 44 is secured with an insertion area L of a predetermined length as large a contraction amount of the movable guide sections 44b, and the movable guide sections 44b regulate a buckling of the optical fiber 1 while becoming short in an insertion direction of the optical fiber 1. At the time, since the buckling receiving section 44c of the second fiber guide 44 is closed by the lid member 44d, no buckling is generated to the optical fiber 1 in the second fiber guide 44. Then, the second fiber guide 44 is fixed to the connector main body 41 as well as a rear end side of the optical fiber 1 is fixed by the fixing member 45.

When the optical connector 40 assembled as described above is connected to the partner side connector, the lid member 44d is removed from the second fiber guide 44, and the ferrule 42 is butted against a ferrule 42' of the partner side connector as shown in FIG. 35D. At the time, although the optical fiber 1 is forcibly pushed into the connector main body 41 by an engagement pressure to the partner side connector, since the rear end side of the optical fiber 1 is fixed by the fixing member 45, a buckling portion 1c is generated to the optical fiber 1 in the second fiber guide 44. The buckling portion 1c is received in the buckling receiving section 44c, and a fiber end surface is pressed to a fiber end surface of the partner side connector by a restoring force of the buckling portion 1c. In the case, since a corner portion of the extreme end surface of the optical fiber 1 is ground off, an area of a butted end surface is reduced and a pressure necessary to an optical connection can be sufficiently obtained. Since the fiber end surface is aligned by the ferrule 42 so that its core center agrees with a core center of the partner side fiber and the fiber end surfaces are caused to come into intimate contact with each other by the restoring force of the buckling portion 1c, the fiber end surfaces allow a signal light to pass therethrough each other.

As described above, according to the embodiment, likewise the seventh embodiment, a coating removing of the optical fiber 1 and an end surface grinding preparation of the optical fiber 1 can be executed by an insertion force of the optical fiber 1 to the connector main body 41 as well as a buckling of the optical fiber 1 can be regulated by the movable guide sections 44b of the second fiber guide 44.

Note that in the ninth and tenth embodiments, although the configuration that the optical fiber 1 is pressed to the extreme end side by the restoring force of the buckling portion 1c of the optical fiber 1, the optical fiber 1 may be pressed by a press member likewise the eighth embodiment.

Eleventh Embodiment

FIG. 36 to FIG. 39B show an eleventh embodiment of the invention, and an optical connector 10 shown in the drawings connects an optical fiber 1 to a partner side connector.

The optical connector 10 includes a connector main body 11 into which the optical fiber 1 is inserted, a ferrule 12 attached to one end side of the connector main body 11, a first fiber guide 13 fixed to one end side in the connector main body 11, a second fiber guide 14 disposed movably to the connector main body 11, a guide holder 15 disposed to the other end side in the connector main body 11, a buckling regulating section 16 for regulating a buckling of the optical fiber 1 inserted into the connector main body 11, a fixing member 17 for fixing the optical fiber 1, and a coating removing section 18 for removing a coating of the optical fiber 1 inserted into the connector main body 11.

The connector main body 11 is formed so as to be inserted with the optical fiber 1 composed of, for example, a bare fiber 1a having an outer diameter of 125 μm and a coating 1b having an outer diameter of 250 μm and so as to be engageable with the partner side connector.

The ferrule 12 includes a hole which has an inner diameter approximately the same as the outer diameter of the bare fiber 1a from which the coating is removed at a center in a radial direction, and a built-in fiber 12a is inserted into the hole. The built-in fiber 12a disposes one end surface to an extreme end surface of the ferrule 12, and the end surface is made to a flat surface by being subjected to a polishing preparation so that the end surface can optically communicate with an optical fiber of the partner side connector. Further, the other end side of the built-in fiber 12a projects into the first fiber guide 13 from an end surface of the ferrule 12.

The first fiber guide 13 is fixed in the connector main body 11 and is formed so as to position the optical fiber 1 coaxially with the ferrule 12 by a V-shaped groove or a circular hole. The other end side of the built-in fiber 12a is inserted to one end side of the first fiber guide 13 so that the built-in fiber 12a is butted against the optical fiber 1 by an index matching oil 13a.

The second fiber guide 14 is formed so that the optical fiber 1 can be inserted therein and is disposed to the other end side of the connector main body 11 so as to be free to move in an axial direction of the optical fiber 1. Further, the second fiber guide 14 is fixed to the other end of the connector main body 11 after the optical fiber 1 is inserted. A buckling receiving section 14a capable of receiving a buckling portion of the optical fiber 1 is disposed in the second fiber guide 14, and the buckling receiving section 14a is closed by a detachable lid member 14b. That is, a buckling portion generated by forcibly pushing the optical fiber 1 can be received by the buckling receiving section 14a by removing the lid member 14b. Further, a guide section 14c extending in the axial direction of the optical fiber 1 is disposed to one end side of the second fiber guide 14, and an extreme end of the guide section 14c is formed in a taper shape. In the case, the guide section 14c inserts the optical fiber 1 into a circular hole 14d as shown in FIG. 37.

The guide holder 15 is composed of a cylindrical member having a hole on one end side into which the optical fiber 1 can be inserted, and the guide section 14c of the second fiber guide 14 is inserted to the other end side of the guide holder 15 so as to be free to move in the axial direction.

The buckling regulating section 16 is composed of an elastic member such as rubber and is formed so that the optical fiber 1 can be inserted to a center section thereof. The buckling regulating section 16 is disposed to one end side in the guide holder 15, and when the guide section 14c of the second fiber guide 14 is abutted against the buckling regulating section, the buckling regulating section 16 is contracted in the axial direction of the optical fiber 1 and its length becomes short. In the case, an inner periphery of an end surface of a fiber insertion hole of the buckling regulating section 16 is formed in a taper shape, and when an extreme end of the guide section 14c is abutted against the buckling regulating section, the buckling regulating section 16 is compressed while being pushed and widened to the outside in a radial direction by the taper surface of the guide section 14c.

The fixing member 17 is disposed to the other end side of the second fiber guide 14 and is formed to fix the inserted optical fiber 1 by tightening the optical fiber 1.

The coating removing section 18 is disposed to one end of the first fiber guide 13 and composed of a conical member having an insertion hole into which the bare fiber 1a can be inserted. The coating removing section 18 is configured such that when an extreme end surface of the optical fiber 1 inserted into the connector main body 11 is abutted against the coating removing section 18, the coating removing section 18 exfoliates the coating 1b of the optical fiber 1 while cutting and opening it by an insertion force of the optical fiber 1 and causes the bare fiber 1a to be inserted into the first fiber guide 13. In the case, since an inner diameter of an insertion hole of the coating removing section 18 into which the bare fiber 1a is inserted must be larger than the outer diameter of the bare fiber 1a and smaller than the outer diameter of a coated portion of the optical fiber 1, the inner diameter of the insertion hole is formed to, for example, 175 μm or more to 200 μm or less. Note that an abutment surface of the coating removing section 18 to the optical fiber 1 may be formed vertical to the axial direction of the optical fiber 1.

Next, an assembly method of the optical connector 10 will be explained referring to FIG. 38A, FIG. 38B, FIG. 38C and FIG. 38D.

First, the coated optical fiber 1 is held by a fiber holder 7 as shown in FIG. 38A, and the optical fiber 1 is inserted into the second fiber guide 14 as shown in FIG. 38B. The optical fiber 1 inserted into the second fiber guide 14 is inserted into the first fiber guide 13 passing through the guide section 14c of the second fiber guide 14 and the buckling regulating section 16 and the coating 1b is removed by the coating removing section 18 as shown in FIG. 38C. At the time, the fiber holder 7 is abutted against the fixing member 17. Since the fixing member 17 is integrated with the second fiber guide 14, when the optical fiber 1 is inserted, they are pushed in an inner direction of the connector. An extreme end side of the bare fiber 1a from which the coating 1b on the extreme end side is removed is butted against the built-in fiber 12a via an index matching oil 13a. At the time, the guide section 14c of the second fiber guide 14 is secured with an insertion area L of a predetermined length by the buckling regulating section 16, and the buckling regulating section 16 regulates a buckling of the optical fiber 1 while contracting in the insertion direction of the optical fiber 1. Further, since the buckling receiving section 14a of the second fiber guide 14 is closed by the lid member 14b, no buckling of the optical fiber 1 is generated by the buckling receiving section 14a. Next, after the optical fiber 1 is butted against the built-in fiber 12a in the first fiber guide 13, as shown in FIG. 38D, the lid member 14b is removed from the second fiber guide 14, the optical fiber 1 is further forcibly pushed in the connector main body 11, the second fiber guide 14 is fixed to the connector main body 11 as well as a rear end side of the optical fiber 1 is fixed by the fixing member 17. With the operation, although a buckling portion 1c is generated to the optical fiber 1 in the second fiber guide 14, the buckling portion 1c is received in the buckling receiving section 14a, and an end surface of the optical fiber 1 is pressed to an end surface of the built-in fiber 12a by a restoring force of the buckling portion 1c.

An insertion area L and an insertion force P when the fiber is inserted are determined by a contraction amount S of the buckling regulating section 16 and a number N of the buckling regulating section 16. That is, the contraction amount S of the buckling regulating section 16 shown in FIG. 39A becomes the same as an insertion amount of the optical fiber 1 shown in FIG. 39B. In the embodiment, although N=1, it is also possible to dispose plural buckling regulating sections 16 in the axial direction of the optical fiber 1. That is, the insertion area L becomes as shown below.

$$L = S \times N + L_2 \tag{8}$$

Here, $L_2$ is a length of a rear end of a connector which can be buckled (refer to FIG. 38). When a longer one of $L_2$ and S is represented by l, the insertion force P becomes as shown below likewise Expression (1).

$$P = 4\pi^2 EI/l^2 \tag{9}$$

Further, although it is prescribed that an average of maximum coating removing forces is 5 N (refer to for example, IEC-60793-2-50, Optical fibers•Part 2-50: Product specifications•Sectional specification for class B single-mode fibers), when it is assumed that an insertion force necessary to remove a coating in the optical connector 10 is the same as that, S and $L_2$ become $L_2 \leq 2.4$ mm as well as $S \leq 2.4$ mm from Expression (9).

In contrast, as explained in the conventional problem, since a necessary insertion area L is 3.5 mm or more, when the contraction amount S of the buckling regulating section 16 (S×N when there are plural buckling regulating sections 16) is 1.1 mm or more from Expression (8), the optical fiber 1 can be inserted by the insertion force of 5N or more in the necessary insertion area, and an insertion force sufficient to remove a coating can be obtained.

As described above, according to the embodiment, since the buckling regulating section 16, which regulates a buckling of the optical fiber 1 when the optical fiber 1 is inserted, is provided, the buckling regulating section 16 is formed so as to be elastically deformable in the optical fiber insertion direction, and the buckling regulating section 16 regulates the buckling of the optical fiber 1 while contracting in the insertion direction of the optical fiber 1, even if the insertion area is made long, no buckling of the optical fiber 1 is generated and the insertion force of the optical fiber 1 can be made sufficiently large. With the configuration, even when foreign substances such as dusts enter and an insertion resistance increases, the optical fiber 1 can be securely inserted.

Further, since the coating 1b of the optical fiber 1 is removed making use of the insertion force of the optical fiber 1 to the connector main body 11 by providing the coating removing section 18 for removing the coating 1b of the optical fiber 1 by an abutment against the optical fiber 1, it is not necessary to separately remove the coating 1b of the optical fiber 1 using a dedicated tool before the optical fiber 1 is inserted, and an assembly job of the optical connector 10 can be efficiently executed. At the time, even if the insertion force of the optical fiber 1 is increased to remove the coating 1b, since a buckling of the optical fiber 1 can be prevented by the buckling regulating section 16, the coating 1b of the optical fiber 1 can be securely removed by the coating removing section 18. Note that when a flaw such as a cut is made to an extreme end of the coating 1b of the optical fiber 1, the insertion force for removing the coating 1b can be reduced.

Note that, in the eleventh embodiment, although the configuration in which the guide section 14c of the second fiber guide 14 is formed so that the optical fiber 1 is inserted in the circular hole 14d, is shown, the guide section 14c may be formed of a block-like member having a V-shaped groove 14f such as a guide section 14e shown in FIG. 40, and may be formed so that the optical fiber 1 is inserted between the block-like member and a sheet-like guide member 14g.

Further, in the eleventh embodiment, although the configuration in which the coating 1b of the optical fiber 1 is removed by the coating removing section 18, an optical fiber 1 from which a coating on an extreme end side has been previously removed may be inserted without providing the coating removing section.

Further, in the eleventh embodiment, although the press force is applied to a fiber end surface by a restoring force of the buckling portion 1c, when optical characteristics of the fiber end surface are good, the buckling portion 1c may be omitted.

EXPLANATION OF REFERENCE NUMERALS (In FIG. 1-FIG. 21, and FIG. 47)

1: optical fiber, 1a: bare fiber, 1b: coating, 10: optical connector, 11: connector main body, 15: buckling regulating section, 15b, 15c, 15d: movable guide section, 17: buckling regulating section, 17b, 17c: movable guide section, 20: optical connector, 21: connector main body, 25: buckling regulating section, 25b: movable guide section, 27: coating removing section, 30: optical connector, 31: connector main body, 35: buckling regulating section, 35b: movable guide section, 37: end surface grinding section, 40: optical connector, 41: connector main body, 45: buckling regulating section, 45b: movable guide section, 50: optical connector, 51: connector main body, 55: buckling regulating section, 55b: movable guide section, 57: coating removing section.

(In FIG. 22-FIG. 35)

1: optical fiber, 1a: bare fiber, 1b: coating, 1c: buckling portion, 10: optical connector, 11: connector main body, 14b: movable guide section, 16: coating removing section, 17: end surface grinding section, 20: optical connector, 21: connector main body, 24b: movable guide section, 25: press member, 27: coating removing section, 28: end surface grinding section, 30: optical connector, 31: connector main body, 34b: movable guide section, 36: coating removing section, 37: end surface grinding section, 40: optical connector, 41: connector main body, 44b: movable guide section, 46: coating removing section, 47: end surface grinding section.

(In FIG. 36-FIG. 40, and FIG. 48)

1: optical fiber, 1a: bare fiber, 1b: coating, 10: optical connector, 11: connector main body, 16: buckling regulating section, 18: coating removing section.

(In FIG. 41-FIG. 46)

1: optical fiber, 1a: bare fiber, 1b: coating, 2: connector main body, 3: built-in fiber, 4: ferrule, 5: index matching oil, 6: fiber guide, 7: fiber holder, 8: blade.

What is claimed is:

1. An optical connector including an optical fiber inserted into a connector main body, comprising a buckling regulating section whose length in an optical fiber insertion direction is formed variable and which regulates a buckling of the optical fiber while becoming short in the optical fiber insertion direction when the optical fiber is inserted into the connector main body, wherein the buckling regulating section includes a fixed guide section into which the optical fiber is inserted, moveable guide sections into which the optical fiber is inserted, and a buckling receiving section into which the optical fiber is inserted, and when the optical fiber is inserted, the length of the movable guide sections in the optical fiber insertion direction becomes shorter, and the optical fiber is not buckled at the fixed guide section and the movable guide section but is buckled at the buckling receiving section.

2. The optical connector according to claim 1, wherein at least a part of the buckling regulating section is formed of an expansion/contraction member which is free to extend and contract in the optical fiber insertion direction.

3. The optical connector according to claim 1, wherein at least a part of the buckling regulating section is formed of an elastic member which is free to extend and contract in the optical fiber insertion direction.

4. The optical connector according to claim 1, wherein a contraction amount of the buckling regulating section in the optical fiber insertion direction is 1.1 mm or more to 79.9 mm or less.

5. The optical connector according to claim 1, comprising a coating removing section for removing a coating of the optical fiber by an insertion force of the optical fiber.

6. The optical connector according to claim 1, comprising a built-in fiber connected to a partner side connector and a ferrule for holding a built-in fiber and being configured to connect the optical fiber inserted into a connector main body to a built-in fiber by butting the optical fiber against the built-in fiber.

7. The optical connector according to claim 1, comprising a ferrule into which the optical fiber inserted into a connector main body is inserted and being configured to dispose an extreme end of the optical fiber to an extreme end surface of a ferrule and to connect the extreme end of the optical fiber to a partner side connector.

8. The optical connector according to claim 1, comprising a press unit for pressing the optical fiber disposed in the connector main body toward an extreme end side of an optical connector.

9. The optical connector according to claim 8, wherein the press unit is configured to press the optical fiber by an elastic force of an elastic member.

10. An assembly method of an optical fiber connector, comprising a buckling regulating section while length in an optical fiber insertion direction is formed variable and which regulates a buckling of an optical fiber when an optical fiber is inserted into a connector body, wherein
the buckling regulating section includes a fixed guide section into which the optical fiber is inserted, moveable guide sections into which the optical fiber is inserted, and a buckling receiving section into which the optical fiber is inserted, and
when the optical fiber is inserted, the length of the movable guide sections in the optical fiber insertion direction becomes shorter, and the optical fiber is not buckled at the fixed guide section and the movable guide section but is buckled at the buckling receiving section, which allows the optical fiber to be inserted into the connector main body while making a length of the buckling regulating section in the optical fiber insertion direction shorter.

11. An assembly method of an optical fiber connector, comprising a coating removing section for removing a coating of an optical fiber by an insertion force of the optical fiber, an end surface grinding section for grinding a corner portion of an extreme end surface of the optical fiber by an insertion force of the optical fiber, and a buckling regulating section whose length in an optical fiber insertion direction is formed variable and which regulates a buckling of the optical fiber when the optical fiber is inserted into a connector main body, wherein
the optical fiber is inserted into the connector main body while making a length of the buckling regulating section in the optical fiber insertion direction short as well as a coating of the optical fiber is removed by a coating removing section while inserting the optical fiber and a corner portion of an extreme end surface of the optical fiber is ground by an end surface grinding section while inserting the optical fiber.

12. An assembly method of an optical fiber connector, comprising a buckling regulating section which is formed so as to be elastically deformable in an optical fiber insertion direction and regulates a buckling of an optical fiber when the optical fiber is inserted into a connector main body, wherein the optical fiber is inserted into the connector main body while contracting the buckling regulating section in the optical fiber insertion direction.

13. An optical connector including an optical fiber inserted into a connector main body, comprising a buckling regulating section whose length in an optical fiber insertion direction is formed variable and which regulates a buckling of the optical fiber while becoming short in the optical fiber insertion direction when the optical fiber is inserted into the connector main body, and wherein at least a part of the buckling regulating section is formed of a plurality of movable members disposed free to move in the optical fiber insertion direction at intervals each other.

14. An optical connector including an optical fiber inserted into a connector main body, comprising a buckling regulating section whose length in an optical fiber insertion direction is formed variable and which regulates a buckling of the optical fiber while becoming short in the optical fiber insertion direction when the optical fiber is inserted into the connector main body, wherein at least a part of the buckling regulating section is formed of an expansion/contraction mechanism comprising at least two of a plurality of movable members which are disposed to be free to move in the optical fiber insertion direction each other at intervals, an expansion/contraction member which is free to extend and contract in the optical fiber insertion direction and an elastic member which is free to extend and contract in the optical fiber insertion direction.

15. An optical connector including an optical fiber inserted into a connector main body, comprising a buckling regulating section whose length in an optical fiber insertion direction is formed variable and which regulates a buckling of the optical fiber while becoming short in the optical fiber insertion direction when the optical fiber is inserted into the connector main body, wherein at least a part of the buckling regulating section is formed of a plurality of movable members disposed free to move in the optical fiber insertion direction at intervals each other, and wherein intervals of the movable members are 1.45 mm or more to 2.4 mm or less.

16. An optical connector including an optical fiber inserted into a connector main body, comprising a buckling regulating section whose length in an optical fiber insertion direction is formed variable and which regulates a buckling of the optical fiber while becoming short in the optical fiber insertion direction when the optical fiber is inserted into the connector main body, and an end surface grinding section for grinding a corner portion of an extreme end surface of the optical fiber by an insertion force of the optical fiber.

17. An optical connector including an optical fiber inserted into a connector main body, comprising a buckling regulating section whose length in an optical fiber insertion direction is formed variable and which regulates a buckling of the optical fiber while becoming short in the optical fiber insertion direction when the optical fiber is inserted into the connector main body, a press unit for pressing the optical fiber disposed in the connector main body toward an extreme end side of an optical connector, wherein the press unit is configured to press the optical fiber by a restoring force of a buckling portion of the optical fiber buckled in the connector main body.

* * * * *